US010301155B2

(12) United States Patent
Dues et al.

(10) Patent No.: US 10,301,155 B2
(45) Date of Patent: May 28, 2019

(54) SENSOR CONFIGURATION FOR A MATERIALS HANDLING VEHICLE

(71) Applicant: Crown Equipment Corporation, New Bremen, OH (US)

(72) Inventors: Jeffry D. Dues, Minster, OH (US); Matthew M. Green, Celina, OH (US); James F. Schloemer, New Bremen, OH (US); Vernon W. Siefring, Covington, OH (US); Jesse Wershing, Medina, OH (US)

(73) Assignee: Crown Equipment Corporation, New Bremen, OH (US)

(*) Notice: Subject to any disclaimer, the term of this patent is extended or adjusted under 35 U.S.C. 154(b) by 210 days.

(21) Appl. No.: 15/348,207

(22) Filed: Nov. 10, 2016

(65) Prior Publication Data
US 2017/0057798 A1  Mar. 2, 2017

Related U.S. Application Data

(63) Continuation of application No. 13/785,640, filed on Mar. 5, 2013, now Pat. No. 9,522,817, which is a (Continued)

(51) Int. Cl.
*G05D 1/02* (2006.01)
*B66F 9/075* (2006.01)
(Continued)

(52) U.S. Cl.
CPC ............ *B66F 9/07509* (2013.01); *B60T 8/17* (2013.01); *B62D 6/001* (2013.01); *B66F 9/075* (2013.01);
(Continued)

(58) Field of Classification Search
CPC ............ G01C 21/3423; G01C 21/3492; G01C 21/3614; G01C 21/3617; G01C 21/3438; (Continued)

(56) References Cited

U.S. PATENT DOCUMENTS 1,835,808 A    12/1931  Pitts
2,959,260 A    11/1960  Johnson et al.
(Continued)

FOREIGN PATENT DOCUMENTS

CN        1460082 A      12/2003
CN      101999102 A       3/2011
(Continued)

OTHER PUBLICATIONS

EP Communication of a Notice of Opposition; EP2062242; Jul. 12, 2016; European Patent Office, Munich, Germany.
(Continued)

*Primary Examiner* — Kimberly S Berona
*Assistant Examiner* — Jordan S Fei
(74) *Attorney, Agent, or Firm* — Stevens & Showalter, LLP

(57) ABSTRACT

A materials handling vehicle includes a power unit; a load handling assembly coupled to the power unit; at least one obstacle detector mounted to the power unit; and a controller. The at least one obstacle detector detects object located along a path of travel of the power unit, and generate a distance signal upon detecting an object corresponding to a distance between the detected object and the power unit. The controller receives the distance signal and generates a corresponding vehicle stop or predetermined maximum allowable speed signal based on the distance signal, wherein if a sensed object is located within a speed zone associated with a predetermined maximum allowable travel speed comprising a fixed speed greater than zero (0) miles per hour, as
(Continued)

determined by the distance signal, the vehicle speed is reduced to the predetermined maximum allowable vehicle speed.

12 Claims, 21 Drawing Sheets

Related U.S. Application Data continuation-in-part of application No. 12/649,738, filed on Dec. 30, 2009, now Pat. No. 9,207,673, and a continuation-in-part of application No. PCT/US2009/069839, filed on Dec. 30, 2009, and a continuation-in-part of application No. 12/631,007, filed on Dec. 4, 2009, now Pat. No. 9,645,968, and a continuation-in-part of application No. PCT/US2009/066789, filed on Dec. 4, 2009, said application No. 13/785,640 is a continuation-in-part of application No. 12/649,815, filed on Dec. 30, 2009, now Pat. No. 8,452,464, and a continuation-in-part of application No. PCT/US2009/069833, filed on Dec. 30, 2009, said application No. 13/785,640 is a continuation-in-part of application No. 13/011,366, filed on Jan. 21, 2011, now Pat. No. 8,970,363, and a continuation-in-part of application No. PCT/US2012/022011, filed on Jan. 20, 2012, and a continuation-in-part of application No. 12/631,007, filed on Dec. 4, 2009, now Pat. No. 9,645,968, which is a continuation-in-part of application No. PCT/US2009/066789, filed on Dec. 4, 2009, and a continuation-in-part of application No. 12/649,815, filed on Dec. 30, 2009, now Pat. No. 8,452,464, and a continuation-in-part of application No. PCT/US2009/069833, filed on Dec. 30, 2009, and a continuation-in-part of application No. 13/011,366, filed on Jan. 21, 2011, now Pat. No. 8,970,363, and a continuation-in-part of application No. PCT/US2012/022011, filed on Jan. 20, 2012.

(60) Provisional application No. 61/119,952, filed on Dec. 4, 2008, provisional application No. 61/222,632, filed on Jul. 2, 2009, provisional application No. 61/234,866, filed on Aug. 18, 2009.

(51) Int. Cl.
    *B62D 6/00*         (2006.01)
    *B60T 8/17*         (2006.01)
    *G08C 17/02*       (2006.01)
    *B66F 17/00*       (2006.01)

(52) U.S. Cl.
    CPC ...... *B66F 9/07568* (2013.01); *B66F 9/07581* (2013.01); *B66F 17/003* (2013.01); *G05D 1/024* (2013.01); *G05D 1/0255* (2013.01); *G08C 17/02* (2013.01); *G05D 2201/0216* (2013.01); *G08C 2201/20* (2013.01)

(58) Field of Classification Search
    CPC ................ G01C 21/3605; G01C 21/34; G01C 21/3484; G01C 21/3476
    See application file for complete search history.

(56) References Cited

U.S. PATENT DOCUMENTS

| | | |
|---|---|---|
| 3,016,973 A | 1/1962 | Williamson |
| 3,047,783 A | 7/1962 | Van Oort et al. |
| 3,587,784 A | 6/1971 | Tait |
| 3,825,130 A | 7/1974 | Lapham |
| 3,968,893 A | 7/1976 | Lapham |
| 4,074,120 A | 2/1978 | Allred et al. |
| 4,252,495 A | 2/1981 | Cook |
| 4,258,825 A | 3/1981 | Collins |
| 4,287,966 A | 9/1981 | Frees |
| 4,384,695 A | 5/1983 | Nohmi et al. |
| 4,476,954 A | 10/1984 | Johnson et al. |
| 4,527,651 A | 7/1985 | Thiermann, Sr. |
| 4,546,840 A | 10/1985 | Yukishige et al. |
| 4,551,059 A | 11/1985 | Petoia |
| 4,623,032 A | 11/1986 | Kemmer |
| 4,644,237 A | 2/1987 | Frushour et al. |
| 4,665,487 A | 5/1987 | Ogawa et al. |
| 4,714,140 A | 12/1987 | Hatton et al. |
| 4,716,980 A | 1/1988 | Butler |
| 4,727,492 A | 2/1988 | Reeve et al. |
| 4,785,664 A | 11/1988 | Reebs |
| 4,849,735 A | 7/1989 | Kirtley et al. |
| 4,878,003 A | 10/1989 | Knepper |
| 4,954,817 A | 9/1990 | Levine |
| 4,967,362 A | 10/1990 | Schutten et al. |
| 5,023,790 A | 6/1991 | Luke, Jr. |
| 5,036,935 A | 8/1991 | Kohara |
| 5,044,472 A | 9/1991 | Dammeyer et al. |
| 5,107,946 A | 4/1992 | Kamimura et al. |
| 5,141,381 A | 8/1992 | Kato et al. |
| 5,170,351 A | 12/1992 | Nemoto et al. |
| 5,220,319 A | 6/1993 | Kendel |
| 5,245,144 A | 9/1993 | Stammen |
| 5,307,271 A | 4/1994 | Everett, Jr. et al. |
| 5,402,257 A | 3/1995 | Hasselmann et al. |
| 5,502,638 A | 3/1996 | Takenaka |
| 5,652,486 A | 7/1997 | Mueller et al. |
| 5,709,523 A | 1/1998 | Ware |
| 5,778,327 A | 7/1998 | Simmons et al. |
| 5,816,741 A | 10/1998 | Troppman, III |
| 5,892,855 A | 4/1999 | Kakinami et al. |
| 5,913,919 A | 6/1999 | Bauer et al. |
| 5,928,292 A | 7/1999 | Miller et al. |
| 5,938,710 A | 8/1999 | Lanza et al. |
| 5,939,986 A | 8/1999 | Schiffbauer et al. |
| 5,964,313 A | 10/1999 | Guy |
| 6,030,169 A | 2/2000 | Rossow et al. |
| 6,148,255 A | 11/2000 | van der Lely |
| 6,157,892 A | 12/2000 | Hada et al. |
| 6,173,215 B1 * | 1/2001 | Sarangapani ...... B60K 31/0008 700/250 |
| 6,226,902 B1 | 5/2001 | Heyne |
| 6,276,485 B1 | 8/2001 | Eriksson et al. |
| 6,285,925 B1 | 9/2001 | Steffen |
| 6,382,359 B1 | 5/2002 | Lohmann |
| 6,459,955 B1 | 10/2002 | Bartsch et al. |
| 6,464,025 B1 | 10/2002 | Koeper et al. |
| 6,548,982 B1 | 4/2003 | Papanikolopoulos et al. |
| 6,595,306 B2 | 7/2003 | Trego et al. |
| 6,686,951 B1 | 2/2004 | Dickson et al. |
| 6,748,292 B2 | 6/2004 | Mountz |
| 6,750,780 B1 | 6/2004 | Bitelli |
| 6,764,012 B2 | 7/2004 | Connolly et al. |
| 6,784,800 B2 | 8/2004 | Orzechowski |
| 6,809,680 B2 | 10/2004 | Tojima |
| 6,810,319 B2 | 10/2004 | Manaka |
| 7,017,689 B2 | 3/2006 | Gilliland et al. |
| 7,047,132 B2 | 5/2006 | Jacobs |
| 7,076,366 B2 | 7/2006 | Simon et al. |
| 7,099,764 B2 | 8/2006 | Seto et al. |
| 7,266,477 B2 | 9/2007 | Foessel |
| 7,610,121 B2 | 10/2009 | Nishira et al. |
| 7,711,464 B2 | 5/2010 | Kaufmann |
| 7,734,419 B2 | 6/2010 | Kondoh |
| 7,765,066 B2 | 7/2010 | Braeuchle et al. |
| 7,860,653 B2 | 12/2010 | Joe et al. |
| 8,027,029 B2 | 9/2011 | Lu et al. |
| 8,060,400 B2 | 11/2011 | Wellman |
| 8,170,787 B2 | 5/2012 | Coats et al. |
| 8,180,561 B2 | 5/2012 | Osanai |
| 8,195,344 B2 | 6/2012 | Song et al. |
| 8,386,146 B2 | 2/2013 | Shirai |

(56) References Cited

U.S. PATENT DOCUMENTS

| | | | |
|---|---|---|---|
| 2001/0035729 | A1 | 11/2001 | Graiger et al. |
| 2002/0163495 | A1 | 11/2002 | Doynov |
| 2002/0178830 | A1 | 12/2002 | Kazerooni et al. |
| 2003/0014162 | A1 | 1/2003 | Sadano |
| 2003/0029648 | A1 | 2/2003 | Trego et al. |
| 2003/0205433 | A1 | 11/2003 | Hagman |
| 2003/0216854 | A1 | 11/2003 | Katakura et al. |
| 2004/0193363 | A1 | 9/2004 | Schmidt et al. |
| 2004/0193374 | A1 | 9/2004 | Hac et al. |
| 2005/0017858 | A1 | 1/2005 | Gross |
| 2005/0052412 | A1 | 3/2005 | McRae et al. |
| 2005/0073433 | A1 | 4/2005 | Gunderson et al. |
| 2005/0216124 | A1 | 9/2005 | Suzuki |
| 2005/0244259 | A1 | 11/2005 | Chilson et al. |
| 2006/0084422 | A1 | 4/2006 | Huang et al. |
| 2006/0125806 | A1 | 6/2006 | Voyles et al. |
| 2006/0229744 | A1 | 10/2006 | Patzwald et al. |
| 2006/0238156 | A1 | 10/2006 | Kim |
| 2006/0250255 | A1 | 11/2006 | Flanagan |
| 2006/0265166 | A1 | 11/2006 | Mäkelä |
| 2007/0016341 | A1 | 1/2007 | Nagasawa |
| 2007/0056157 | A1 | 3/2007 | Hirata et al. |
| 2007/0088477 | A1 | 4/2007 | Brewer et al. |
| 2007/0112461 | A1 | 5/2007 | Zini et al. |
| 2007/0171090 | A1 | 7/2007 | Newman et al. |
| 2007/0219720 | A1 | 9/2007 | Trepagnier et al. |
| 2008/0071429 | A1 | 3/2008 | Kraimer et al. |
| 2008/0129445 | A1 | 6/2008 | Kraimer et al. |
| 2008/0188900 | A1 | 8/2008 | Levin et al. |
| 2008/0189005 | A1 | 8/2008 | Chilson et al. |
| 2008/0201044 | A1 | 8/2008 | Yamada et al. |
| 2008/0202243 | A1 | 8/2008 | Gross |
| 2009/0032560 | A1 | 2/2009 | Strandberg et al. |
| 2009/0076664 | A1 | 3/2009 | McCabe et al. |
| 2009/0306835 | A1 | 12/2009 | Ellermann et al. |
| 2009/0326763 | A1 | 12/2009 | Rekow |
| 2010/0063680 | A1 | 3/2010 | Tolstedt et al. |
| 2010/0114405 | A1 | 5/2010 | Elston et al. |
| 2010/0145551 | A1 | 6/2010 | Pulskamp et al. |
| 2010/0204866 | A1 | 8/2010 | Moshchuk et al. |
| 2011/0018699 | A1 | 1/2011 | Chen et al. |
| 2011/0035086 | A1 | 2/2011 | Kim et al. |
| 2011/0166721 | A1 | 7/2011 | Castaneda et al. |

FOREIGN PATENT DOCUMENTS

| | | |
|---|---|---|
| DE | 10033857 | 1/2002 |
| DE | 202005003366 U1 | 6/2005 |
| DE | 102005059226 A1 | 7/2006 |
| DE | 102007027494 A1 | 1/2009 |
| EP | 0243382 A1 | 11/1987 |
| EP | 0406070 A1 | 1/1991 |
| EP | 0732641 A2 | 9/1996 |
| EP | 1288882 A1 | 3/2003 |
| EP | 1462880 A2 | 9/2004 |
| EP | 1475297 A1 | 11/2004 |
| EP | 1813569 A1 | 8/2007 |
| EP | 2036763 A2 | 3/2009 |
| FR | 2764091 A1 | 12/1998 |
| FR | 2867593 A3 | 9/2005 |
| GB | 1002825 | 9/1965 |
| GB | 2197799 A | 6/1988 |
| GB | 2360500 | 9/2001 |
| GB | 2398394 A | 8/2004 |
| JP | 02152898 | 6/1990 |
| JP | 2002104800 | 4/2002 |
| JP | 2002179196 A | 6/2002 |
| JP | 2005094425 A | 4/2005 |
| JP | 2005241651 A | 9/2005 |
| JP | 2006259877 A | 9/2006 |
| JP | 2006293975 A | 10/2006 |
| JP | 2007138000 A | 6/2007 |
| RU | 60486 U1 | 1/2007 |
| WO | 199215977 | 9/1992 |
| WO | 9639679 A1 | 12/1996 |
| WO | 02088918 A2 | 11/2002 |
| WO | 2004057553 | 7/2004 |
| WO | 2006078604 A2 | 7/2006 |
| WO | 2008039649 A2 | 4/2008 |
| WO | 2010065864 A2 | 6/2010 |
| WO | 2011002478 A2 | 1/2011 |
| WO | 2011022026 A1 | 2/2011 |

OTHER PUBLICATIONS

Grounds of Opposition with translation; EP2062242; Dec. 8, 2016; European Patent Office; Munich, Germany.

EP Correspondence in German; EP2062242; Mar. 9, 2016; European Patent Office; Munich, Germany.

Weber, Karl-Heinz et al.; "A Portable Wireless Remote Control Device for Mining Equipment"; Apr. 13, 1967; starting on pp. 375-378, Essen, Germany.

BT Products AB; "Swedish Industry Standard"; Swedish Industry Standard; 1998.

Durrant-Whyte, Hugh F., "An Autonomous Guided Vehicle for Cargo-Handling Applications;" The International Journal of Robotics Research; vol. 15, Oct. 1996, pp. 407-440.

Fei, Jordan S.; Office Action; U.S. Appl. No. 13/785,640; dated Feb. 2, 2016; United States Patent and Trademark Office; Alexandria, VA.

Fei, Jordan S.; Final Office Action; U.S. Appl. No. 13/785,640; dated Aug. 14, 2015; United States Patent and Trademark Office; Alexandria, VA.

Fei, Jordan S.; Office Action; U.S. Appl. No. 13/785,640; dated Feb. 24, 2015; United States Patent and Trademark Office; Alexandria, VA.

Fei, Jordan S.; Office Action; U.S. Appl. No. 12/649,738; dated Nov. 19, 2014; United States Patent and Trademark Office; Alexandria, VA.

Fei, Jordan S.; Final Office Action; U.S. Appl. No. 12/649,738; dated May 14, 2015; United States Patent and Trademark Office; Alexandria, VA.

Masashi Honda; International Preliminary Report on Patentability and Written Opinion of the International Searching Authority; International Application No. PCT/US2007/078455; dated Mar. 17, 2009; International Bureau of WIPO; Geneva Switzerland.

Gregory Garcia; B.O.S.S. A Battery Operated Smart Servant; EEL 5666c; Intelligent Machines Design Lab; Sensor Presentation; Center for Intelligent Machines and Robotics; University of Florida; Aug. 17, 2005.

Weber et al.; "Ein tragbares Funk-Fernsteuergerat fur Gewinnungsmaschinen", Gluckauf, Minova Carbo Tech Gmbh; Jul. 13, 1967; pp. 375-378; XP002093388; ISSN; 0340-7896; Essen DE.

Emery, Carole; Invitation to Pay Additional Fees and Partial International Search; International Application No. PCT/US2007/078455; dated Sep. 3, 2008; European Patent Office.

Pham, Phong; International Search Report and Written Opinion of the International Searching Authority; International Application No. PCT/US2007/078455; dated Dec. 29, 2008; European Patent Office.

First Office Action; Korean Patent Application 10-2012-7002517; dated Oct. 18, 2015; Korean Intellectual Property Office.

Smirnoff M.V.; Office Action; Russian Application No. 2011152039; dated Jan. 16, 2015; Federal Institute of Industrial Property; Moscow, Russian Federation.

Lalinde, Rafael; Extended European Search Report; European Application No. 12183585.4; dated Oct. 24, 2012; Munich, Germany.

Lalinde, Rafael; Extended European Search Report; European Application No. 12183597.9; dated Oct. 24, 2012; Munich, Germany.

Redhwan K. Mawari; Office Action-Final Rejection in U.S. Appl. No. 11/855,310; dated Sep. 1, 2010; U.S. Patent and Trademark Office; Alexandria, VA.

Photograph 1; AirMouse; http://theairmouse.com/; Deanmark Ltd; Ontario, Canada; First publication date unknown, and first discovered by the inventors on Jan. 28, 2010.

Photograph 2; TINYOM Hand Free Scanning; http://txcom.com/public/?page=tinyom; First publication date unknown, and first discovered by the inventors on Aug. 10, 2009.

(56) References Cited

OTHER PUBLICATIONS

Photograph 3; RS409 Wearable Ring Scanner; http://www.motorola.com/business/v/index.jsp?vgnextoid=5dbee90e3ae95110VgnVCM10; First publication date unknown, and first discovered by the inventors on Oct. 30, 2008.
Photograph 4; Peregrine; http://www.theperegrine.com/; First publication date unknown, and first discovered by the inventors on Nov. 23, 2009.
U.S. Appl. No. 12/649,815, filed Dec. 30, 2009, entitled "Steer Correction for a Remotely Operated Materials Handling Vehicle".
Lalinde, Rafael; International Search Report and Written Opinion of the International Searching Authority; International Application No. PCT/US2009/066789; dated Dec. 16, 2010; European Patent Office.
Lalinde, Rafael; International Search Report and Written Opinion of the International Searching Authority; International Application No. PCT/US2009/069833; dated Dec. 2, 2010; European Patent Office.
Bourdon, G. et al.; Instantaneous Fuzzy Modelling for Obstacle Avoidance; Systems, Man and Cybernetics; Intelligent Systems for the 21st Century; IEEE International Conference; vol. 3; Oct. 22, 1995; pp. 2546-2551; New York, NY; USA.
Kovacs, S. et al.; Interpolation-based Fuzzy Logic Controller, as a Simplified Way for Constructing the Fuzzy Rulebase of the Path Tracking and Collision Avoidance Strategy of an AGV; Systems, Man and Cybernetics; IEEE International Conference; vol. 2; Oct. 11, 1998; pp. 1317-1322; New York, NY; USA.
Lalinde, Rafael; International Search Report and Written Opinion of the International Searching Authority; International Application No. PCT/US2009/069839; dated Mar. 16, 2011; European Patent Office.
http://www.cajunbot.com/technology; 2011; CajunBot Labs.
http://www.cajunbot.com; 2011; CajunBot Labs.
Urban Challenge; http://www.darpa.mil/grandchallenge/index.asp; Nov. 3, 2007.
CajunBot Wiki; http:cajunbot.com/wiki/Main_Page; Apr. 18, 2010.
Urban Challenge; http://www.darpa.mil/grandchallenge/resources.asp.
Vano Gea, Joaquin; International Search Report and Written Opinion of the International Searching Authority; International Application No. PCT/US2012/022011; dated Jun. 30, 2012; European Patent Office.
Pitard, Jacqueline; Invitation to Pay Additional Fees and Communication Relating to the Results of the Partial International Search; International Application No. PCT/US2012/025849; dated Jul. 16, 2012; European Patent Office.
Desyllas, Dimitri; International Search Report and Written Opinion; International Application No. PCT/US2012/025849; dated Sep. 12, 2012; European Patent Office.
Khatib, Rami; Non-final Office Action in U.S. Appl. No. 12/631,007; dated Nov. 30, 2012; U.S. Patent and Trademark Office; Alexandria, VA.
To, Tuan; Non-final Office Action in U.S. Appl. No. 12/649,815; dated Aug. 29, 2012; U.S. Patent and Trademark Office; Alexandria, VA.
To, Tuan; Final Office Action in U.S. Appl. No. 12/649,815; dated Dec. 13, 2012; U.S. Patent and Trademark Office; Alexandria, VA.
Fei, Jordan S.;Non-Final Office Action; U.S. Appl. No. 12/649,738; dated Apr. 12, 2013; U.S. Patent and Trademark Office; Alexandria, VA.
Fei, Jordan; Non-final Office Action; U.S. Appl. No. 12/649,738; dated Aug. 1, 2013; United States Patent and Trademark Office; Alexandria, VA.
Khatib, Rami; Non-final Office Action; U.S. Appl. No. 13/738,016; dated Jul. 17, 2013; United States Patent and Trademark Office, Alexandria, VA.
Khatib, Rami; Non-final Office Action; U.S. Appl. No. 13/738,060; dated Jul. 18, 2013; United States Patent and Trademark Office, Alexandria, VA.
Khatib, Rami; Non-final Office Action; U.S. Appl. No. 13/738,097; dated Jul. 18, 2013; United States Patent and Trademark Office, Alexandria, VA.
Tan, Chen; First Office Action; Chinese Patent Application No. 201310283281.1; dated May 4, 2015; State Intellectual Property Office of the People's Republic of China.
Congmin, Zhu, et al.; AGV Navigation System With Multiple Sensors; Chinese Journal of Scientific Instrument; Nov. 2008; China.
Yong, Zhou et al.; Obstacle Detection for AGVS Based on Computer Vision; Machine Design and Research; May 2008; China.
Lalinde, Rafael; Communication pursuant to Article 94(3) EPC; European Patent Application No. 12183585.4; dated Aug. 5, 2013; European Patent Office; Munich, Germany.
Lalinde, Rafael; Communication Pursuant to Article 94(3) EPC; European Patent Application No. 12183597.9; dated Aug. 2, 2013; European Patent Office; Munich, Germany.
Lalinde, Rafael; Communication Pursuant to Article 94(3) EPC; European Patent Application No. 09804108.0; dated Aug. 2, 2013; European Patent Office; Munich, Germany.
Van Raad, Viara; Patent Examination Report No. 1; Australian Application No. 2009348925; dated Jan. 7, 2014; Australian Government, IP Australia, Woden, ACT.
Notification of the First Office Action; Chinese Application No. 200980160172.2; dated Mar. 28, 2013; State Intellectual Property Office of the People's Republic of China.
Notification of the Second Office Action; Chinese Application No. 200980160172.2; dated Dec. 13, 2013; State Intellectual Property Office of the People's Republic of China.
Fei, Jordan S.; Final Office Action; U.S. Appl. No. 12/649,738; dated Jan. 15, 2014; United States Patent and Trademark Office; Alexandria, VA.
Viarqa Van Raad; Patent Examination Report No. 2; Australian Application No. 2014203774; dated Dec. 24, 2015; Australian Government, IP Australia; Woden, ACT.
Sustafsson, Tomas (ZACCO for BT Products, Inc.); Notice of Opposition of European Patent No. 2 678 748; dated Dec. 29, 2015; Sweden; filed in the European Patent Office.
Schildberg, Dr. Peter (Hauck Patentanwaltspartnerschaft mbH for Jungheinrich); Notice of Opposition of European Patent No. 2 678 748; dated Dec. 22, 2015; Hamburg, Germany; filed in the European Patent Office.
Nayback Machine, "Getting Started: a Wall Following Robot"; Feb. 2, 2011; <www.mobotsoft.com>.

\* cited by examiner

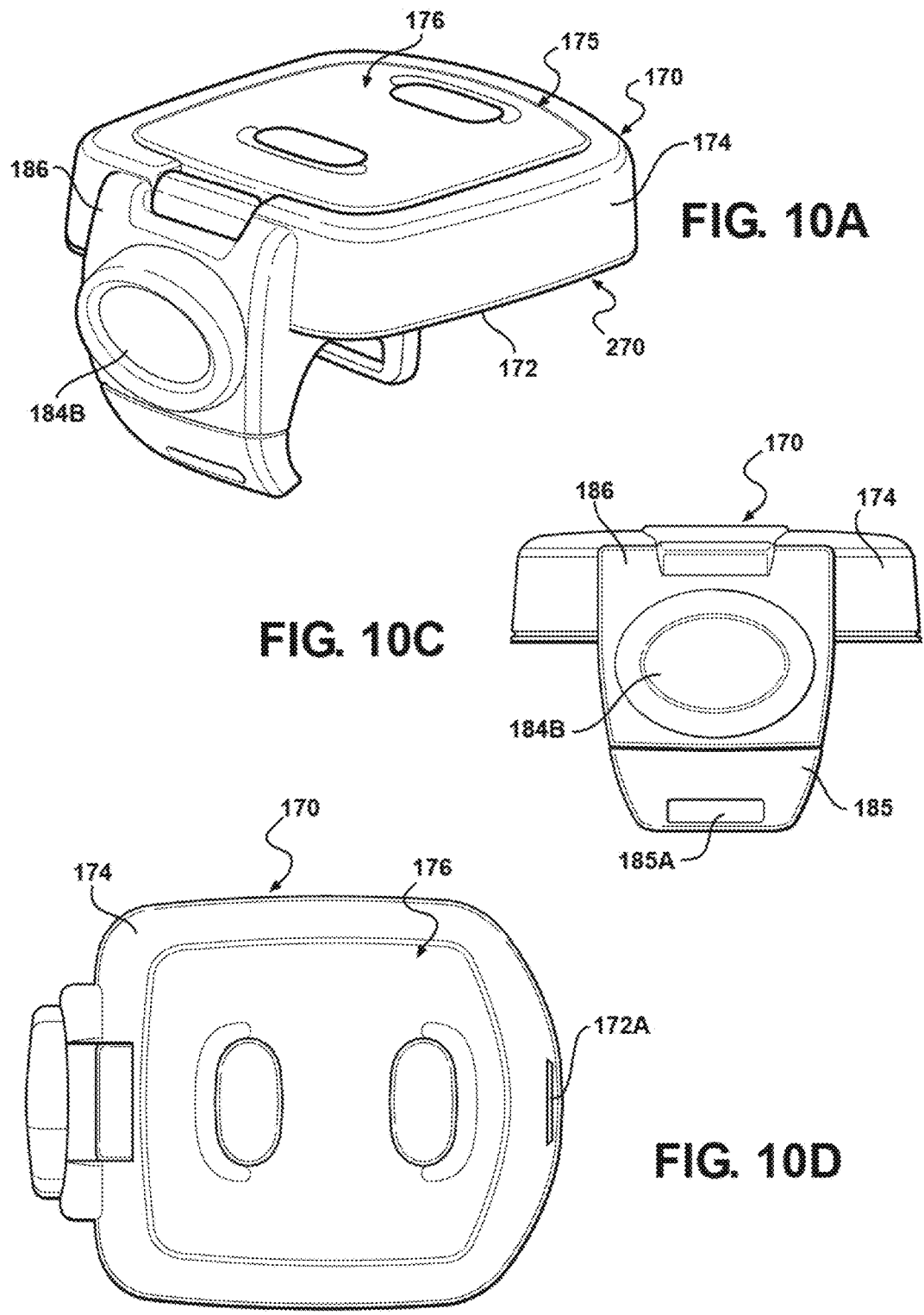

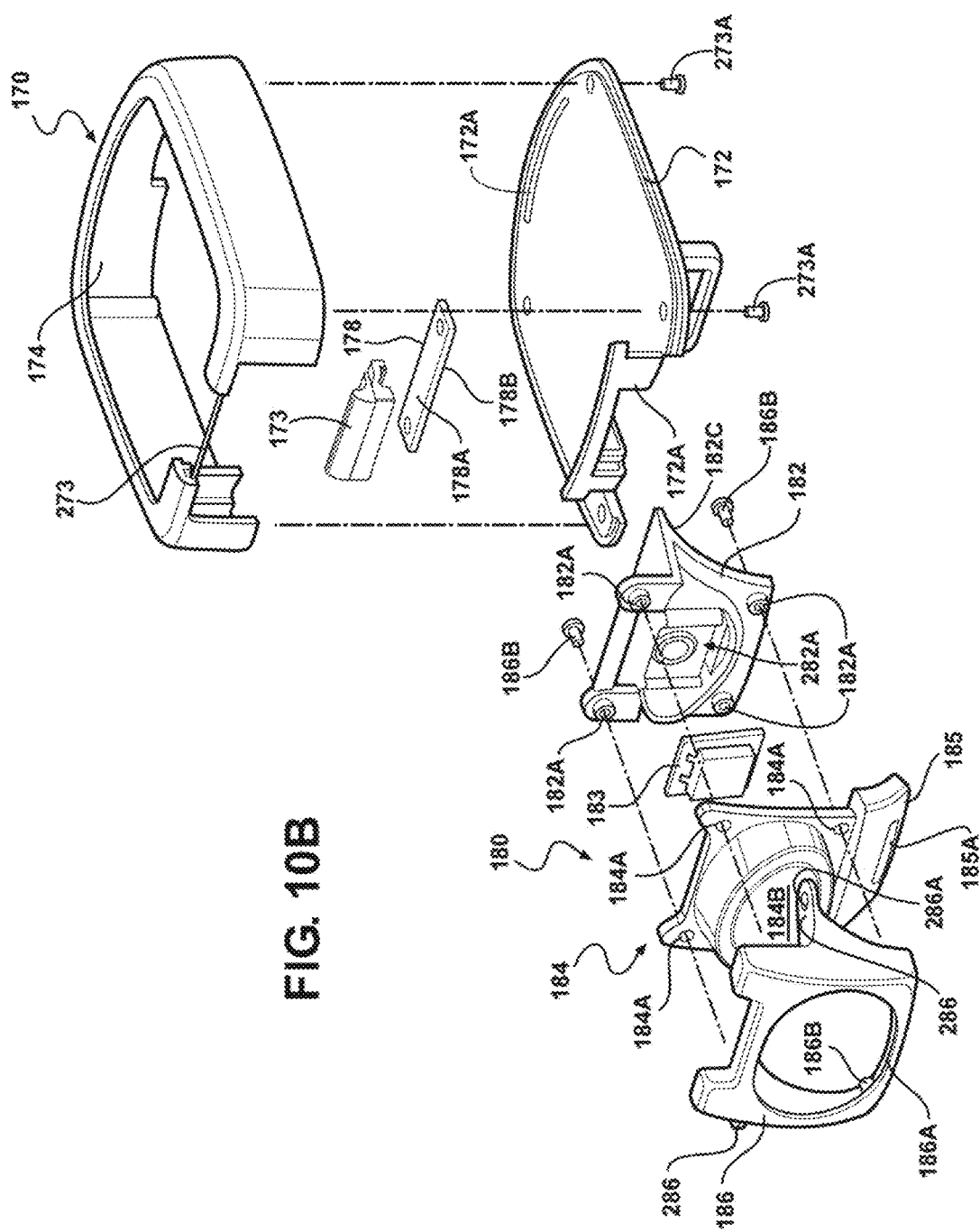

|  | No Obstacle | Obstacle Detected Zone 3 | Obstacle Detected Zone 2 | Obstacle Detected Zone 1 |
|---|---|---|---|---|
| 0-999 lb Load | 4.5 mph | 3.5 mph | 2.5 mph | Stop |
| 1000-2999 lb Load | 4.0 mph | 3.0 mph | 2.0 mph | Stop |
| 3000-4999 lb Load | 3.5 mph | 2.5 mph | 1.5 mph | Stop |
| 5000-6999 lb Load | 3.0 mph | 2.0 mph | 1.0 mph | Stop |
| 7000-8000 lb Load | 2.5 mph | 1.5 mph | Stop | Stop |

FIG. 11

SENSOR CONFIGURATION FOR A MATERIALS HANDLING VEHICLE

CROSS REFERENCE TO RELATED APPLICATIONS

This application is a continuation of U.S. patent application Ser. No. 13/785,640, filed Mar. 5, 2013, entitled "SENSOR CONFIGURATION FOR A MATERIALS HANDLING VEHICLE," which is a continuation-in-part of U.S. patent application Ser. No. 12/649,738, filed Dec. 30, 2009, entitled "APPARATUS FOR REMOTELY CONTROLLING A MATERIALS HANDLING VEHICLE," and a continuation-in-part of International Patent Application Serial No. PCT/US09/69839, filed Dec. 30, 2009, entitled "APPARATUS FOR REMOTELY CONTROLLING A MATERIALS HANDLING VEHICLE," which each claim the benefit of U.S. Provisional Patent Application Ser. No. 61/222,632, filed Jul. 2, 2009, entitled "APPARATUS FOR REMOTELY CONTROLLING A MATERIALS HANDLING VEHICLE," the entire disclosures of each of which are hereby incorporated by reference herein. This application claims the benefit of the filing date of U.S. Provisional Patent Application Ser. No. 61/222,632 through U.S. patent application Ser. No. 13/785,640, which is currently pending in the United States Patent and Trademark Office. This application is also a continuation-in-part of U.S. patent application Ser. No. 12/631,007, filed Dec. 4, 2009, entitled "MULTIPLE ZONE SENSING FOR MATERIALS HANDLING VEHICLES," and a continuation-in-part of International Patent Application Serial No. PCT/US09/66789, filed Dec. 4, 2009, entitled "MULTIPLE ZONE SENSING FOR MATERIALS HANDLING VEHICLES," which each claim the benefit of U.S. Provisional Patent Application Ser. No. 61/119,952, filed Dec. 4, 2008, entitled "MULTIPLE ZONE SENSING FOR REMOTELY CONTROLLED MATERIALS HANDLING VEHICLES," the entire disclosures of each of which are hereby incorporated by reference herein. This application claims the benefit of the filing date of U.S. Provisional Patent Application Ser. No. 61/119,952 through U.S. patent application Ser. No. 13/785,640, which is currently pending in the United States Patent and Trademark Office. This application is also a continuation-in-part of U.S. patent application Ser. No. 12/649,815, filed Dec. 30, 2009, entitled "STEER CORRECTION FOR A REMOTELY OPERATED MATERIALS HANDLING VEHICLE," and a continuation-in-part of International Patent Application Serial No. PCT/US09/69833, filed Dec. 30, 2009, entitled "STEER CORRECTION FOR A REMOTELY OPERATED MATERIALS HANDLING VEHICLE," which each claim the benefit of U.S. Provisional Patent Application Ser. No. 61/234,866, filed Aug. 18, 2009, entitled "STEER CORRECTION FOR A REMOTELY OPERATED MATERIALS HANDLING VEHICLE," the entire disclosures of each of which are hereby incorporated by reference herein. This application claims the benefit of the filing date of U.S. Provisional Patent Application Ser. No. 61/234,866 through U.S. patent application Ser. No. 13/785,640, which is currently pending in the United States Patent and Trademark Office. This application is also a continuation-in-part of U.S. patent application Ser. No. 13/011,366, filed Jan. 21, 2011, entitled "SYSTEMS AND METHODS OF REMOTELY CONTROLLING A MATERIALS HANDLING VEHICLE," and a continuation-in-part of International Patent Application Serial No. PCT/US12/22011, filed Jan. 20, 2012, entitled "SYSTEM FOR REMOTELY CONTROLLING A MATERIALS HANDLING VEHICLE," the entire disclosures of each of which are hereby incorporated by reference herein.

BACKGROUND OF THE INVENTION

The present invention relates in general to materials handling vehicles, and more particularly, to sensor configurations for detecting objects in or near a path of travel of a vehicle.

Low level order picking trucks are commonly used for picking stock in warehouses and distribution centers. Such order picking trucks typically include load carrying forks, a power unit and a platform upon which an operator may step and ride while controlling the truck. The power unit has a steerable wheel and corresponding traction and steering control mechanisms, e.g., a movable steering arm that is coupled to the steerable wheel. A control handle attached to the steering arm typically includes the operational controls necessary for operating the truck, such as controls for raising and lowering the forks and for controlling the speed and direction (forward or reverse) of the truck.

In a typical stock picking operation, an operator fills orders from available stock items that are located in storage areas provided on both sides of a plurality of aisles of a warehouse or distribution center. The operator drives a low lever order picking truck to a first location where item(s) on a first order are to be picked. In a pick process, the operator retrieves the ordered stock item(s) from their associated storage area(s) and places the picked stock on a pallet, collection cage or other support structure carried by the forks of the order picking truck. The operator then advances the order picking truck to the next location where item(s) are to be picked. The above process is repeated until all stock items on the order(s) have been picked.

The operator normally steps onto the truck platform to ride on the order picking truck when the distance between consecutive picks is longer, for example twenty or more feet (approximately 6.1 meters). Correspondingly, the operator walks alongside the truck when the distance along the route between consecutive picks is short. Accordingly, some order picking trucks include jog switches located on the truck in the vicinity of the forks and/or on or near the control handle. The jog switches can be used by an operator walking alongside the order picking truck to accelerate the truck to a walking speed, typically between approximately 1.6 miles per hour (3.3 kilometers per hour) to around 3.5 miles per hour (5.6 kilometers per hour) to move from one stock pick location to the next stock pick location without the need to step onto the platform of the order picking truck. However, for such actions, the operator is required to interrupt picking while the order picking truck is relocated to the next location. Thus, the operator may be required to move out of a desired working position or modify a desired walking route to reach the jog switches.

It is not uncommon for an operator to be required to repeat the pick process several hundred times per order. Moreover, the operator may be required to pick numerous orders per shift. As such, the operator may be required to spend a considerable amount of time relocating and repositioning the order picking truck, which reduces the time available for the operator to spend picking stock.

SUMMARY OF THE INVENTION

According to a first aspect of the present invention, a materials handling vehicle comprises a power unit; a load handling assembly coupled to the power unit; at least one obstacle detector mounted to the power unit; and a controller. The at least one obstacle detector detects object located along a path of travel of the power unit, and generate a distance signal upon detecting an object corresponding to a distance between the detected object and the power unit. The controller receives the distance signal and generates a corresponding vehicle stop or predetermined maximum allowable speed signal based on the distance signal, wherein if a sensed object is located within a speed zone associated with a predetermined maximum allowable travel speed comprising a fixed speed greater than zero (0) miles per hour, as determined by the distance signal, the vehicle speed is reduced to the predetermined maximum allowable vehicle speed.

The materials handling vehicle may further comprise a load sensor to generate a weight signal indicative of a weight of a load on the load handling assembly. The controller may receive the distance signal and the weight signal to generate a corresponding vehicle stop or predetermined maximum allowable speed signal based on the distance and weight signals. For a given first load weight, if a sensed object is located at a distance within a first detection zone, a stop signal may be generated by the controller to effect stopping of the vehicle. For the given first load weight, if a sensed object is located at a distance within a second detection zone comprising the speed zone spaced further away from the power unit than the first detection zone, then the predetermined maximum allowable vehicle speed may be defined corresponding to the first load weight and an object being detected in the second detection zone. For the given first load weight, if a sensed object is located at a distance within a third detection zone spaced further away from the power unit than the first and second detection zones, then a second predetermined maximum allowable vehicle speed comprising a fixed speed greater than the first predetermined maximum speed may be defined corresponding to the first load weight and an object being detected in the third detection zone.

The materials handling vehicle may further comprise a presence sensor that detects the presence of an operator in the operator's station of the materials handling vehicle, wherein the controller is responsive to remote travel requests and determines whether to implement each remote travel request based on the evaluation of at least one vehicle condition, the at least one vehicle condition evaluated by the controller comprising a status of the presence sensor, wherein the controller is configured to decide to not implement the remote travel request if the status from the presence sensor is indicative of the presence of an operator in the operator's station of the materials handling vehicle. The remote travel request may comprise a wireless travel request sent by a wireless remote control device donned by an operator interacting with the materials handling vehicle.

According to a second aspect of the present invention, a materials handling vehicle comprises a power unit; a load handling assembly coupled to the power unit; at least one obstacle detector mounted to the power unit; a load sensor; and a controller. The at least one obstacle detector detects object located along a path of travel of the power unit, and generate a distance signal upon detecting an object corresponding to a distance between the detected object and the power unit. The load sensor generates a weight signal indicative of a weight of a load on the load handling assembly. The controller receives the distance signal and the weight signal and generates a corresponding vehicle stop or predetermined maximum allowable speed signal based on the distance and weight signals, wherein if a sensed object is located within a speed zone associated with a predetermined maximum allowable travel speed comprising a fixed speed greater than zero (0) miles per hour, as determined by the distance signal, the vehicle speed is reduced to the predetermined maximum allowable vehicle speed.

BRIEF DESCRIPTION OF THE SEVERAL VIEWS OF THE DRAWINGS

The following description of the preferred embodiments of the present invention can be best understood when read in conjunction with the following drawings, where like structure is indicated with like reference numerals, and in which:

FIGS. 10A, 10C, 10D, and 10E illustrate various views of the finger-mounted remote control device of FIGS. 9A and 9B;

FIG. 10B is an exploded view of the finger-mounted remote control device of FIGS. 9A and 9B;

FIG. 11 illustrates example lookup table data;

DETAILED DESCRIPTION OF THE INVENTION

In the following detailed description of the illustrated embodiments, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of various embodiments of the present invention.

Low Level Order Picking Truck

Figure 1:
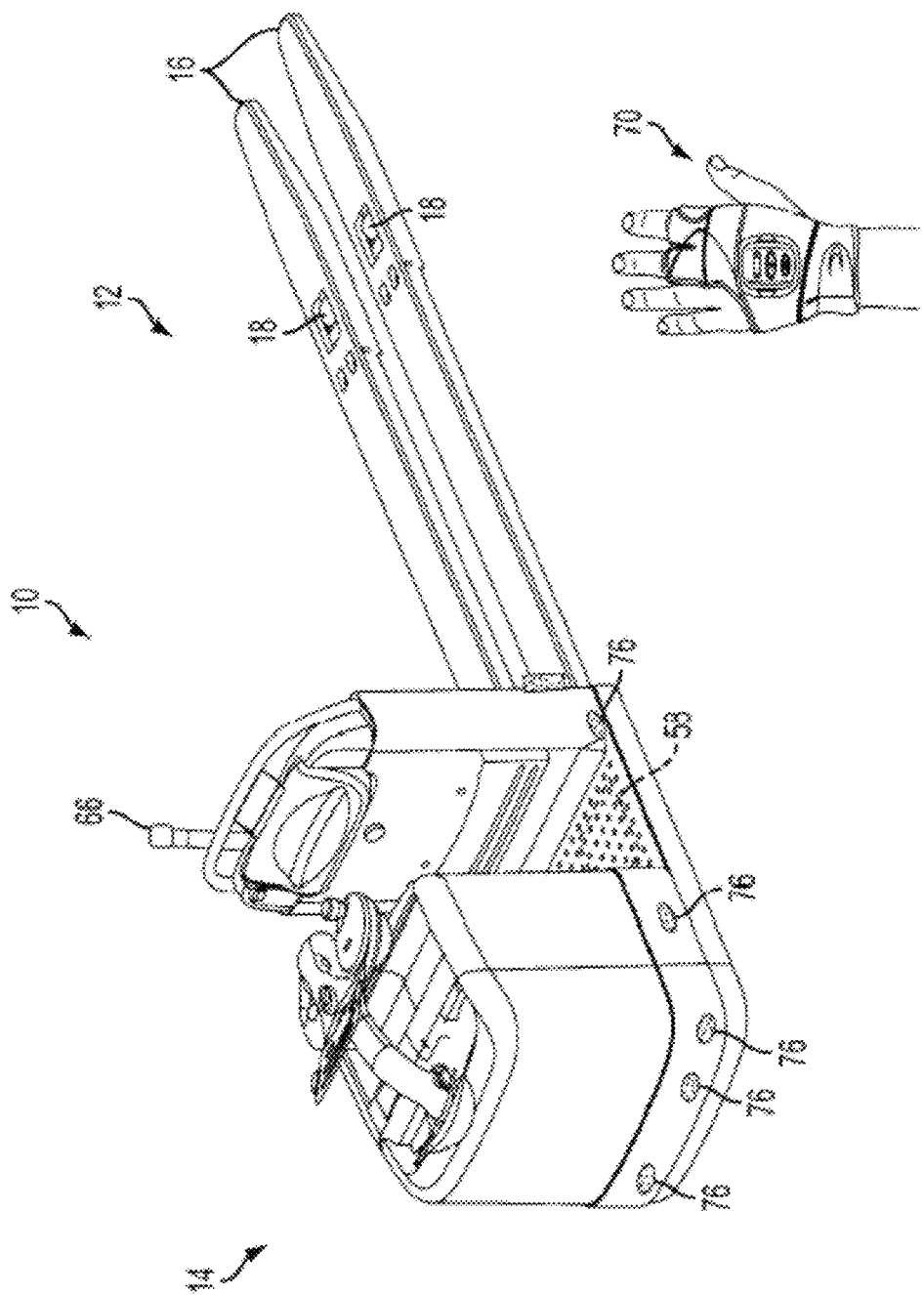
FIG. 1 is an illustration of a materials handling vehicle capable of remote control according to various aspects of the present invention.

Referring now to the drawings, and particularly to FIG. 1, a materials handling vehicle, which is illustrated as a low level order picking truck 10, includes in general a load handling assembly 12 that extends from a power unit 14. The load handling assembly 12 includes a pair of forks 16, each fork 16 having a load supporting wheel assembly 18. The load handling assembly 12 may include other load handling features in addition to, or in lieu of the illustrated arrangement of the forks 16, such as a load backrest, scissors-type elevating forks, outriggers or separate height adjustable forks. Still further, the load handling assembly 12 may include load handling features such as a mast, a load platform, collection cage or other support structure carried by the forks 16 or otherwise provided for handling a load supported and carried by the truck 10.

The illustrated power unit 14 comprises a step-through operator's station dividing a first end section of the power unit 14 (opposite the forks 16) from a second end section (proximate the forks 16). The step-through operator's station provides a platform upon which an operator may stand to drive the truck 10. The platform also provides a position from which the operator may operate the load handling features of the truck 10. Presence sensors 58 may be provided, e.g., on, above, or under the platform floor of the operator's station. Still further, presence sensors 58 may be otherwise provided about the operator's station to detect the presence of an operator on the truck 10. In the exemplary truck of FIG. 1, the presence sensors 58 are shown in dashed lines indicating that they are positioned under the platform floor. Under this arrangement, the presence sensors 58 may comprise load sensors, switches, etc. As an alternative, the presence sensors 58 may be implemented above the platform 56, such as by using ultrasonic, capacitive or other suitable sensing technology.

An antenna 66 extends vertically from the power unit 14 and is provided for receiving control signals from a corresponding remote control device 70. The remote control device 70 may comprise a transmitter that is worn or otherwise maintained by the operator. As an example, the remote control device 70 may be manually operable by an operator, e.g., by pressing a button or other control, to cause the device 70 to wirelessly transmit at least a first type signal designating a travel request to the vehicle, thus requesting the vehicle to travel by a predetermined amount. The remote control device 70 may comprise a glove-like structure 70, see FIG. 1, such as disclosed in U.S. Provisional Patent Application Ser. No. 60/825,688, filed Sep. 14, 2006 entitled "SYSTEMS AND METHODS OF REMOTELY CONTROLLING A MATERIALS HANDLING VEHICLE," U.S. patent application Ser. No. 11/855,310, entitled "SYSTEMS AND METHODS OF REMOTELY CONTROLLING A MATERIALS HANDLING VEHICLE," or U.S. patent application Ser. No. 11/855,324, entitled "SYSTEMS AND METHODS OF REMOTELY CONTROLLING A MATERIALS HANDLING VEHICLE," the disclosures of each of which are incorporated by reference herein.

Figure 9B:
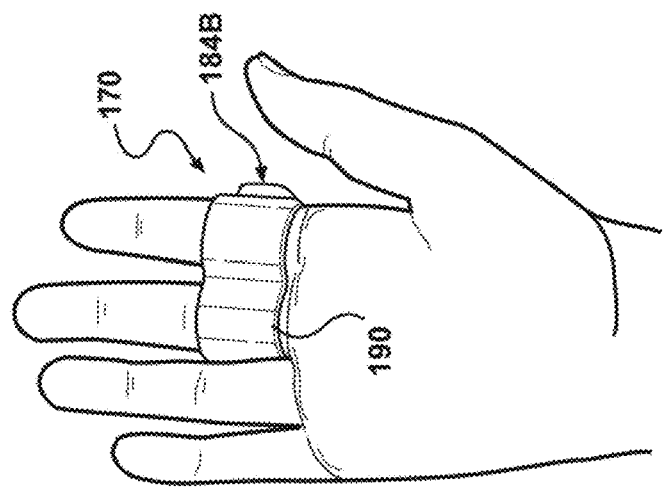
FIGS. 9A and 9B are views illustrating a finger-mounted remote control device mounted to fingers of an operator.
Figure 9A:
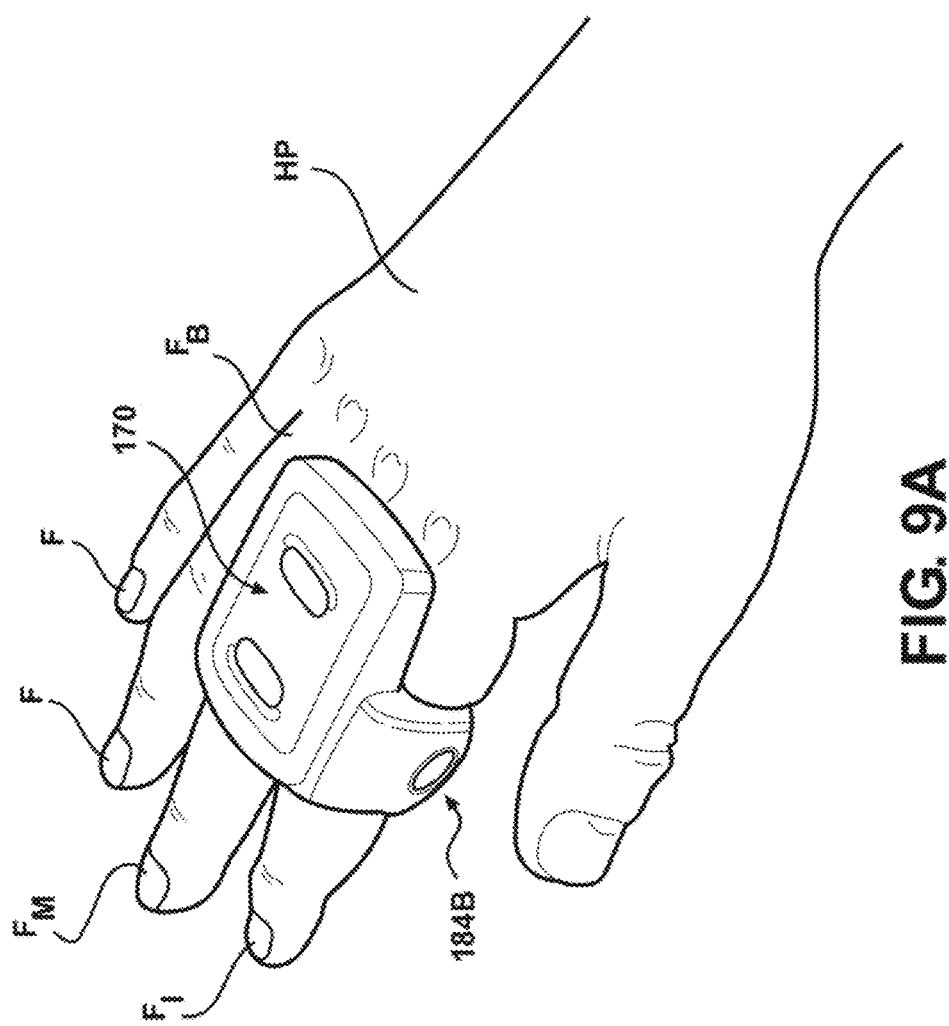
Figure 10E:
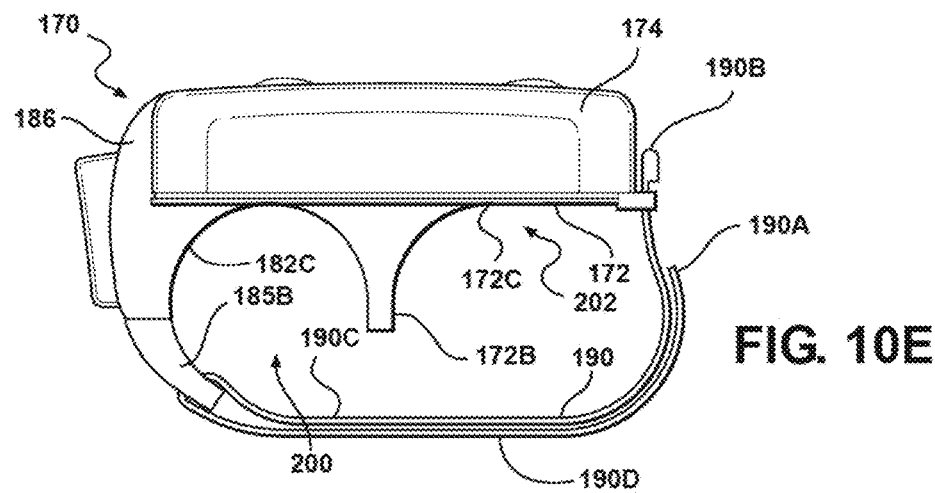
Figure 10F:
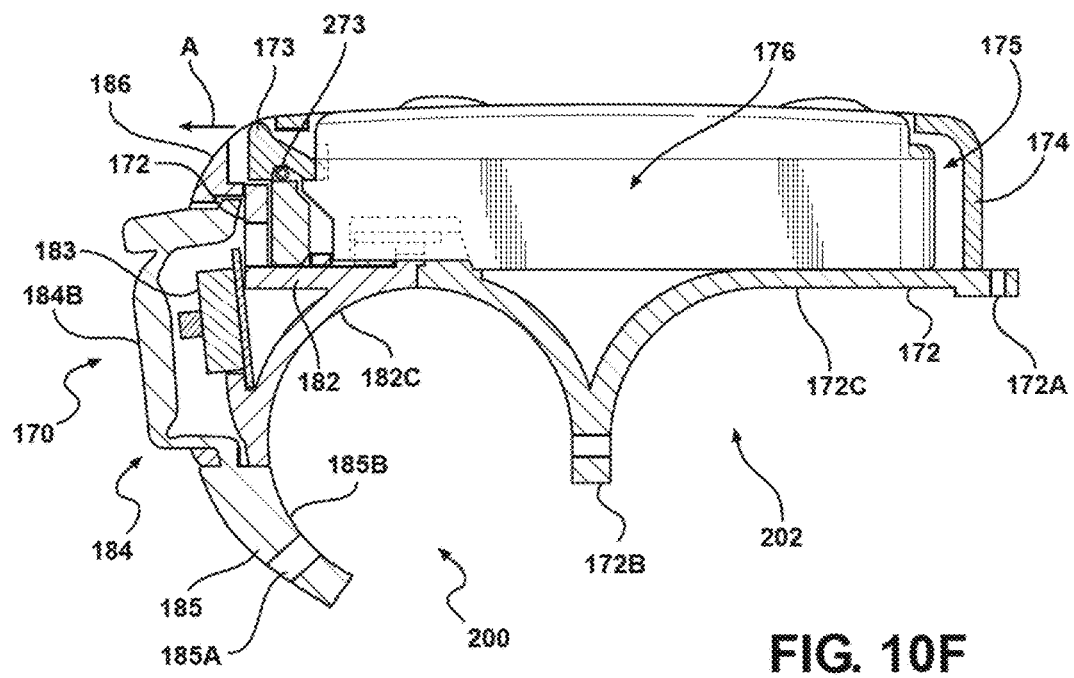
FIG. 10F is a cross sectional view of the finger-mounted remote control device of FIGS. 9A and 9B.

The remote control device may alternatively comprise a finger-mounted remote control device 170, as illustrated in FIGS. 9A, 9B and 10A-10F. The finger-mounted remote control device 170 comprises, in the illustrated embodiment, a polymeric rigid base 172, a polymeric rigid upper housing 174 and a pivotable latch 173 coupled to the base 172 via a generally straight spring rod 273 so as to be spring biased to a home/locking position, as shown in FIG. 10F. The latch 173 can be moved generally linearly/laterally against the bias of the spring bar 273 in a direction, designated by arrow A in FIG. 10F, to a release position. The base and upper housing 172 and 174 are coupled together via screws 273A and define a docking area 175 for removably receiving a wireless transmitter/power pack unit 176. The base and upper housing 172 and 174 may alternatively be coupled together via an adhesive or an ultrasonic welding operation. The wireless transmitter/power pack unit 176 may comprise the components found in the communications device set out in U.S. patent application Ser. No. 11/855,324, entitled "SYSTEMS AND METHODS OF REMOTELY CONTROLLING A MATERIALS HANDLING VEHICLE," the disclosure of which is incorporated by reference herein. In the illustrated embodiment, a transmitter antenna is also housed in the wireless transmitter/power pack unit 176.

The wireless transmitter/power pack unit 176 is releasably held within the docking area 175 via the latch 173, see FIG. 10F. A contact plate 178 is mounted to the base 172 via screws or pins molded into the base 172 and swaged over the plate (not shown) and includes one or more contacts (not shown) on an upper surface 178A of the contact plate 178 for engaging corresponding contacts on the wireless transmitter/power pack unit 176. The wireless transmitter/power pack unit 176 can be removed from the docking area 175 for recharging a power pack or battery contained therein. It is also contemplated that the wireless transmitter/power pack unit 176 may be non-removable, i.e., integral with or sealed within the base 172 and upper housing 174. In this latter embodiment, the wireless transmitter/power pack unit 176 includes a receptacle (not shown) for receiving an AC adapter for charging the power or battery pack.

The rigid base 172 is provided with a first slot 172A for receiving a holding strap 190, which will be discussed below, see FIGS. 10D and 10E. The rigid base 172 also has a finger-engaging extension 172B extending downward from a lower surface 172C of the base 172 so as to define a portion of a first finger receiving area 200 and a second finger receiving area 202, see FIG. 10F.

The finger-mounted remote control device 170 further comprises control structure 180. The control structure 180 comprises a backing plate 182 having a recess 282A and a two-state switch 183 received in the recess 282A. Conductors or wires (not shown) extend from the switch 183 to a lower surface 178B of the contact plate 178 such that signals generated by the switch 183 when activated, as will be discussed below, are delivered via the conductors to the contact plate 178 and from the contact plate 178 to the transmitter/power pack unit 176. The backing plate 182 further comprises four bores 182A and a curved lower surface 182C, which defines a portion of the first finger receiving area 200, see FIGS. 10B, 10E and 10F.

The control structure 180 further comprises a button and support plate assembly 184. The support plate assembly 184 may be formed from a rigid polymeric material and comprises four bores 184A that align with the four bores 182A in the backing plate 182. A "Go" button 184B, defined by a flexible polymeric member, is integral with or coupled to a surrounding portion of the support plate 184. The button 184B covers the switch 183. A lower portion 185 of the support plate assembly 184 is provided with a second slot 185A for receiving the holding strap 190. A curved lower surface 185B of the support plate lower portion 185 defines a portion of the first finger receiving area 200, see FIGS. 10E and 10F. An outer cover plate 186 having an opening 186A is fitted over the button and support plate assembly 184. Four screws 186B extend through the bores 182A in the backing plate 182 and the bores 184A in the support plate 184 and are received in threaded openings (not shown) in the outer cover plate 186. The cover plate 186 further comprises first and second laterally extending ears 286 provided with bores 286A through which two of the bolts 273A, noted above, pass. Hence, the bolts 273 couple the control structure 180 to the base and upper housing 172 and 174.

As illustrated in FIGS. 9A and 9B, the remote control device 170 is adapted to be fitted over index and middle fingers $F_I$ and $F_M$ of an operator, wherein the index finger is received in the first finger receiving area 200 and the middle finger is received in the second finger receiving area 202. Both right and left hand versions of the control device 170 may be created.

The finger-mounted remote control device 170 is compact. As is apparent from FIGS. 9A and 9B, substantially the entirety of the remote control device 170 is mounted and positioned directly over the index and middle fingers $F_I$ and $F_M$ of an operator. Hence, approximately 60% or more of the wireless transmitter/power pack unit 176 is positioned directly over the operator's fingers F while a small remaining portion extends over the hand portion HP extending away from the base $F_B$ of the fingers F, see FIG. 9.

The control device 170 is releasably held on the operator's index and middle fingers via the holding strap 190. A first end 190A of the holding strap 190 is threaded through the first slot 172A in the rigid base 172 and the second slot 185A in the lower portion 185 of the support plate 184. A second end 190B of the strap 190 is enlarged so as not to pass through the first slot 172A, see FIG. 10E. A first portion 190C of the strap 190, extending generally from the strap second end 190B to the second slot 185A, extends across the operator's index and middle fingers, see FIG. 9. A second portion 190D of the strap 190, extending generally from the second slot 185A to the strap first end 190A, is folded back onto the strap first portion 190C and releasably attached to the strap first portion 190C such as by hook and loop fasteners, i.e., Velcro (trademark) or like fastening structure. It is noted that other types of mounting straps 190 may be used, such as, for example expandable/flexible straps, rigid or flexible rings, etc.

It is contemplated that the finger-mounted remote control device 170 may be worn by an operator over a glove. In the illustrated embodiment, the finger-mounted remote control device 170 is durable and long lasting since the rigid base 172, the upper housing 174 and the outer cover plate 186 are preferably formed from a durable and rigid polymeric material, such as acrylonitrile butadiene styrene (ABS), polycarbonate or nylon. The rigid base 172, the upper housing 174 and the outer cover plate 186 define a durable, generally non-flexible and rigid mounting structure 270.

An operator can easily manually actuate the go button 184B via his thumb, thereby actuating the switch 183, to cause the wireless transmitter/power pack unit 176 to wirelessly transmit at least a first type signal designating a travel request or command to the vehicle. It is contemplated that the travel request may result in the vehicle 10 traveling by a predetermined distance or for a predetermined amount of time. It is also contemplated that a brief actuation of the go button 184B may result in the vehicle 10 traveling for a predetermined distance or for a predetermined amount of time, while a prolonged actuation of the go button 184B may result in continuous movement of the vehicle 10 until the go button 184B is released.

It is noted that the finger-mounted remote control device 170 described herein is an exemplary configuration and may be structurally modified without departing from the spirit and scope of the invention. For example, one or more components of the finger-mounted remote control device 170 may be combined in an integral component, or components may be substituted for alternate components that effect a similar/identical purpose. As a few examples, the support plate assembly 184 and the outer cover plate 186 may be combined into an integral piece, which integral piece may be coupled to the backing plate 182 by structure other than screws 186B.

The truck 10 also comprises one or more obstacle sensors 76, which are provided about the vehicle, e.g., towards the first end section of the power unit 14 and/or to the sides of the power unit 14. The obstacle sensors 76 include at least one contactless obstacle sensor on the vehicle, and are operable to define at least one detection zone (also referred to herein as scan zones), each detection zone defining an area at least partially in front of a forward traveling direction of the vehicle when the vehicle is traveling under remote control in response to a travel request as will be described in greater detail herein. The obstacle sensors 76 may comprise any suitable proximity detection technology, such as ultrasonic sensors, optical recognition devices, infrared sensors, laser sensors, etc., which are capable of detecting the presence of objects/obstacles within the predefined detection zones of the power unit 14.

In practice, the truck 10 may be implemented in other formats, styles and features, such as an end control pallet truck that includes a steering tiller arm that is coupled to a tiller handle for steering the truck. In this regard, the truck 10 may have similar or alternative control arrangements to that shown in FIG. 1. Still further, the truck 10, remote control system and/or components thereof, may comprise any additional and/or alternative features, such as set out in U.S. Provisional Patent Application Ser. No. 60/825,688, filed Sep. 14, 2006 entitled "SYSTEMS AND METHODS OF REMOTELY CONTROLLING A MATERIALS HANDLING VEHICLE;" U.S. patent application Ser. No. 11/855,310, filed Sep. 14, 2007 entitled "SYSTEMS AND METHODS OF REMOTELY CONTROLLING A MATERIALS HANDLING VEHICLE;" U.S. patent application Ser. No. 11/855,324, filed Sep. 14, 2007 entitled "SYSTEMS AND METHODS OF REMOTELY CONTROLLING A MATERIALS HANDLING VEHICLE;" U.S. Provisional Patent Application Ser. No. 61/119,952, filed Dec. 4, 2008 entitled "MULTIPLE ZONE SENSING FOR REMOTELY CONTROLLED MATERIALS HANDLING VEHICLES;" U.S. Provisional Patent Application Ser. No. 61/234,866, filed Aug. 18, 2009, entitled "STEER CORRECTION FOR A REMOTELY OPERATED MATERIALS HANDLING VEHICLE;" and/or U.S. Pat. No. 7,017,689, issued Mar. 28, 2006, entitled "ELECTRICAL STEERING ASSIST FOR MATERIAL HANDLING VEHICLE," the entire disclosures of which are each hereby incorporated by reference herein.

Control System for Remote Control of a Low Level Order Picking Truck

Figure 2:
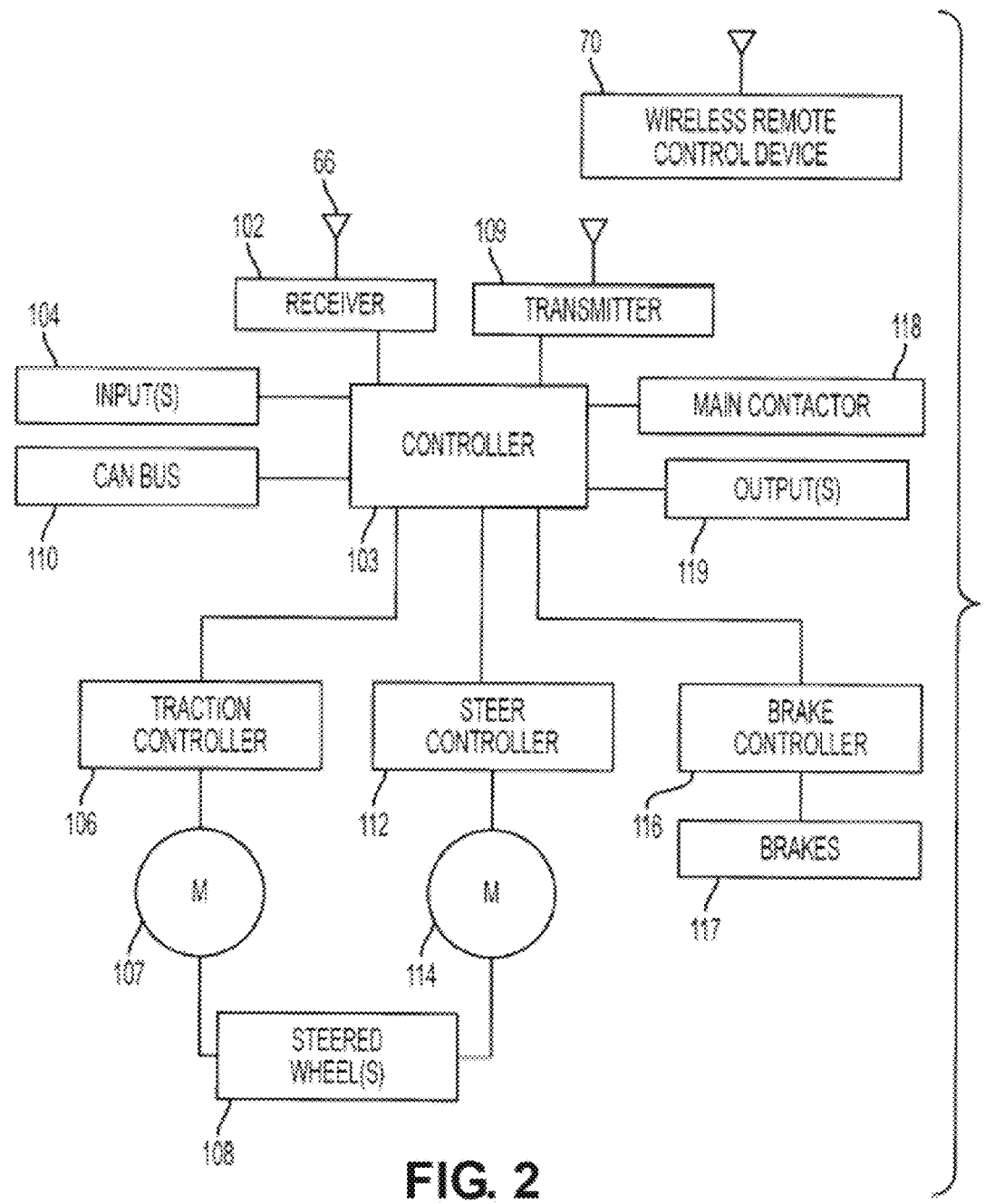
FIG. 2 is a schematic diagram of several components of a materials handling vehicle capable of remote control according to various aspects of the present invention.

Referring to FIG. 2, a block diagram 100 illustrates a control arrangement for integrating remote control commands with the truck 10. The antenna 66 is coupled to a receiver 102 for receiving commands issued by the remote control device 70, 170. The receiver 102 passes the received control signals to a controller 103, which implements the appropriate response to the received commands. The response may comprise one or more actions, or inaction, depending upon the logic that is being implemented. Positive actions may comprise controlling, adjusting or otherwise affecting one or more components of the truck 10. The controller 103 may also receive information from other inputs 104, e.g., from sources such as the presence sensors 58, the obstacle sensors 76, switches, load sensors, encoders and other devices/features available to the truck 10 to determine appropriate action in response to the received commands from the remote control device 70, 170. The sensors 58, 76, etc. may be coupled to the controller 103 via the inputs 104 or via a suitable truck network, such as a control area network (CAN) bus 110.

In an exemplary arrangement, the remote control device 70, 170 is operative to wirelessly transmit a control signal that represents a first type signal such as a travel command to the receiver 102 on the truck 10. The travel command is also referred to herein as a "travel signal", "travel request" or "go signal". The travel request is used to initiate a request to the truck 10 to travel by a predetermined amount, e.g., to cause the truck 10 to advance or jog in a first direction by a limited travel distance. The first direction may be defined, for example, by movement of the truck 10 in a power unit 14 first, i.e., forks 16 to the back, direction. However, other directions of travel may alternatively be defined. Moreover, the truck 10 may be controlled to travel in a generally straight direction or along a previously determined heading. Correspondingly, the limited travel distance may be specified by an approximate travel distance, travel time or other measure.

Thus, a first type signal received by the receiver 102 is communicated to the controller 103. If the controller 103 determines that the travel signal is a valid travel signal and that the current vehicle conditions are appropriate (explained in greater detail below), the controller 103 sends a signal to the appropriate control configuration of the particular truck 10 to advance and then stop the truck 10. As will be described in greater detail herein, stopping the truck 10 may be implemented, for example, by either allowing the truck 10 to coast to a stop or by applying a brake to stop the truck.

As an example, the controller 103 may be communicably coupled to a traction control system, illustrated as a traction motor controller 106 of the truck 10. The traction motor controller 106 is coupled to a traction motor 107 that drives at least one steered wheel 108 of the truck 10. The controller 103 may communicate with the traction motor controller 106 so as to accelerate, decelerate, adjust and/or otherwise limit the speed of the truck 10 in response to receiving a travel request from the remote control device 70, 170. The controller 103 may also be communicably coupled to a steer controller 112, which is coupled to a steer motor 114 that steers at least one steered wheel 108 of the truck 10. In this regard, the truck may be controlled by the controller 103 to travel an intended path or maintain an intended heading in response to receiving a travel request from the remote control device 70, 170.

As yet another illustrative example, the controller 103 may be communicably coupled to a brake controller 116 that controls truck brakes 117 to decelerate, stop or otherwise control the speed of the truck in response to receiving a travel request from the remote control device 70, 170. Still further, the controller 103 may be communicably coupled to other vehicle features, such as main contactors 118, and/or other outputs 119 associated with the truck 10, where applicable, to implement desired actions in response to implementing remote travel functionality.

According to various aspects of the present invention, the controller 103 may communicate with the receiver 102 and with the traction controller 106 to operate the vehicle under remote control in response to receiving travel commands from the associated remote control device 70, 170. Moreover, the controller 103 may be configured to perform a first action if the vehicle is traveling under remote control in response to a travel request and an obstacle is detected in a first one of the detection zones. The controller 103 may be further configured to perform a second action different from the first action if the vehicle is traveling under remote control in response to a travel request and an obstacle is detected in a second one of the detection zones. In this regard, when a travel signal is received by the controller 103 from the remote control device 70, 170, any number of factors may be considered by the controller 103 to determine whether the travel signal should be acted upon and what action(s) should be taken, if any. The particular vehicle features, the state/condition of one or more vehicle features, vehicle environment, etc., may influence the manner in which controller 103 responds to travel requests from the remote control device 70, 170.

The controller 103 may also refuse to acknowledge the travel signal depending upon vehicle condition(s), e.g., that relate to environmental or/operational factor(s). For example, the controller 103 may disregard an otherwise valid travel request based upon information obtained from one or more of the sensors 58, 76. For example, according to various aspects of the present invention, the controller 103 may optionally consider factors such as whether an operator is on the truck 10 when determining whether to respond to a travel command from the remote control device 70, 170. For example, as noted above, the truck 10 may comprise at least one presence sensor 58 for detecting whether an operator is positioned on the vehicle. In this regard, the controller 103 may be further configured to respond to a travel request to operate the vehicle under remote control when the presence sensor(s) 58 designate that no operator is on the vehicle.

Any other number of reasonable conditions may also/alternatively be implemented by the controller 103 to interpret and take action in response to received signals. Other exemplary factors are set out in greater detail in U.S. Provisional Patent Application Ser. No. 60/825,688, filed Sep. 14, 2006 entitled "SYSTEMS AND METHODS OF REMOTELY CONTROLLING A MATERIALS HANDLING VEHICLE," U.S. patent application Ser. No. 11/855,310, filed Sep. 14, 2007 entitled "SYSTEMS AND METHODS OF REMOTELY CONTROLLING A MATERIALS HANDLING VEHICLE," U.S. patent application Ser. No. 11/855,324, filed Sep. 14, 2007 entitled "SYSTEMS AND METHODS OF REMOTELY CONTROL- LING A MATERIALS HANDLING VEHICLE," U.S. Provisional Patent Application Ser. No. 61/119,952, filed Dec. 4, 2008 entitled "MULTIPLE ZONE SENSING FOR REMOTELY CONTROLLED MATERIALS HANDLING VEHICLES," and U.S. Provisional Patent Application Ser. No. 61/234,866, filed Aug. 18, 2009, entitled "STEER CORRECTION FOR A REMOTELY OPERATED MATERIALS HANDLING VEHICLE," the disclosures of which are each already incorporated by reference herein.

Upon acknowledgement of a travel request, the controller 103 interacts with the traction motor controller 106, e.g., directly, indirectly, via the CAN bus 110, etc., to advance the truck 10. Depending upon the particular implementation, the controller 103 may interact with the traction motor controller 106 to advance the truck 10 by a predetermined distance. Alternatively, the controller 103 may interact with the traction motor controller 106 to advance the truck 10 for a period of time in response to the detection and maintained actuation of a travel control on the remote 70. Further alternatively, the truck 10 may be configured to jog for as long as a travel control signal is received. Still further alternatively, the controller 103 may be configured to "time out" and stop the travel of the truck 10 based upon a predetermined event, such as exceeding a predetermined time period or travel distance regardless of the detection of maintained actuation of a corresponding control on the remote control device 70, 170.

The remote control device 70, 170 may also be operative to transmit a second type signal, such as a "stop signal", designating that the truck 10 should brake and/or otherwise come to rest. The second type signal may also be implied, e.g., after implementing a "travel" command, e.g., after the truck 10 has traveled a predetermined distance, traveled for a predetermined time, etc., under remote control in response to the travel command. If the controller 103 determines that the signal is a stop signal, the controller 103 sends a signal to the traction controller 106, the brake controller 116 and/or other truck component to bring the truck 10 to a rest. As an alternative to a stop signal, the second type signal may comprise a "coast signal", designating that the truck 10 should coast, eventually slowing to rest or a "controlled deceleration signal."

The time that it takes to bring the truck 10 to a complete rest may vary, depending for example, upon the intended application, the environmental conditions, the capabilities of the particular truck 10, the load on the truck 10 and other similar factors. For example, after completing an appropriate jog movement, it may be desirable to allow the truck 10 to "coast" some distance before coming to rest so that the truck 10 stops slowly. This may be achieved by utilizing regenerative braking to slow the truck 10 to a stop. Alternatively, a braking operation may be applied after a predetermined delay time to allow a predetermined range of additional travel to the truck 10 after the initiation of the stop operation. It may also be desirable to bring the truck 10 to a relatively quicker stop, e.g., if an object is detected in the travel path of the truck 10 or if an immediate stop is desired after a successful jog operation. For example, the controller may apply predetermined torque to the braking operation. Under such conditions, the controller 103 may instruct the brake controller 116 to apply the brakes 117 to stop the truck 10.

Detection Zones of a Materials Handling Vehicle

Figure 3:
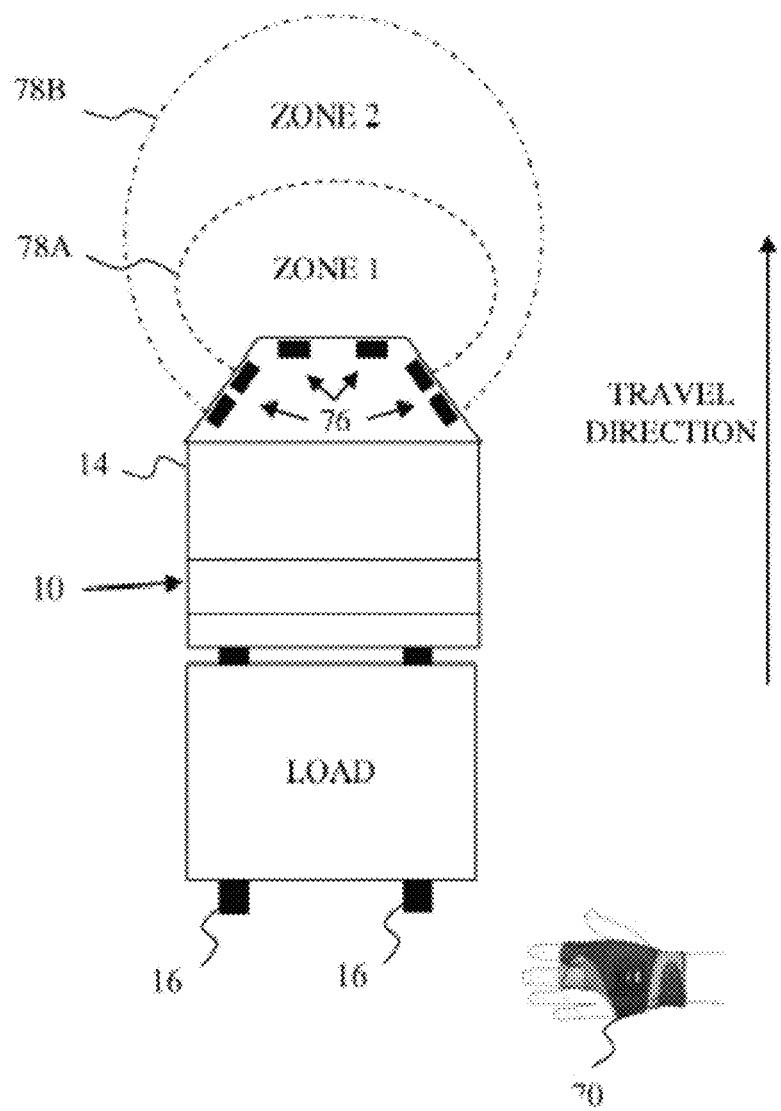
FIG. 3 is a schematic diagram illustrating detection zones of a materials handling vehicle according to various aspects of the present invention.

Referring to FIG. 3, according to various aspects of the present invention, one or more obstacle sensors 76 are configured so as to collectively enable detection of objects/obstacles within multiple "detection zones". In this regard, the controller 103 may be configured to alter one or more operational parameters of the truck 10 in response to detection of an obstacle in one or more of the detection zones as set out in greater detail herein. The control of the vehicle utilizing detection zones may be implemented when an operator is riding/driving the vehicle. The control of the vehicle utilizing detection zones may also be integrated with supplemental remote control as set out and described more fully herein. When an operator is riding the vehicle the operator may have the option of disabling one or more of the detection zones and/or one or more of the responses of the controller when the detectors detect an object, as described below.

Although six obstacle sensors 76 are shown for purposes of clarity of discussion herein, any number of obstacle sensors 76 may be utilized. The number of obstacle sensors 76 will likely vary, depending upon the technology utilized to implement the sensor, the size and/or range of the detection zones, the number of detection zones, and/or other factors.

In the illustrative example, a first detection zone 78A is located proximate to the power unit 14 of the truck 10. A second detection zone 78B is defined adjacent to the first detection zone 78A and appears to generally circumscribe the first detection zone 78A. A third area is also conceptually defined as all area outside the first and second detection zones 78A, 78B. Although the second detection zone 78B is illustrated as substantially circumscribing the first detection zone 78A, any other practical arrangement that defines the first and second detection zones 78A, 78B may be realized. For example, all or certain portions of the detection zones 78A, 78B may intersect, overlap or be mutually exclusive. Moreover, the particular shape of the detection zones 78A, 78B can vary. Still further, any number of detection zones may be defined, further examples of which are described in greater detail herein.

Still further, the detection zones need not surround the entire truck 10. Rather, the shape of the detection zones may be dependent upon the particular implementation as set out in greater detail herein. For example, if the detection zones 78A, 78B are to be used for speed control while the truck 10 is moving without an operator riding thereon, under remote travel control in a power unit first (forks to the rear) orientation, then the detection zones 78A, 78B may be oriented forward of the direction of travel of the truck 10. However, the detection zones can also cover other areas, e.g., adjacent to the sides of the truck 10.

According to various aspects of the present invention, the first detection zone 78A may further designate a "stop zone". Correspondingly, the second detection zone 78B may further designate a "first speed zone". Under this arrangement, if an object, e.g., some form of obstacle is detected within the first detection zone 78A, and the materials handling vehicle 10 is traveling under remote control in response to a travel request, then the controller 103 may be configured to implement an action such as a "stop action" to bring the truck 10 to a stop. In this regard, travel of the truck 10 may continue once the obstacle is clear, or a second, subsequent travel request from the remote control device 70, 170 may be required to restart travel of the truck 10.

If a travel request is received from the remote control device 70, 170 while the truck is at rest and an object is detected within the first detection zone 78A, then the controller 103 may refuse the travel request and keep the truck at rest until the obstacle is cleared out of the stop zone.

If an object/obstacle is detected within the second detection zone 78B, and the materials handling vehicle 10 is traveling under remote control in response to a travel request, then the controller 103 may be configured to implement a different action. For example, the controller 103 may implement a first speed reduction action to reduce the speed of the vehicle to a first predetermined speed, such as where the vehicle is traveling at a speed greater than the first predetermined speed.

Thus, assume the truck 10 is traveling in response to implementing a travel request from the remote control device at a speed V2 as established by a set of operating conditions where the obstacle sensors 76 do not detect an obstacle in any detection zone. If the truck is initially at rest, the truck may be accelerated up to speed V2. The detection of an obstacle within the second detection zone 78B (but not the first detection zone 78A) may cause the truck 10, e.g., via the controller 103 to alter at least one operational parameter, e.g., to slow down the truck 10 to a first predetermined speed V1, which is slower than the speed V2. That is, V1<V2. Once the obstacle is cleared from the second detection zone 78B, the truck 10 may resume its speed V2, or the truck 10 may maintain its speed V1 until the truck stops and the remote control device 70, 170 initiates another travel request. Still further, if the detected object is subsequently detected within the first detection zone 78A, the truck 10 will be stopped as described more fully herein.

Assume as an illustrative example, that the truck 10 is configured to travel at a speed of approximately 2.5 miles per hour (mph) (4 Kilometers per hour (Km/h)) if the truck 10 is traveling without an operator onboard and is under remote control in response to a travel request from a corresponding remote control 70, so long as no object is detected in a defined detection zone. If an obstacle is detected in the second detection zone 78B, then the controller 103 may adjust the speed of the truck 10 to a speed of approximately 1.5 mph (2.4 Km/h) or some other speed less than 2.5 miles per hour (mph) (4 Kilometers per hour (Km/h)). If an obstacle is detected in the first detection zone 78A, then the controller 103 stops the truck 10.

The above example assumes that the truck 10 is traveling under remote control. In this regard, the obstacle sensors 76 can be used to adjust the operating conditions of the unoccupied truck 10. However, the obstacle sensors 76 and corresponding controller logic may also be operative when the truck 10 is being driven by an operator, e.g., riding on the platform or other suitable location of the truck 10. Thus, according to various aspects of the present invention, the controller 103 may stop the vehicle or refuse to allow the vehicle to move if an object is detected within the stop zone 78A regardless of whether the truck is being driven by an operator or operating under remote control. Correspondingly, depending upon the specific implementation, its speed control capability of the second detection zone 78B may be implemented regardless of whether the vehicle is operating under remote control, or whether an operator is riding on the vehicle while driving it.

However, according to various aspects of the present invention, there may be situations where it is desirable to disable one or more of the detection zones when the truck 10 is being driven by an operator. For example, it may be desirable to override/disable the obstacle sensors 76/controller logic while the operator is driving the truck 10 regardless of external conditions. As a further example, it may be desirable to override/disable the obstacle sensors 76/controller logic while the operator is driving the truck 10 to allow the operator to navigate the truck 10 in tight quarters, e.g., to navigate tight spaces, travel around corners, etc., that might otherwise activate one or more of the detection zones. As such, the activation of the controller logic to utilize the detection of objects in the detection zones to help control the vehicle while the vehicle is occupied by an operator, according to various aspects of the present invention, may be manually controlled, programably controlled or otherwise selectively controlled.

According to other aspects of the present invention, it may be desirable to disable one or more of the detection zones when an operator is walking alongside the truck 10 and controlling operation of the truck 10 with a supplemental control, such as a jog switch/button, e.g., located on a side portion of the truck 10. Such a jog switch may be used to move or jog the truck 10 in a forward direction at a predetermined and preferably low speed, as will be apparent to those skilled in the art. For example, it may be desirable to override/disable the obstacle sensors 76/controller logic while the operator is actuating the jog switch regardless of external conditions. As a further example, it may be desirable to override/disable the obstacle sensors 76/controller logic while the operator is actuating the jog switch to allow the operator to navigate the truck 10 in tight quarters, e.g., to navigate tight spaces, travel around corners, etc., that might otherwise activate one or more of the detection zones. As yet a further example, upon the operator releasing the jog switch, the truck 10 may coast to a stop. Upon the releasing of the jog switch and the truck 10 coasting, one or more of the disabled detection zones may be enabled, i.e., by enabling one or more of the obstacle sensors 76/controller logic.

Figure 4:
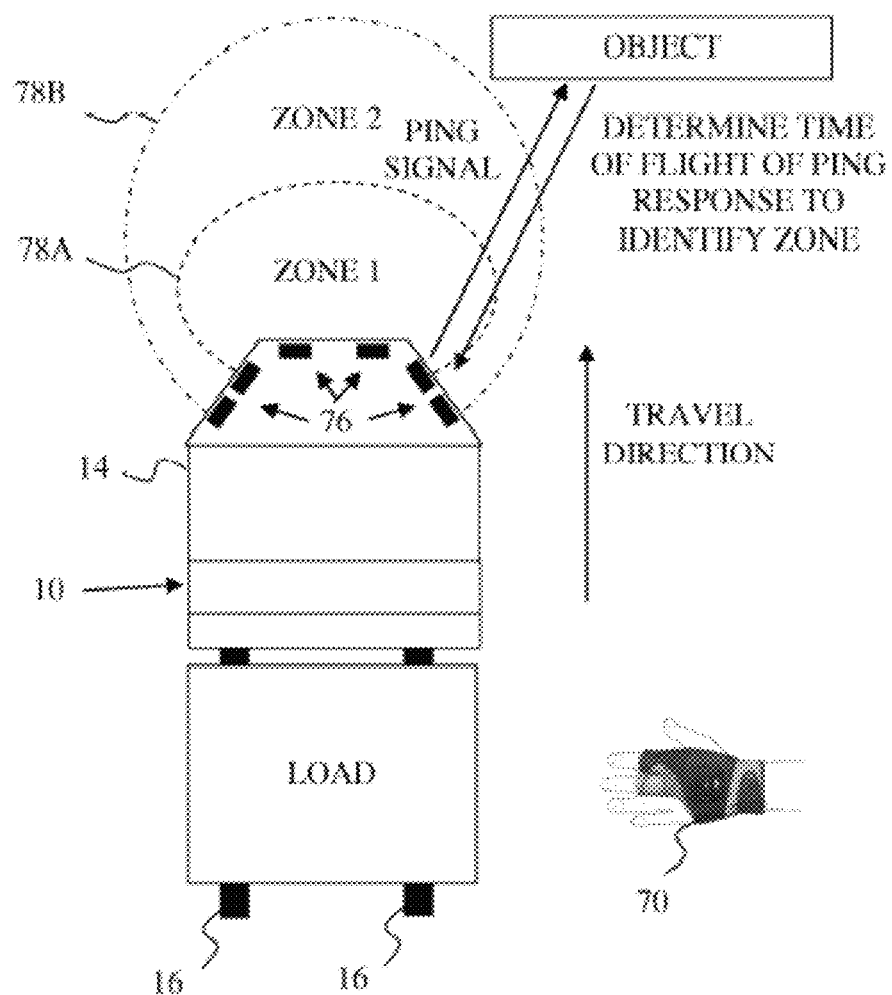
FIG. 4 is a schematic diagram illustrating an exemplary approach for detecting an object according to various aspects of the present invention.

Referring to FIG. 4, according to further aspects of the present invention, one or more of the obstacle sensors 76 may be implemented by ultrasonic technology, laser technology, or other suitable contactless technology capable of a distance measurement and/or position determination. Thus, the distance to an object can be measured, and/or a determination may be made so as to ascertain whether the detected object is within a detection zone 78A, 78B, e.g., by virtue of the distance of the object from the truck 10. As an example, an obstacle sensor 76 may be implemented by an ultrasonic sensor or transducer that provides a "ping" signal, such as a high frequency signal generated by a piezo element. The ultrasonic sensor 76 then rests and listens for a response. In this regard, time of flight information may be determined and utilized to define each zone. Thus, a controller, e.g., the controller 103 or a controller specifically associated with the obstacle sensors 76 may utilize software that looks at time of flight information to determine whether an object is within a detection zone.

According to further aspects of the present invention, multiple obstacle sensors 76 can work together to obtain object sensing. For example, a first ultrasonic sensor may send out a ping signal. The first ultrasonic sensor and one or more additional ultrasonic sensors may then listen for a response. In this way, the controller may use diversity in identifying the existence of an object within one or more of the detection zones.

Figure 5:
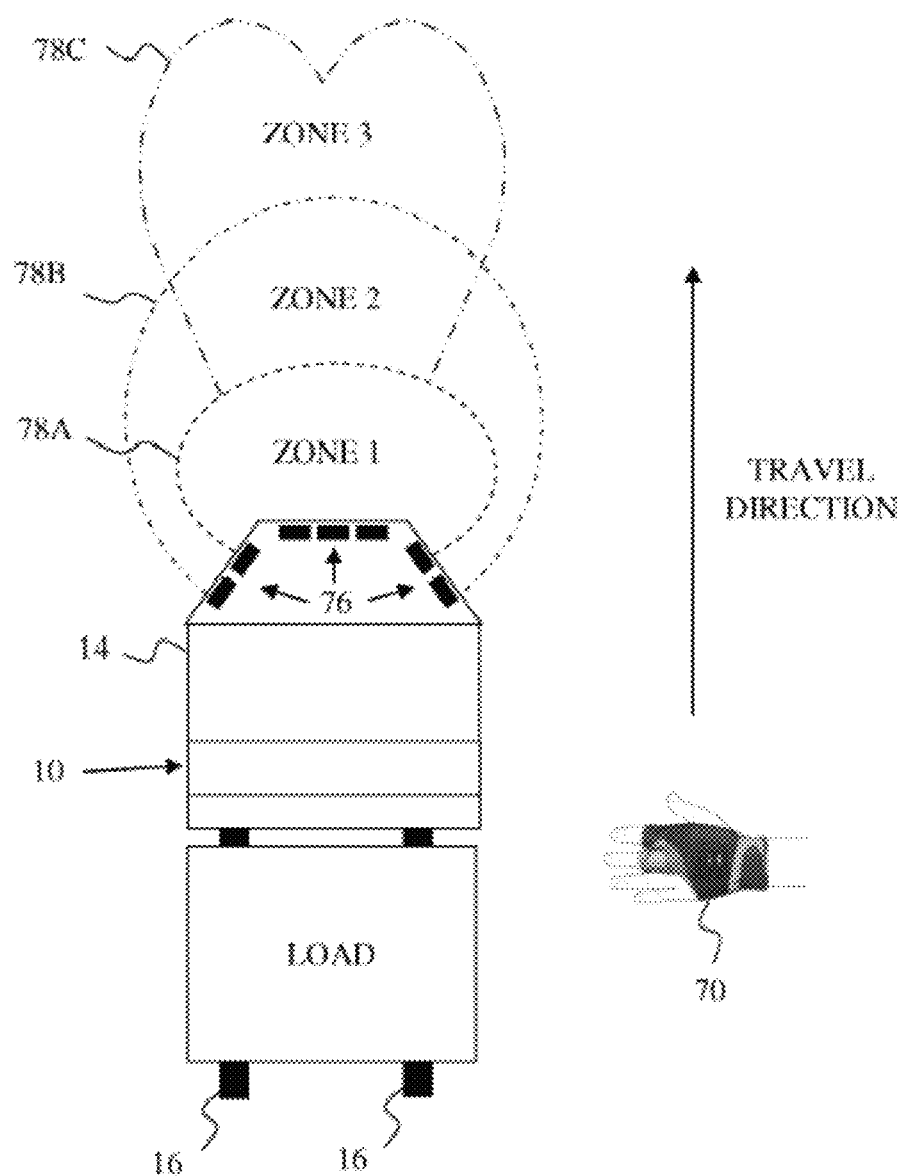
FIG. 5 is a schematic diagram illustrating a plurality of detection zones of a materials handling vehicle according to further aspects of the present invention.

With reference to FIG. 5, an implementation of multiple speed zone control is illustrated according to yet further aspects of the present invention. As illustrated, three detection zones are provided. If an object such as an obstacle is detected in the first detection zone 78A and the truck 10 is moving under remote control, then a first action may be performed, e.g., the truck 10 may be brought to a stop as described more fully herein. If an object such as an obstacle is detected in the second detection zone 78B and the truck 10 is moving under remote control, then a second action may be performed, e.g., the vehicle speed may be limited, reduced, etc. Thus, the second detection zone 78B may further designate a first speed zone. For example, the speed of the truck 10 may be reduced and/or limited to a first relatively slow speed, e.g., approximately 1.5 mph (2.4 Km/h).

If an object such as an obstacle is detected in the third detection zone 78C and the truck 10 is moving under remote control, then a third action may be performed, e.g., the truck 10 may be reduced in speed or otherwise limited to a second speed, e.g., approximately 2.5 mph (4 Km/h). Thus, the third detection zone may further designate a second speed zone. If no obstacles are detected in the first, second and third detection zones 78A, 78B, 78C, then the vehicle may be remotely controlled to travel, e.g., in response to a remote travel request, at a rate that is greater than the rate of speed when an obstacle is in the third detection zone, e.g., a speed of approximately 4 mph (6.2 Km/h).

As FIG. 5 further illustrates, the detection zones may be defined by different patterns relative to the truck 10. Also, in FIG. 5, a seventh obstacle sensor 76 is illustrated for purposes of illustration. By way of illustration, the seventh obstacle sensor 76 may be approximately centered, such as on the bumper or other suitable location on the truck 10. On an exemplary truck 10, the third zone 78C may extend approximately 6.5 feet (2 meters) forward of the power unit 14 of the truck 10.

According to various aspects of the present invention, any number of detection zones of any shape may be implemented. For example, depending upon desired truck performance, many small zones may be defined at various coordinates relative to the truck 10. Similarly, a few large detection zones may be defined base upon desired truck performance. As an illustrative example, a database, equation, function or other means of data comparison, such as a look-up table may be set up in the memory of the controller. If travel speed while operating under remote travel control is an operational parameter of interest, then the table may associate travel speed with the detection zones defined by distance, range, position coordinates or some other measure. If the truck 10 is traveling under remote control and an obstacle sensor detects an object, then the distance to that detected object may be used as a "key" to look up a corresponding travel speed in the table. The travel speed retrieved from the table can be utilized by the controller 103 to adjust the truck 10, e.g., to slow it down, etc.

Depending upon factors such as the desired speed of the truck when operating under remote control and the required stopping distance, the anticipated load to be transported by the truck 10, whether a certain amount of coast is required for load stability, vehicle reaction time, etc., the areas of each detection zone may be chosen. Moreover, factors such as the range of each desired detection zone etc. may be considered to determine the number of obstacle sensors 76 required. In this regard, such information may be static, or dynamic, e.g., based upon operator experience, vehicle load, nature of the load, environmental conditions, etc.

It is also contemplated that the controller 103 may generate a warning signal or alarm if an object or a person is detected in a detection zone.

As an illustrative example, in a configuration with multiple detection zones, e.g., three detection zones, as many as seven or more object detectors, e.g., ultrasonic sensors and/or laser sensors may be required to provide a range of coverage desired by a corresponding application. In this regard, the detector(s) may be able to look ahead of the direction of travel of the vehicle by a sufficient distance to allow the appropriate response, e.g., to slow down. In this regard, at least one sensor may be capable of looking several meters forward in the direction of travel of the truck 10.

According to various aspects of the present invention, the multiple detection speed zones allows a relatively greater maximum forward travel speed while operating under remote control that prevents unnecessarily early vehicle stops by providing one or more intermediate zones where the vehicle slows down before deciding to come to a complete stop.

According to further aspects of the present invention, the utilization of multiple detection zones allows a system that rewards the corresponding operator for better alignment of the truck 10 during pick operations. For example, an operator may position the truck 10 so as to not be aligned with a warehouse aisle. As such, as the vehicle is jogged forward, the second detection zone 78B may initially detect an obstacle such as a pick bin or warehouse rack. In response to detecting the rack, the vehicle will slow down. If the rack is sensed in the first detection zone 78A, then the vehicle will come to rest, even if the truck 10 has not jogged its entire programmed jog distance. Similar un-necessary slow-downs or stops may also occur in congested and/or messy aisles.

According to various aspects of the present invention, the truck 10 may shape speed and braking operation parameters based upon the information obtained from the obstacle sensors 76. Moreover, the logic implemented by the truck 10 in response to the detection zones may be changed or varied depending upon a desired application. As a few illustrative examples, the boundaries of each zone in a multiple zone configuration may be programably (and/or reprogramably) entered in the controller, e.g., flash programmed. In view of the defined zones, one or more operational parameters may be associated with each zone. The established operational parameters may define a condition, e.g., maximum allowable travel speed, an action, e.g., brake, coast or otherwise come to a controlled stop, etc. The action may also be an avoidance action. For example, an action may comprise adjusting a steer angle or heading of the truck 10.

Figure 6:
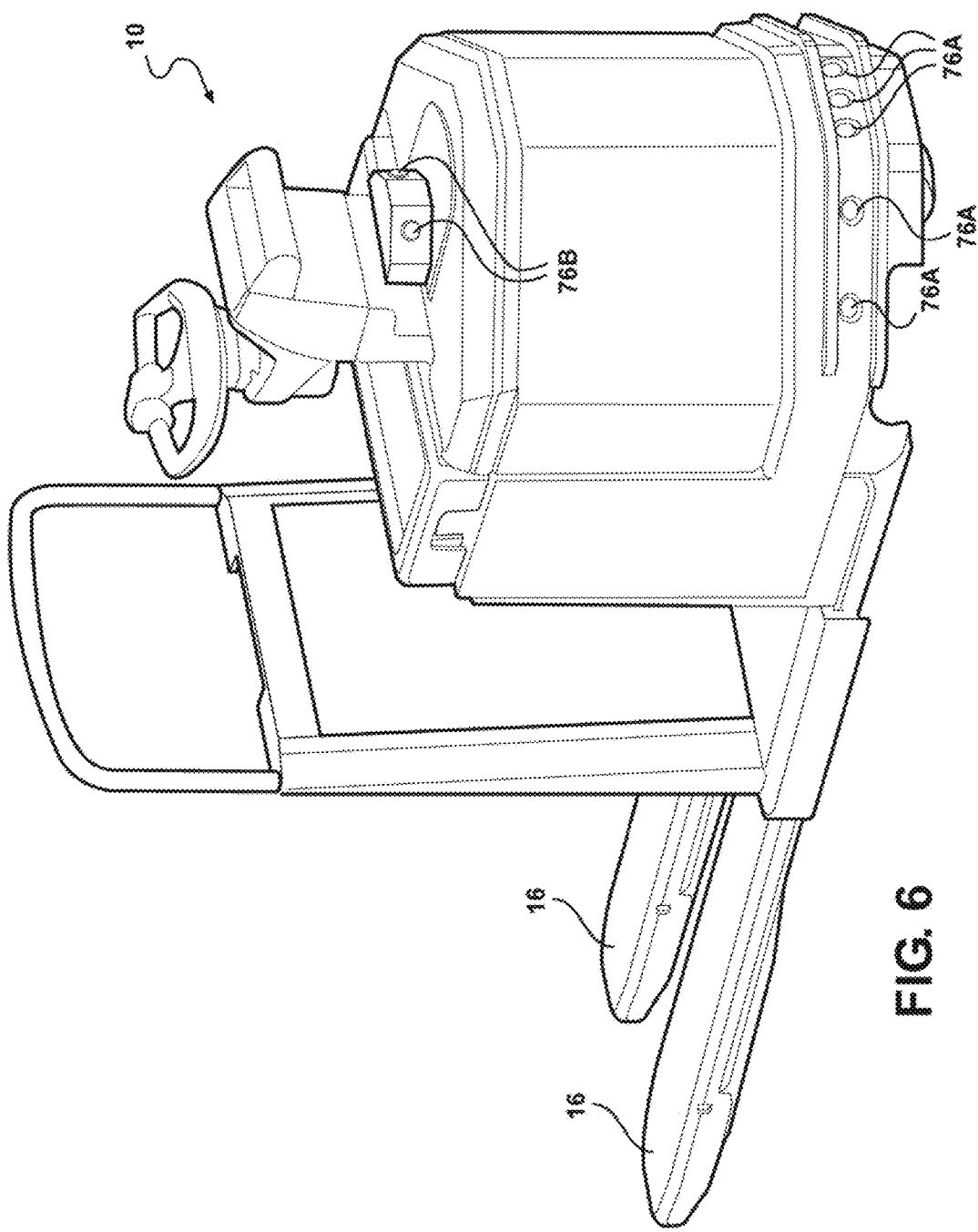
FIGS. 6 and 8 illustrate a materials handling vehicle having first and second spaced-apart obstacle detectors.
Figure 7:
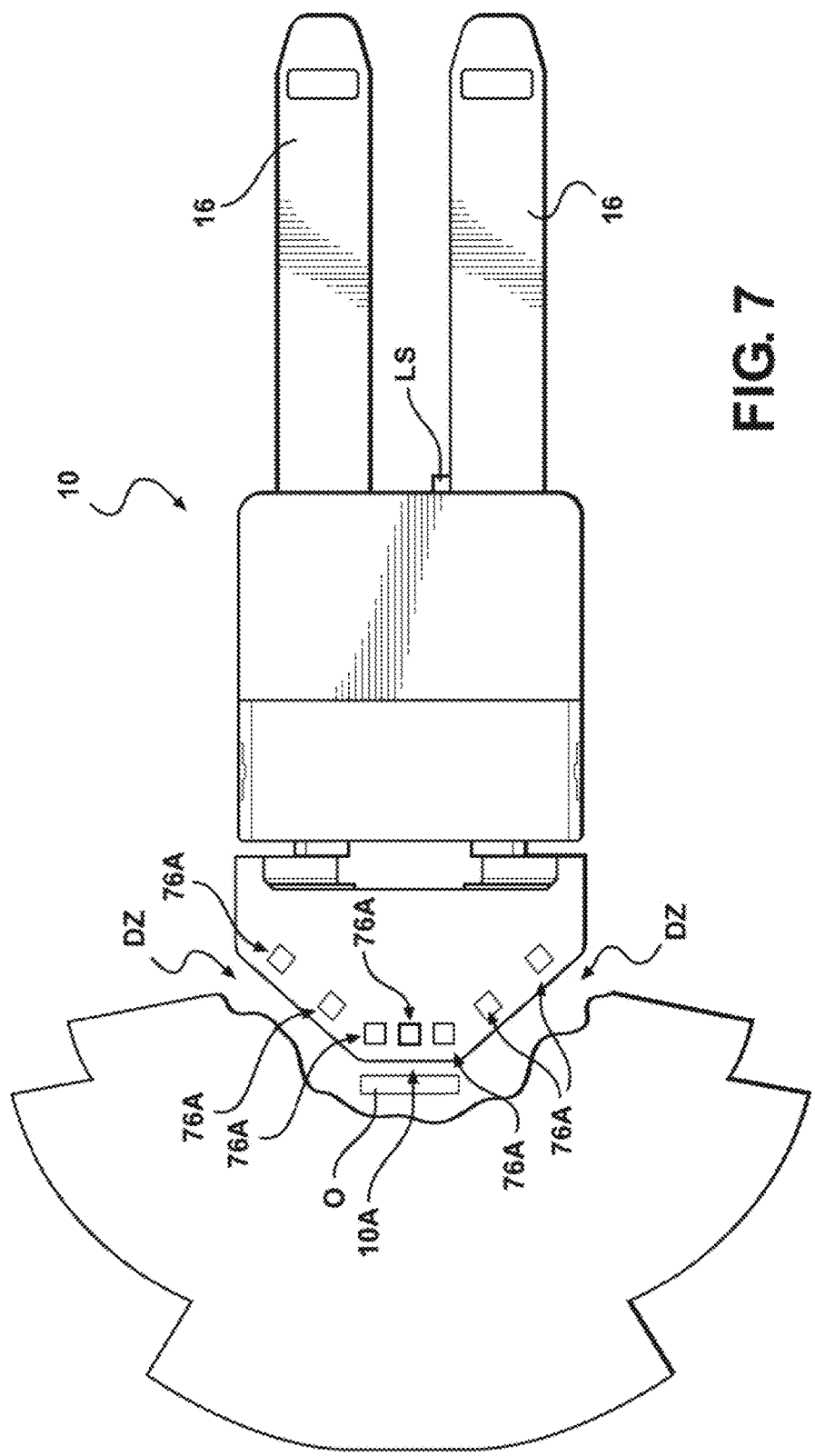
FIG. 7 is a schematic view illustrating a materials handling vehicle having obstacle detectors located only at a front of the vehicle.
Figure 8:
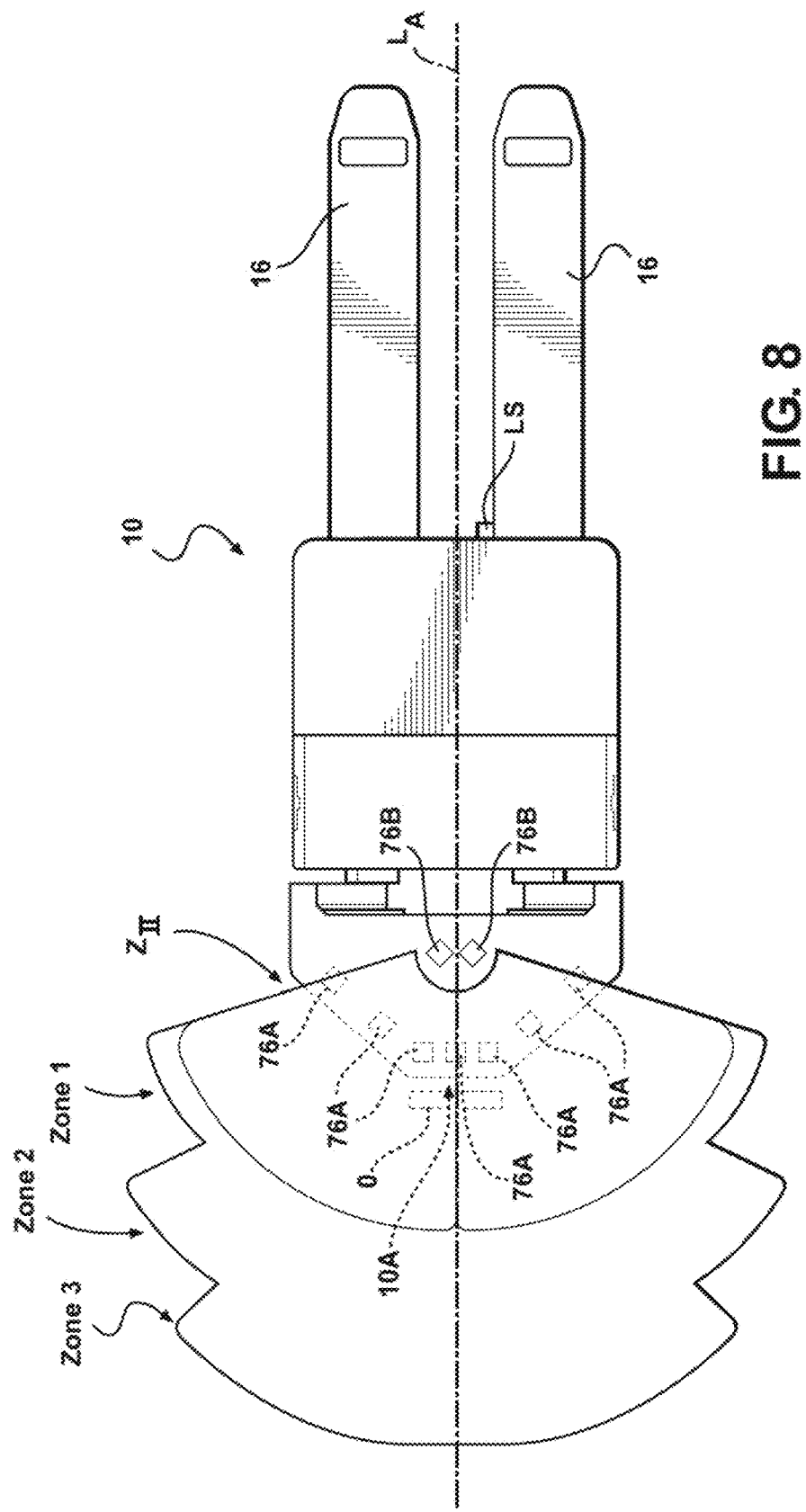

In accordance with a further embodiment of the present invention, one or more obstacle sensors, such as the obstacle sensors 76A, 76B shown in FIGS. 6 and 8, may be employed to sense or detect objects within first, second and third detection zones in front of the materials handling vehicle 10 when the vehicle 10 is traveling under remote control in response to a travel request command or signal and generate an object-detected and distance signal to the controller 103 in response to sensing/detecting an object in front of the vehicle 10. A further input 104 into the controller 103 may be a weight signal generated by a load sensor LS, see FIG. 8, which senses the combined weight of the forks 16 and any load on the forks 16. The load sensor LS is shown schematically in FIGS. 7 and 8 near the forks 16, but may be incorporated into a hydraulic system for effecting lift of the forks 16. By subtracting the weight of the forks 16 (a known constant value) from the combined weight defined by the weight signal, the controller 103 determines the weight of the load on the forks. Using sensed load weight and whether an object has been detected in one of the first, second and third detection zones as inputs into a lookup table or appropriate equations, the controller 103 generates an appropriate vehicle stop or maximum allowable speed signal.

Values defining the vehicle stop and maximum allowable speed signals may be experimentally determined and stored in a look-up table, such as the one illustrated in FIG. 11. In the illustrated embodiment, the controller 103 determines the weight of a load on the forks 16 and whether an obstacle has been detected in one of the first, second and third detection zones and, using the lookup table in FIG. 11, effects a stop command or defines a maximum allowable speed for the vehicle 10 and generates a corresponding maximum allowable speed signal for the vehicle 10.

With reference to the example lookup table in FIG. 11, if no load is on the forks 16 and no object is being detected by the obstacle sensors 76A, 76B in any one of the first, second and third detection zones, the controller 103 allows the vehicle to be operated at any speed up to and including a maximum speed of 4.5 MPH. As is apparent from FIG. 11, if no object is being detected in any one of the first, second and third detection zones, the maximum permitted speed decreases as the load on the vehicle increases. For example, for a load weight of 8000 pounds, the maximum allowable speed of the vehicle is 2.5 MPH. It is noted that, in some locations the maximum allowable speed of the vehicle 10, if unoccupied by a rider, may be set at a predetermined upper limit, e.g., 3.5 MPH. Hence, the maximum speed of the vehicle, if unoccupied by a rider, may be set, e.g., by the controller 103, at this maximum allowable speed.

For any load weight on the forks 16, if an object is detected in the first detection zone, the controller 103 generates a "stop signal," designating that the vehicle 10 brake. For any given load weight, the maximum allowable speed of the vehicle is less if an object is detected in the second or the third detection zone as compared to a state where no object is being detected. Also for any given load weight, the maximum allowable speed of the vehicle is less if an object is detected in the second detection zone as compared to when an object is detected in the third detection zone. The maximum allowable vehicle speeds for the second and third detection zones are defined for each load weight so that the vehicle's speed can be reduced in a controlled manner as the vehicle continues to move towards the object so that the vehicle can eventually be safely brought to a stop prior to the truck reaching the point where the object is located. These speeds are experimentally determined and can vary based on vehicle type, size and its braking capabilities.

For example, if the load weight on the vehicle equals 1500 pounds, and an object is sensed in the first detection zone, which first zone is nearest to the vehicle power unit 14, then a stop signal is generated by the controller 103 to effect stopping of the vehicle 10, see FIG. 11. If the load weight on the vehicle remains equal to 1500 pounds, and if a sensed object is located at a distance from the vehicle 10 within the second detection zone, spaced further away from the power unit 14 than the first detection zone, then the maximum allowable vehicle speed is equal to 2.0 MPH, see FIG. 11. Hence, if the vehicle 10 traveling at a speed greater than 2.0 MPH when the object is detected, the controller 103 effects a speed reduction so that the vehicle speed is reduced to 2.0 MPH. If the load weight on the vehicle remains equal to 1500 pounds, and if a sensed object is located at a distance within the third detection zone, spaced further away from the power unit 14 than the first and second detection zones, then the maximum allowable vehicle speed is equal to 3.0 MPH. Hence, if the vehicle 10 traveling at a speed greater than 3.0 MPH when the object is detected, the controller 103 effects a speed reduction so that the vehicle speed is reduced to 3.0 MPH.

The obstacle sensors may comprise ultrasonic transducers. Ultrasonic transducers are known to experience a phenomena known as transducer "ring down." Essentially "ring down" is the tendency of a transducer to continue to vibrate and transmit ultrasonic signals after the control signal that is used for initiating a transmitted signal has ceased. This "ring down" signal decreases in magnitude rather rapidly, but during the time that it is decreasing to a level below a threshold detection level, detection structure forming part of each obstacle sensor will respond to such "ring down" signals if the signals are above a reference level and thus can indicate that a "ring down" signal is a reflected or return signal when in fact it is not. A common technique to avoid this problem is to blank out all return signals generated by the obstacle sensors for a preselected period of time after initiation of a transmission. The preselected time is determined based on various factors including the type of transducer that is used, but during this preselected time no valid returns can be sensed. If the obstacle sensors are positioned near a front 10A of the vehicle 10, see obstacle sensors 76A in FIG. 7, and if the blanking technique is used, this results in a "dead" or "non-detect" zone DZ existing immediately in front of the vehicle 10. Hence, if an object O is very near the front of the vehicle, e.g., 10 mm or less, and the obstacle sensors 76A are positioned at the front of the vehicle, see FIG. 7, then the object O may not be detected.

In the embodiment illustrated in FIGS. 6 and 8, first and second obstacle sensors 76A and 76B, respectively, are spaced apart from one another along a longitudinal axis LA of the vehicle 10, see FIG. 8. The first obstacle sensors 76A are positioned at the front 10A of the vehicle 10 and are capable of sensing objects in the second and third detection zones as well as a first portion of the first detection zone, which first detection zone first portion is a predefined distance ahead of the front 10A of the vehicle 10, e.g., a distance 10 mm or greater in front of the vehicle front 10A. So as to ensure that objects O located in the non-detect zone DZ, i.e., an area not sensed by the first obstacle sensors 76A, the second obstacle sensors 76B are positioned on the vehicle 10 a spaced distance behind the first sensors 76A, i.e., in a direction away from the vehicle front 10A, see FIG. 8. Hence, the second sensors 76B function to sense objects in a first detection zone remaining second portion $Z_{II}$ just in front of the vehicle front 10A and corresponding to the dead zone DZ in FIG. 7.

Algorithm

Figure 12:
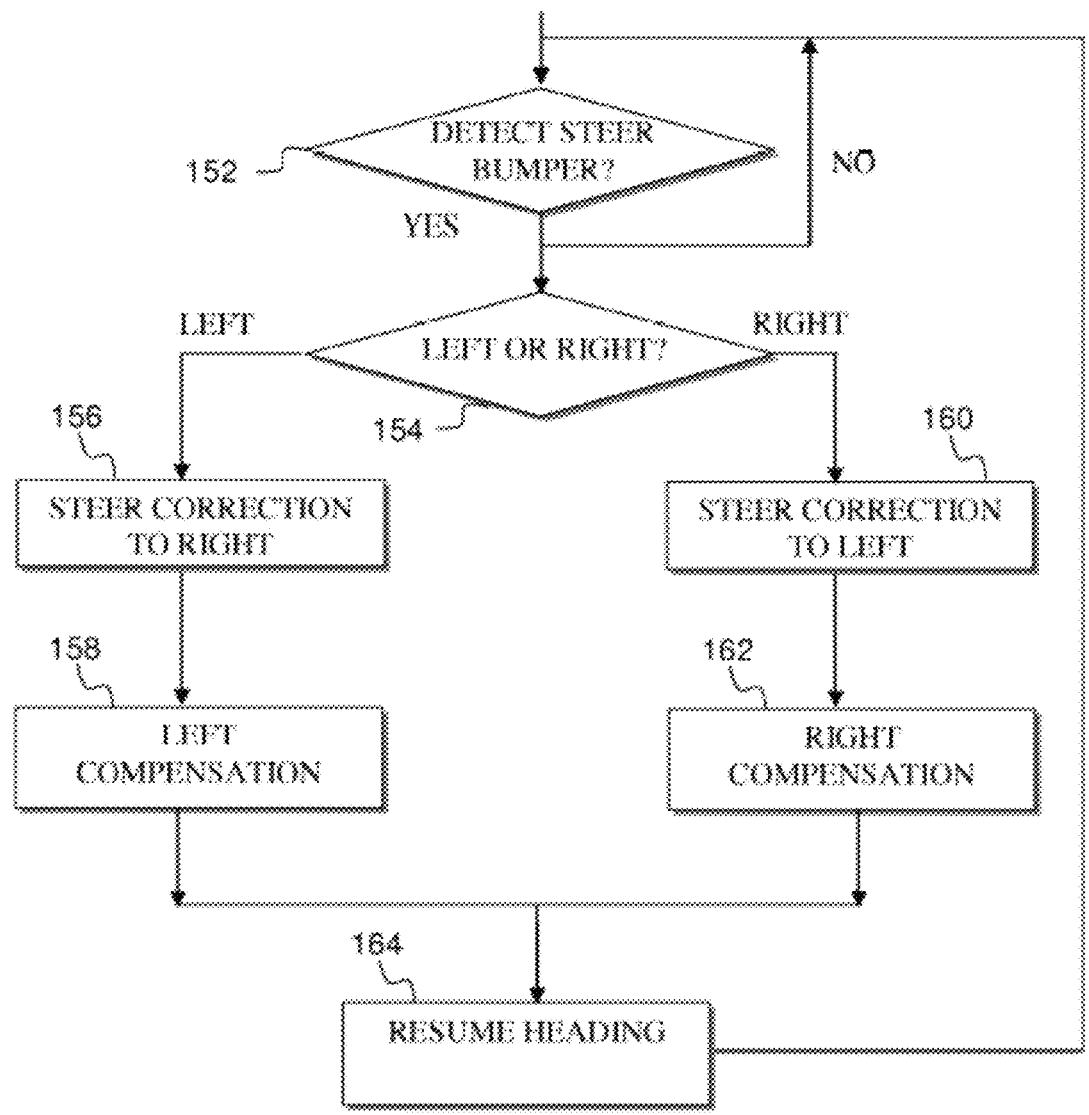
FIG. 12 is a flow chart of a method of implementing steer correction according to various aspects of the present invention.

According to various aspects of the present invention, a steer correction algorithm is implemented, e.g., by the controller 103. Referring to FIG. 12, a steer correction algorithm comprises determining whether a steer bumper zone warning is detected at 152. A steer bumper signal warning at 152 may comprise, for example, detecting the presence of an object within first and/or second steer bumper zones 132A, 132B with a laser sensor 2000, such as a model number LMS 100 or LMS 111 laser sensor manufactured by Sick AG located in Waldkirch, Germany. The laser sensor 2000 may be mounted to the power unit 14, see FIG. 13. The first steer bumper zone 132A may also be designated as a left steer bumper zone and the second steer bumper zone 132B may also be designated as a right steer bumper zone, see FIG. 13. If a steer bumper zone warning is received, a determination is made at 154 whether the steer bumper zone warning indicates that an object is detected to the left or to the right of the truck 10, e.g., whether the detected object is in the first steer bumper zone 132A or the second steer bumper zone 132B. For example, the laser sensor 2000 may generate two outputs, a first output signal designating whether an object is detected in the first (left) steer bumper zone 132A, and a second signal designating whether an object is detected in the second (right) steer bumper zone 132B. Alternatively, the controller 103 may receive raw laser sensor data and process/distinguish the first and second steer bumper zones 132A, 132B using a predetermined mapping.

Figure 13:
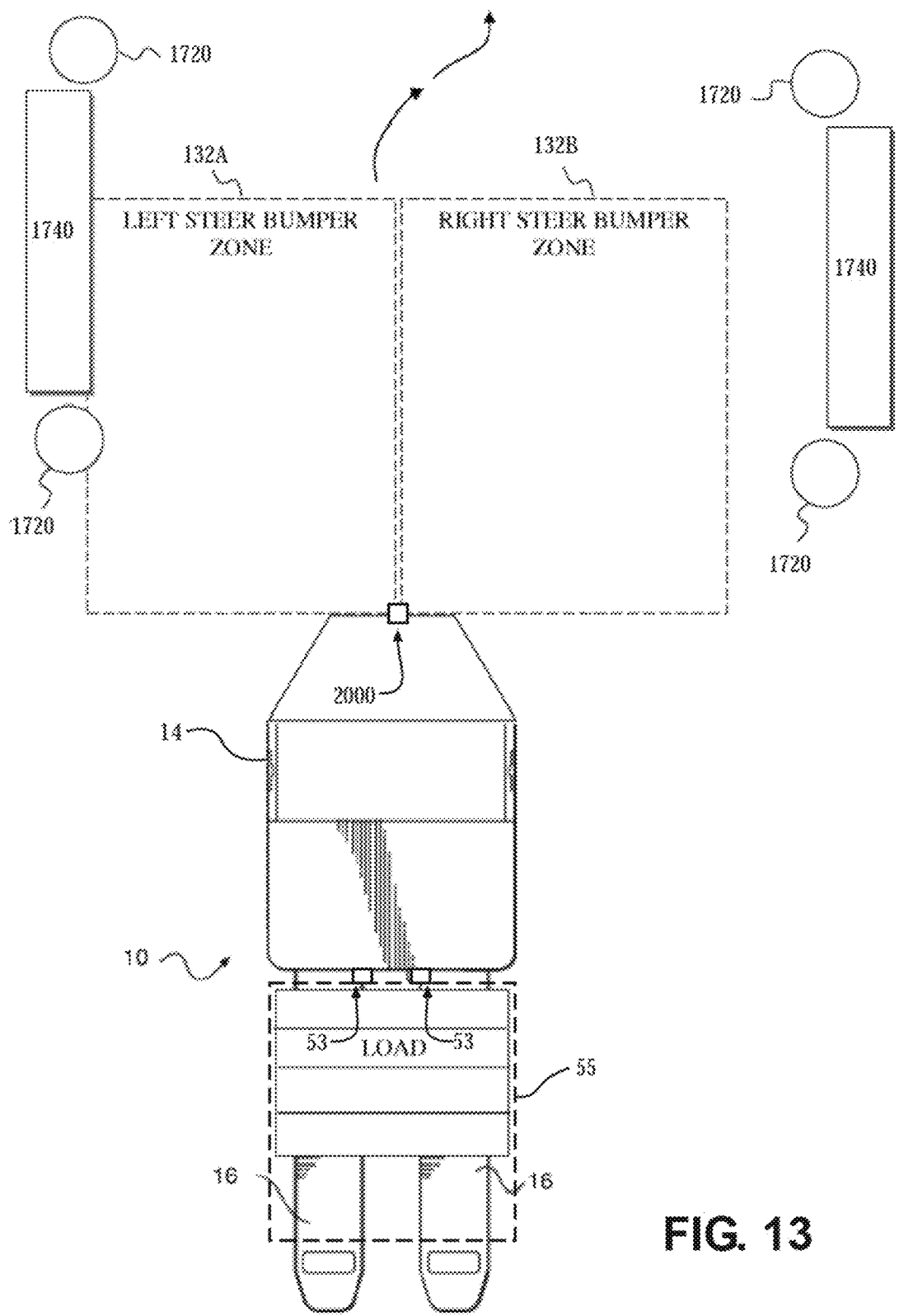
FIG. 13 is a schematic illustration of a materials handling vehicle traveling down a narrow warehouse aisle under remote wireless operation, which is automatically implementing a steer correction maneuver according to various aspects of the present invention.

For example, referring additionally to FIG. 13, the laser sensor 2000 may sweep a laser beam in an area in front of truck 10. In this regard, multiple laser sensors may be utilized, or one or more laser beams may be swept, e.g., to raster scan one or more areas forward of the truck 10. If an object is present in an area where the laser beams are swept, the object reflects the beam back to the laser sensor 2000, which is capable of generating object location data from which the location of the sensed object can be determined either by the sensor 2000 or the controller 103, as is known in the laser sensor art. In this regard, the laser sensor 2000 may independently define and scan the left and right steer bumper zones, or the controller 103 may derive the left and/or right steer bumper zones based upon the raster scan of the laser(s). Still further, alternate scanning patterns may be utilized, so long as the controller 103 can determine whether a detected obstacle is to the left or to the right of the truck 10.

As a few additional examples, although a laser sensor 2000 is illustrated for purposes of discussion herein, other sensing technologies may be utilized, examples of which may include ultrasonic sensors, infrared sensors, etc. For example, ultrasonic sensors, e.g., located to the sides of the truck 10, may define the left and right steer bumper zones 132A, 132B. Selection of the type(s) of sensors used on the truck 10 may depend upon the particular operating conditions of the truck 10.

Additionally, the laser sensor 2000 or one or more additional sensors may be used to define other detection zones, e.g., for stopping, speed limiting, etc. The laser sensor 2000 (or one or more additional sensors) may define a "stop zone", and/or a "slow down zone" as described in detail herein. For example, if a single stop zone is defined and an object is detected in the stop zone, which may extend, for example, about 1.2 meters in front of a forward traveling direction of the truck 10, the controller 103 may cause the truck 10 to stop, as set out in detail herein. Additionally or alternatively, if an object is detected in a slow down zone, the controller 103 may cause the truck 10 to slow down. It is noted that, according to this embodiment, it may be preferable to define a stop zone while not defining a slow down zone.

Further, the truck 10 may comprise one or more load presence sensors 53, see FIG. 13. The load presence sensor(s) 53 may comprise proximity or contact technology, e.g., a contact switch, a pressure sensor, an ultrasonic sensor, optical recognition device, infrared sensor or other suitable technology that detects the presence of a suitable load carrying structure 55, e.g., a pallet or other platform, collection cage, etc. The controller 103 may refuse to implement a travel command if one or more of the load presence sensors 53 indicate that the load platform 55 is not in a valid designated position. Still further, the controller 103 may communicate with the brake controller 108 to stop the truck 10 if the load presence sensors 53 detect a change of the load platform 55 from a valid designated position.

It should be understood that any number of detection zones may be implemented, and the implemented detection zones may overlap or define discrete, mutually exclusive zones. Depending upon the sensor and sensor processing technologies utilized, the input(s) to the controller 103 designating an object in the steer bumper zones 132A, 132B may be in other formats. As yet a further illustration, the first and second laser steer bumper zones 132A, 132B may be defined by both ultrasonic sensors and one or more laser sensors. For example, the laser sensor 2000 may be utilized as a redundant check to verify that the ultrasonic sensors properly detect an object in either the left or right steer bumper zones 132A, 132B, or vice versa. As yet a further example, ultrasonic sensors may be utilized to detect an object in the left or right steer bumper zones 132A, 132B and the laser sensor 2000 may be utilized to distinguish or otherwise locate the object to determine whether the object was detected in the left steer bumper zone 132A or the right steer bumper zone 132B. Other arrangements and configurations may alternatively be implemented.

If a steer bumper zone warning designates that an object is detected in the left steer bumper zone 132A, then a steer correction routine is implemented at 156 that includes computing a steer angle correction to steer the truck 10 to the right according to a first set of parameters. By way of illustration and not by way of limitation, a steer right correction implemented at 156 may include steering the truck 10 to the right at a right direction steer angle. In this regard, the right direction steer angle may be fixed or variable. For example, the controller 103 may command the steer controller 112 to ramp up to some desired steer angle, e.g., 8-10 degrees to the right. By ramping up to a fixed steer angle, sudden changes in the angle of the steer wheel(s) will not occur, resulting in a smoother performance. The algorithm accumulates the distance traveled at the steer correction angle, which may be a function of how long the appropriate steer bumper input is engaged.

According to various aspects of the present invention, the steered wheel angular change may be controlled to achieve, for example, a substantially fixed truck angle correction as a function of accumulated travel distance. The travel distance accumulated while performing a steer correction maneuver may be determined based upon any number of parameters. For example, the distance traveled during the steer correction may comprise the distance traveled by the truck 10 until the detected object is no longer within the associated left bumper detection zone 132A. The accumulated travel distance may also/alternatively comprise, for example, traveling until a time out is encountered, another object is detected in any one of the bumper or detection zones, and/or predetermined maximum steer angle is exceeded, etc.

Upon exiting a right steer correction at 156, e.g., by maneuvering the truck 10 so that no object is detected within the left steer bumper detection zone 132A, a left steer compensation maneuver is implemented at 158. The left steer compensation maneuver at 158 may comprise, for example, implementing a counter steer to adjust the travel direction of the truck 10 to an appropriate heading. For example, the left steer compensation maneuver may comprise steering the truck 10 at a selected or otherwise determined angle for a distance that is a percentage of the previously accumulated travel distance. The left steer angle utilized for the left steer compensation maneuver may be fixed or variable, and may be the same as, or different from the steer angle utilized to implement the right steer correction at 156.

By way of illustration and not by way of limitation, the distance utilized for the left steer compensation maneuver at 158 may be approximately one quarter to one half of the accumulated travel distance while implementing the right steer correction at 156. Similarly, the left steer angle to implement the left steer compensation maneuver may be approximately one half of the angle utilized to implement the right steer correction at 156. Thus, assume that the right steer angle is 8 degrees and the accumulated steer correction travel distance is 1 meter. In this example, the left steer compensation may be approximately one half of right steer correction, or −4 degrees, and the left steer compensation will occur for a travel distance of approximately ¼ meters to ½ meters.

The particular distance and/or angle associated with the left steer compensation maneuver at 158 may be selected, for example, so as to dampen the "bounce" of the truck 10 as the truck 10 moves along its course to steer correct away from detected obstacles. As an illustration, if the truck 10 steer corrects at a fixed degrees per distance traveled, the controller 103 may be able to determine how much the corresponding truck angle has changed, and therefore, adjust the left steer compensation maneuver at 158 to correct back towards the original or other suitable heading. Thus, the truck 10 will avoid "ping ponging" down an aisle and instead, converge to a substantially straight heading down the center of the aisle without tedious manual repositioning required by the truck operator. Moreover, the left steer compensation maneuver at 158 may vary depending upon the particular parameters utilized to implement the right steer correction at 156.

Correspondingly, if a steer bumper zone warning designates that an object is detected in the right steer bumper zone 132B, then a steer correction routine is implemented at 160 that includes computing a steer angle correction to steer the truck 10 to the left according to a second set of parameters. By way of illustration and not by way of limitation, a steer left correction implemented at 160 may include steering the truck 10 to the left at a left steer angle. In this regard, the left steer correction maneuver at 160 may be implemented in a manner analogous to that described above at 156, except that the correction is to the right at 156 and to the left at 160.

Similarly, upon exiting a left steer correction at 160, e.g., by maneuvering the truck 10 so that no object is detected within the right bumper detection zone 132B, a right steer compensation maneuver is implemented at 162. The right steer compensation maneuver at 162 may comprise, for example, implementing a counter steer to adjust the travel direction of the truck 10 to an appropriate heading in a manner analogous to that described at 158, except that the steer compensation maneuver at 158 is to the left and the steer compensation maneuver at 162 is to the right.

After implementing the steer compensation maneuver at 158 or 162, the truck may return to a substantially straight heading, e.g., 0 degrees at 164 and the process loops back to the beginning to wait for the detection of another object in either of the steer bumper zones 132A, 132B.

The algorithm can further be modified to follow various control logic implementations and/or state machines to facilitate various anticipated circumstances. For example, it is possible that a second object will move into either steer bumper zone 132A or 132B while in the process of implementing a steer compensation maneuver. In this regard, the truck 10 may iteratively attempt to steer correct around the second object. As another illustrative example, if object(s) are simultaneously detected in both the left and right steer bumper zones 132A, 132B, the controller 103 may be programmed to maintain the truck 10 at its current heading (e.g., zero degree steer angle), until either one or more steer bumper zones 132A, 132B are cleared or the associated detection zones cause the truck 10 to come to a stop.

According to further aspects of the present invention, a user and/or service representative may be able to customize the response of the steer angle correction algorithm parameters. For example, a service representative may have access to programming tools to load customized variables, e.g., in the controller 103, for implementing steer correction. As an alternative, a truck operator may have controls that allow the operator to input customized parameters into the controller, e.g., via potentiometers, encoders, a software user interface, etc.

The output of the algorithm illustrated in FIG. 12 may comprise, for example, an output that defines a steer correction value that may be coupled from the controller 103 to an appropriate control mechanism of the truck 10. For example, the steer correction value may comprise a +/−steer correction value, e.g., corresponding to steer left or steer right, that is coupled to a vehicle control module, steer controller 112, e.g., as illustrated in FIG. 2, or other suitable controller. Still further, additional parameters that may be editable, e.g., to adjust operational feel may comprise the steer correction angle, a steer correction angle ramp rate, a bumper detection zone size/range for each steer bumper zone, truck speed while steer correcting, etc.

Referring to FIG. 13, assume in the illustrative example, that the truck 10 is traveling in response to receiving a remote wireless travel request and that before the truck 10 can travel a predetermined jog distance, the truck 10 travels into a position where a rack leg 1720 and a corresponding pallet 1740 are in the path of the left steer bumper zone 132A. Keeping with the exemplary algorithm of FIG. 12, the truck 10, e.g., via the controller 103, may implement an obstacle avoidance maneuver by entering a steer correction algorithm, to steer the truck to the right. For example, the controller 103 may compute or otherwise lookup or retrieve a steer correction angle that is communicated to a steer controller 112 to turn the drive wheel(s) of the truck 10.

The truck 10 maintains steer correction until an event occurs, such as the disengagement of the object, e.g., when the scanning laser or other implemented sensor technology no longer detects an object in the left steer bumper zone 132. Assume that the truck 10 accumulated a travel distance of one half of a meter during the steer correction maneuver, which was fixed at 8 degrees. Upon detecting that the left steer bumper zone signal has disengaged, a counter steer compensation is implemented to compensate for the change in heading caused by the steer correction. By way of example the steer compensation may steer the truck 10 to the left for approximately one quarter meter accumulated travel distance, at 4 degrees. For very narrow aisles, the Left/Right steer bumper zone sensors may provide very frequent inputs/little time between senses compared to relatively wider aisles.

The various steer angle corrections and corresponding counter steer compensations may be determined empirically, or the angles, ramp rates, accumulated distances, etc., may be computed, modeled or otherwise derived.

In the illustrative arrangement, the system will try to maintain the truck 10 centered in the aisle as the truck 10 advances in response to receiving a corresponding wirelessly transmitted travel request by the transmitter 70. Moreover, bounce, e.g., as measured by the distance from the centerline of a warehouse aisle, is damped. Still further, there may be certain conditions where the truck 10 may still require some operator intervention in order to maneuver around certain objects in the line of travel.

Figure 14:
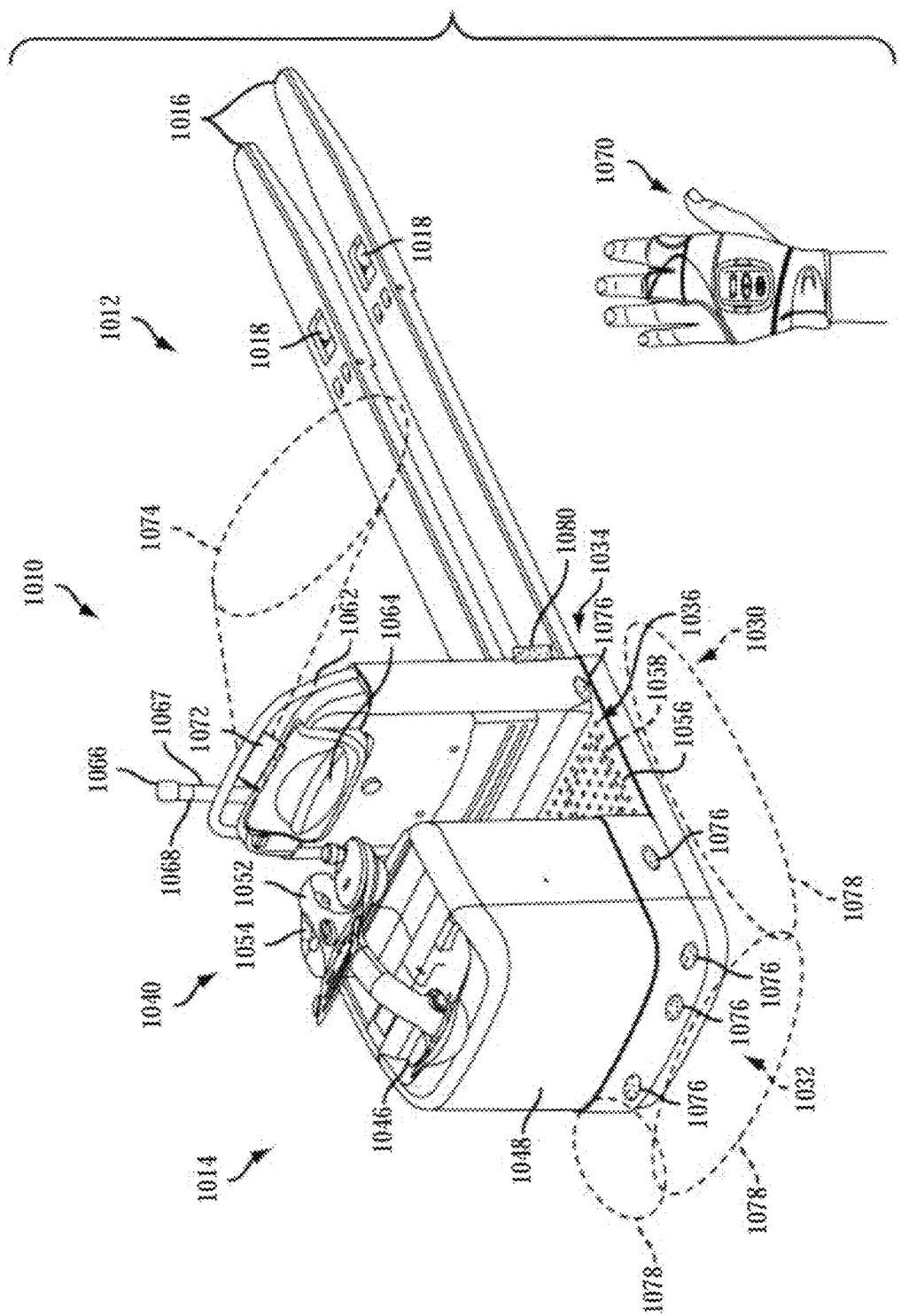
FIG. 14 is a perspective view of a low level order picking truck according to various aspects of the present invention.

Referring now to FIG. 14, a materials handling vehicle, which is illustrated as a low level order picking truck 1010 includes in general, a load handling assembly 1012 that extends from a power unit 1014. The load handling assembly 1012 includes a pair of forks 1016, each fork 1016 having a load supporting wheel assembly 1018. The load handling assembly 1012 may include other load handling features in addition to, or in lieu of the illustrated arrangement of the forks 1016, such as a load backrest, scissors-type elevating forks, outriggers and separate height adjustable forks, a mast, a load platform, collection cage or other support structure carried by the forks 1016 or otherwise provided for handling a load supported and carried by the truck 1010.

The illustrated power unit 1014 comprises an operator's area 1030 having a first end section 1032 positioned opposite the forks 1016, a second end section 1034 positioned adjacent to the forks 1016 and a step-through operator's station 1036 dividing the first end section 1032 from the second end section 1034. A first work area is provided towards the first end section 1032 of the power unit 1014 and includes a control area 1040 for driving the truck 1010 and for controlling the features of the load handling assembly 1012. The first end section 1032 may also optionally comprise a first storage area 1046, e.g., for securing loose items that a corresponding truck operator may wish to keep track of. The first end section 1032 also defines a compartment 1048 for containing a battery, control electronics and motor(s), such as a traction motor, steer motor and lift motor for the forks (not shown).

As shown for purposes of illustration, and not by way of limitation, the control area 1040 comprises a handle 1052 for steering the truck 1010, which may include controls such as grips, butterfly switches, thumbwheels, rocker switches, a hand wheel, a steering tiller, etc., for controlling the acceleration/braking and travel direction of the truck 1010. For example, as shown, a control such as a switch grip 1054 may be provided on the handle 1052, which is spring biased to a center neutral position. Rotating the switch grip 1054 forward and upward will cause the truck 1010 to move forward, e.g., power unit 1014 first, at a speed proportional to the amount of rotation of the switch grip 1054. Similarly, rotating the switch grip 1054 toward the rear and downward of the truck 1010 will cause the truck 1010 to move in reverse, e.g., forks 1016 first, at a speed proportional to the amount of rotation of the switch grip 1054. Devices may also be provided for sounding a horn or for performing other truck functions.

The step-through operator's station 1036 provides a platform 1056 upon which an operator may stand to drive the truck 1010 and operate the load handling features of the truck 1010. Presence sensors 1058 may also be provided, e.g., on, above, or under the platform 1056 or otherwise provided about the operator's station 1036, to detect the presence of an operator on the truck 1010 as will be explained in greater detail herein. In the exemplary truck of FIG. 14, the presence sensors 1058 are shown in dashed lines indicating that they are positioned under the platform 1056. Under this arrangement, the presence sensors 1058 may comprise load sensors, switches, etc. As an alternative, the presence sensors 1058 may be implemented above the platform 1056, such as by using ultrasonic, capacitive or other suitable sensing technology.

The second end section 1034 of the power unit 1014 may comprise an operator rest pad or other suitable support structure, a grab bar 1062 and a second storage area 1064. An antenna 1066 is provided for receiving control signals from a corresponding remote control device 1070, which in one embodiment comprises a transmitter, a power pack, and a control structure, as will be described in greater detail herein. As shown, radio frequency (RF) performance is facilitated by coupling the antenna 1066 to the second end section 1034 of the power unit 1014, e.g., along or otherwise proximate to a vertically extending post 1067 that may also support a light source 1068. The placement of the antenna 1066 above the light source 1068 on the post 1067 provides a convenient location for promoting RF reception and may eliminate variability from the light source 1068 and its associated wires running past the antenna 1066. Alternatively, the antenna 1066 can be positioned anywhere else on the truck 1010. The light source 1068 may be utilized to provide information about the state of the truck 1010 and/or state of wireless communication between a properly paired wireless remote control and the truck. For example, the light may illuminate when the truck 1010 is in motion and blink or illuminate in defined patterns to indicate prescribed conditions.

The grab bar 1062 may be used by the operator as a grasping surface, e.g., when entering, exiting or operating the truck 1010. Additionally, the grab bar 1062 and other included posts, e.g., an additional optional grab bar towards the first end section 1032 (not shown) may be further utilized, for example, to support accessories such as scanners, computers, radios, communications devices and other electronics, lights, clipboards, fans, storage units and other work or convenience related accessories, or other required items for performing intended tasks within an application. For example, the grab bar 1062, or second end section 1034 in general, may be used to mount supplemental operational controls.

The exemplary truck 1010 is provided for illustration and not by way of limitation. In practice, the truck 1010 may be implemented in other formats, styles and features, such as an end control pallet truck that includes a steering tiller arm that is coupled to a tiller handle for steering the truck. In this regard, the truck 1010 may have similar or alternative control arrangements to that shown in FIG. 14.

In addition to or in lieu of the light source 1068, an indicator, e.g., audible, visible etc., may be associated with the remote control system as will be described in greater detail herein. For example, as shown, the truck 1010 may include an indicator such as a strobe light 1072, which is illustrated as being positioned on or adjacent to the second end section 1034 of the power unit 1014 mounted relatively low to the ground. The indicator may alternatively be mounted in any other practical location, e.g., on a load backrest, on a vertically extending pole such as the light source 1068, or other part of the truck 1010.

The strobe light 1072 may be set to a unique pattern that is associated with remote control operation. As such, when the truck 1010 is not operating under wireless remote control, the strobe pattern can change relative to when the truck 1010 is operating under wireless remote control. For example, the strobe light 1072 may be turned off or changed in intensity, pattern etc. when the truck 1010 is not under wireless remote control. Comparatively, the strobe can flash when the truck 1010 is under wireless remote control. The speed, intensity or other patterns can vary based upon the operating conditions of the truck, e.g., to indicate motion, fault conditions, etc. As illustrated, the light pattern 1074 from the strobe light 1072 is directed generally downward at an angle towards the forks 1016. As such, the strobe area is not distracting to the operator or to other people in the vicinity of the truck 1010, e.g., in the working aisle of the truck 1010, yet is apparent and visible to the operator and other people in the vicinity of the truck 1010.

The truck 1010 may also comprise one or more object sensors 1076, which are provided about the truck 1010, e.g., towards the first end section 1032 of the power unit 1014 and/or to the sides of the power unit 1014. The object sensors 1076 may comprise any suitable proximity or contact detection technology, such as ultrasonic sensors, optical recognition devices, infrared sensors, laser sensors, etc. For example, the object sensors 1076 may be implemented by Bosch URF6 ultrasonic sensors and a corresponding controller.

The object sensors 1076 may be used to detect the presence of objects within a predefined area of the power unit 1014, such as within a predefined detection area 1078 as illustrated in dashed lines. In practice, the range of each object sensor 1076 may be different, and the sensor detection areas 1078 may overlap or otherwise be arranged, depending upon the specific implementation and selection of proximity detecting technology. For example, the object sensors 1076 towards the front of the power unit 1014 may have a range of approximately 0-5 feet (0-1.5 meters) and the object sensors 1076 to the sides of the power unit 1014 may have a range of approximately 0-2 feet (0-0.6 meters). Moreover, the detection range of the object sensors 1076 may be adjustable or be otherwise made dynamically variable. For example, the range of the object sensors 1076 may be extended if certain operating conditions are detected, etc. As an example, the range of the object sensors 1076 may be adjusted based upon the speed of the truck 1010 when advancing under wireless remote control.

Further, the truck 1010 may comprise one or more load presence sensors 1080. The load presence sensor(s) 1080 may comprise proximity or contact technology, e.g., a contact switch, a pressure sensor, an ultrasonic sensor, optical recognition device, infrared sensor or other suitable technology that detects the presence of a suitable load carrying structure, e.g., a pallet or other platform, collection cage, etc. The load presence sensor(s) 1080 may be mounted towards the front of the power unit 1014, to a load backrest or other suitable support structure, the location of which will likely depend upon the technology deployed.

Figure 15:
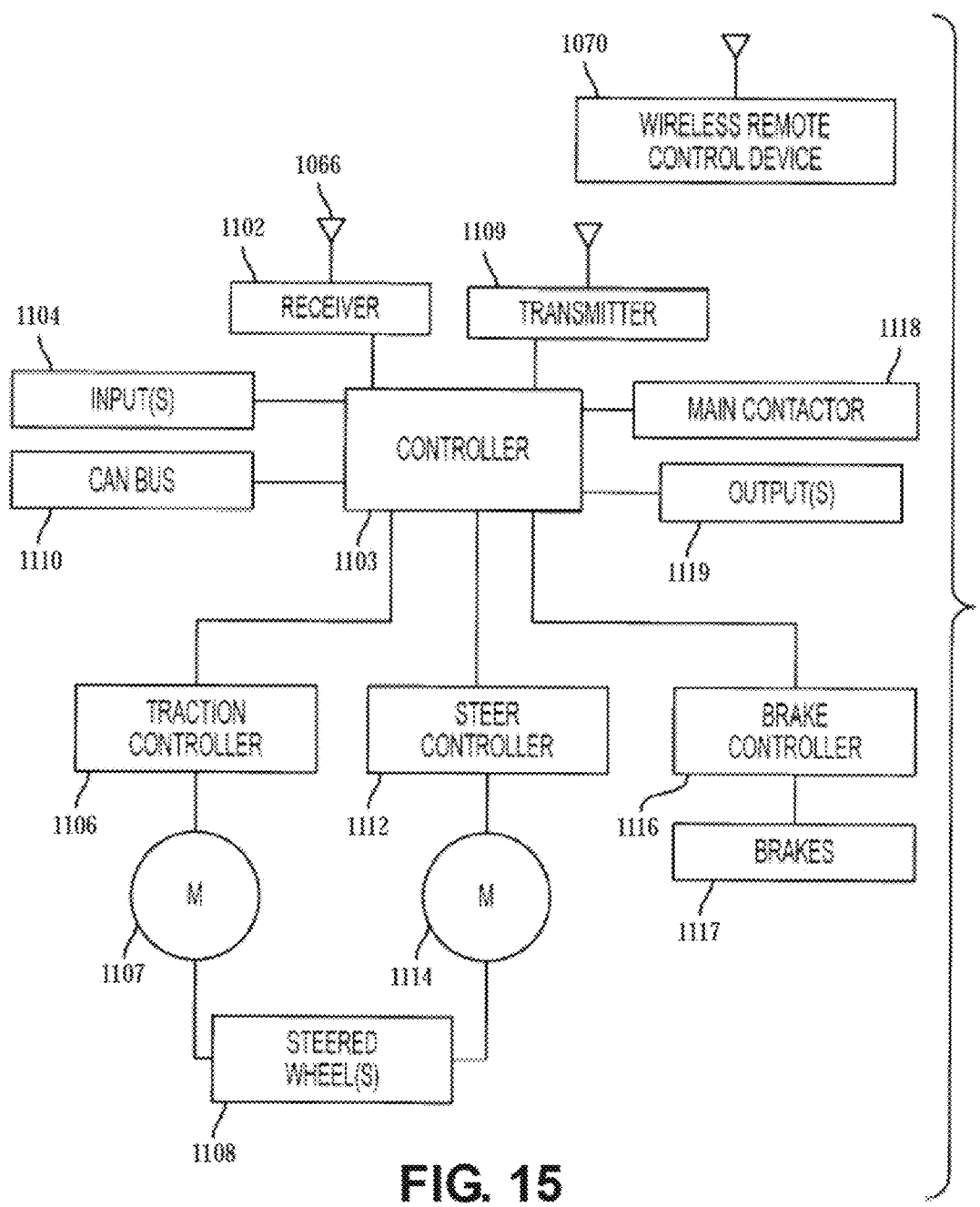
FIG. 15 is a block diagram illustrating an exemplary system for remotely controlling traction, steer and/or brake functions of the truck illustrated in FIG. 14 in response to wireless remote commands according to various aspects of the present invention.

Referring to FIG. 15, a block diagram illustrates a control arrangement for integrating remote control commands with the truck 1010. The antenna 1066 is coupled to a receiver 1102 for receiving commands issued by the remote control device 1070. The receiver 1102 passes the received commands to a controller 1103, which implements the appropriate actions in response to the received commands, e.g., by operating relays or other actuation devices controlled by electricity, magnetics, hydraulics, pneumatics, etc., or by communicating with other truck components. The controller 1103 may also receive other inputs 1104 from other sources, such as switches, encoders and other input devices available to the truck 1010 to determine appropriate action in response to the received commands from the remote control device 1070.

In one exemplary arrangement, the remote control device 1070 is operative to wirelessly transmit a travel request as first type signal, also referred to herein as a "travel signal" or "go signal" to the receiver on the truck 1010. The travel request is used to request the truck 1010 to advance or jog in a first direction. The first direction may be defined, for example, by movement of the truck 1010 in a power unit 1014 first, i.e., forks 1016 to the back, direction. However, other directions of travel may alternatively be defined. Moreover, the truck 1010 may be controlled to travel in a generally straight direction or along a previously determined heading.

The first type signal is received by the receiver 1102 and is communicated to the controller 1103. If the controller 1103 determines that the travel signal is a valid travel signal and that the current vehicle conditions are appropriate (explained in greater detail herein), the controller 1103 sends a signal to the appropriate control configuration of the particular truck 1010 to advance and then stop the truck 1010. As described herein, stopping the truck 1010 may be implemented by either allowing the truck 1010 to coast to a stop or by applying a brake to stop the truck.

As an example, the controller 1103 may be communicably coupled to a traction control system, illustrated as a traction motor controller 1106 of the truck 1010. The controller is responsive to receipt of the first type signal by the receiver 1102 to evaluate at least one vehicle condition, to decide whether to implement the travel request based upon the evaluation of the vehicle condition(s) and to cause the traction control system to advance the truck 1010 if the controller decides to implement the travel request based upon the evaluation of the condition(s).

The traction motor controller 1106 is coupled to a traction motor 1107 that drives at least one steered wheel 1108 of the truck 1010. The controller 1103 may communicate with the traction motor controller 1106 in such a way so as to limit the speed of the truck 1010 in response to receiving a travel request from the remote control device 1070. For example, the travel speed of the truck 1010 may be limited to typical walking speed, e.g., up to or around 2.75 miles per hour (4.4 kilometers per hour).

There may be noise and/or interference, e.g., from other wireless and remote control systems in the vicinity of the truck 1010. As such, either the receiver 1102 or the controller 1103 may perform signal analysis to discriminate valid travel signals from invalid signals. For example, the controller 1103 may determine that the receiver 1102 has provided a travel signal at an improper frequency or on an improper channel. Moreover, an operator and/or transmitter identification (ID) code may be embedded into the travel request. Under such a case, the controller 1103 may be operatively configured to respond to messages bearing only certain ID codes or to exclude/disregard commands from certain ID codes.

Also, the travel signal may be detected at a power level that is too strong or too weak to be considered a valid signal. For example, if a signal is too strong, it may indicate that an operator is too close to the truck 1010 to initiate automated travel. Correspondingly, if a signal is too weak, that may indicate that an operator has exceeded a predetermined range from the truck 1010 for allowed remote control.

Still further, the controller 1103 may require an acknowledgement signal or other bi-directional communication from the remote control device 1070 that was not timely received. For example, the controller 1103 may be coupled to a transmitter 1109 on the truck 1010 to facilitate bi-directional communication with the wireless remote control device 1070. Under these and other similar circumstances, the controller 1103 may opt to disregard a received travel request and not take action if the bi-directional communication is not properly confirmed. Still further, bi-directional communication may be utilized for pairing the receiver 1102 in the truck 1010 to a corresponding instance of a wireless remote control device 1070.

The controller 1103 may also refuse to acknowledge the travel signal depending upon vehicle condition(s) that relate to environmental or operational factors. For example, the controller 1103 may disregard an otherwise valid travel request based upon information derived from one or more of the sensors 1058, 1076, 1080. In this regard, the sensors 1058, 1076, 1080 etc. may be coupled to the controller 1103 via the inputs 1104 or via a suitable truck network, such as a control area network (CAN) bus 1110. Any other number of reasonable conditions may also/alternatively be implemented by the controller 1103 to interpret and take action in response to received signals.

The CAN bus 1110 facilitates a convenient platform for the controller 1103 of the truck 1010 to communicate with any truck system or module connected to the CAN bus 1110 to make decisions as to how to implement commands received from the remote control device 1070. Moreover, relevant information derived from the truck 1010 can be communicated back to the remote control device 1070 by utilizing the transmitter 1109 in the truck 1010 to communicate with a corresponding receiver in the remote control device 1070.

The CAN protocol is a convenient network platform for material handling vehicles as there is no addressing of subscribers or stations in the conventional network sense. Rather, the CAN defines a prioritized system of transmitted messages where the priority of a given message broadcast across the CAN bus 1110 is dependent upon a corresponding message identifier code. A message broadcast from a first module can be received by all nodes or modules connected to the CAN bus 1110. Thus, the controller 1103 can make intelligent decisions with regard to wireless remote control and/or to the exchange of information with a corresponding paired wireless remote control device 1070 based upon any number of factors, states, conditions, etc., that can be conveyed across the CAN bus 1110.

The network may alternatively comprise any other bus system, e.g., a Local Interconnect Network (LIN) or a Vehicle Area Network (VAN), etc., or communications capabilities, such as a wiring harness, bus other signal propagation manner or other control network. As such, the various controllers and electronics on the truck 1010 may broadcast, unicast or otherwise communicate with each other.

Upon acknowledgement of a valid travel request, the controller 1103 interacts with the traction motor controller 1106, e.g., via the CAN bus 1110 or other communication coupling, to advance the truck 1010. Depending upon the particular implementation, the controller 1103 may interact with the traction motor controller 1106 to advance the truck 1010 by a predetermined distance. Alternatively, the controller 1103 may interact with the traction motor controller 1106 to advance the truck 1010 for a period of time in response to the detection and maintained actuation of the control on the remote control device 1070. Further, the truck 1010 may be configured to jog for as long as a travel control signal is received. However, the controller 1103 may further be configured to "time out" and stop the travel of the truck 1010 based upon a predetermined event, such as exceeding a predetermined time period or travel distance regardless of whether maintained actuation of a corresponding control on the remote control device 1070. Other control arrangements may alternatively be implemented for effecting the range, duration, speed, etc. of the truck 1010 when operating under wireless remote control, examples of which will be set out in greater detail herein.

The controller 1103 may also communicate, e.g., via the CAN bus 1110 or otherwise, with a steer control system to cause the truck 1010 to adjust a travel path of the truck 1010. For example, the controller 1103 may communicate with a steer controller 1112 to command or otherwise control a steer motor 1114 or other suitable control device, which also couples to the steered wheel(s) 1108 of the truck 1010. For example, the controller 1103 may straighten out the truck 1010, or adjust a steer angle of the truck 1010 before or during a wireless remote control initiated travel operation. As such, the controller 1103 may default to a mode of operation wherein the truck 1010 travels in a straight direction or along a predetermined heading when the truck 1010 is moving under wireless remote control in response to receipt of a travel request. The controller 1103 may further impose a steer angle limit during remote control operations if the truck 1010 is to travel in a direction where the steered wheel(s) 1108 is not straight. For example, the controller 1103 may limit the angle that the truck 1010 can travel when executing remote controlled travel requests to a range of approximately 5 to 10 degrees. Thus, in addition to jogging the traction motor 1107, the controller 1103 may also straighten out or otherwise adjust or control the steered wheel 1108.

The remote control device 1070 may also be operative to transmit a second type signal, such as a "stop signal", designating that the truck 1010 should brake and/or otherwise come to rest. The second type signal may also be implied, e.g., after implementing a "travel" command. The second type signal is received by the receiver 1102 and is communicated to the controller 1103. If the controller 1103 determines that the stop signal is a valid stop signal, the controller 1103 sends a signal to a brake control system, e.g., via the CAN bus 1110 or otherwise. For example, the controller 1103 may communicate with a brake controller 1116 of the truck 1010 to cause an appropriate brake arrangement 1117 to bring the truck 1010 to rest. As an alternative to a stop signal, the second type signal may comprise a "coast signal", designating that the coast should allow the truck 1010 to eventually come to rest. For example, if a coast signal is recognized by the controller 1103 as a valid coast signal, then the controller 1103 may disengage drive to the truck 1010, e.g., by instructing the traction controller 1106 to stop applying a signal to drive the traction motor 1107, but otherwise allow the truck 1010 to coast and gradually slow to a stop. Any number of reasonable conditions or factors may be considered by the controller 1103 to interpret and take action in response to received stop or coast signals. Further, rather than the remote control device 1070 transmitting a second type signal to request that the truck 1010 implement a particular function, the remote control device 1070 may transmit multiple instances of the first type signal, i.e., if a button on the remote control device 1070 is "double clicked", to request that the truck 1010 implement a particular function, as will be discussed below.

The time that it takes to bring the truck 1010 to a complete rest may vary, depending for example, upon the intended application, the environmental conditions, the capabilities of the particular truck 1010 and other similar factors. For example, after completing an appropriate jog movement, it may be desirable to allow the truck 1010 to "coast" some distance before coming to rest so that the truck 1010 stops slowly. This may be achieved by utilizing regenerative braking to slow the truck 1010 to a stop so that a predetermined range of travel distances may be achieved from the initiation of the stop operation until the time in which the truck finally comes to rest. Alternatively, a braking operation may be applied after a predetermined delay time to allow a predetermined range of additional travel to the truck 1010 after the initiation of the stop operation. It may also be desirable to bring the truck 1010 to a relatively quicker stop, e.g., if an object is detected in the travel path of the truck 1010 or if an immediate stop is desired after a successful jog operation. For example, the controller may apply predetermined torque to the braking operation. Under such conditions, the controller 1103 instructs the brake controller 1116 to apply the brake arrangement 1117 to stop the truck 1010.

Moreover, if a truck disable function is implemented, the truck 1010 may stop with maximum braking torque. For example, the remote control device 1070 may include a disable control that transmits a message instructing the truck 1010 to brake and/or shut down. In response to the disable function, the truck 1010 may also switch off a main contactor 1118 that is utilized to power up the truck 1010. Under this arrangement, the truck 1010 may require a restart operation, e.g., by using a key switch or other suitable configuration to re-initiate a truck startup procedure. The controller 1103 may also interact with other truck outputs 1119 to implement desired activities, e.g., to control a horn, light source, display, etc. As such, the controller 1103 may interact with various components of the truck 1010, with the operator and with wireless remote control devices 1070 to implement various traveling, stopping, coasting and power enabling strategies.

As noted above, the controller 1103 may communicate with the brake controller 1116 to cause the brake arrangement 1117 to bring the truck 1010 to rest under various conditions. For example, the outputs of the object sensors 1076 may be overridden while the operator is driving the truck 1010, for example, to allow the operator to navigate the truck 1010 in tight spaces and around corners that might otherwise activate one or more of the object sensors 1076. However, the outputs of the object sensors 1076 may be effective and not overridden when no operator is sensed on the truck 1010. As such, the controller 1103 may communicate with the brake controller 1116 to stop the truck 1010 if the controller 1103 determines that an object is in the path of travel of the truck 1010, e.g., as detected by the object sensors 1076 during travel in response to receiving a remote travel request from the remote control device 1070.

Additionally, the controller 1103 may refuse to implement a travel request in response to receiving a travel signal from a corresponding remote control device 1070 if the platform presence sensor(s) 1058 detect the presence of a person on the truck, or where the load presence sensors 1080 indicate that a corresponding load platform, e.g., a pallet, is not in position on the forks 1016 of the truck 1010. Still further, the controller 1103 may communicate with the brake controller 1116 to stop the truck 1010 if the load presence sensors 1080 detect a change of the load platform from a valid designated position.

The remote control device 1070, the receiver 1102 and the transmitter 1109 may communicate over a range of frequencies, thus allowing the remote control device 1070 and corresponding truck 1010 to lock onto a frequency or frequencies that have minimal interference from outside sources. Additionally, any number of wireless technologies may be utilized to facilitate interaction between the truck 1010 and the remote control device 1070, including the use of spread spectrum technologies.

As an example, technologies such as a Bluetooth communications link or a derivative thereof, may be formed between the transmitter in the remote control device 1070 and the receiver 1102 on the truck 1010. The Bluetooth and similar communication technologies allow control over remote output power intensity, adjustable output power, multiple sub-channels and frequency hopping to reduce the likelihood of noise and other interference in the work area. Bluetooth bandwidth may also simplify transmission of voice control, as described in greater detail herein.

If the truck 1010 includes a tiller arm instead of the illustrated steering control, the truck may include a steering arm brake. As such, a steering arm locking device may be provided for placing the truck into a coast mode of operation when using the remote, for example, as disclosed in U.S. Pat. No. 6,595,306, assigned to the same assignee, and which is herein incorporated by reference.

Figure 16:
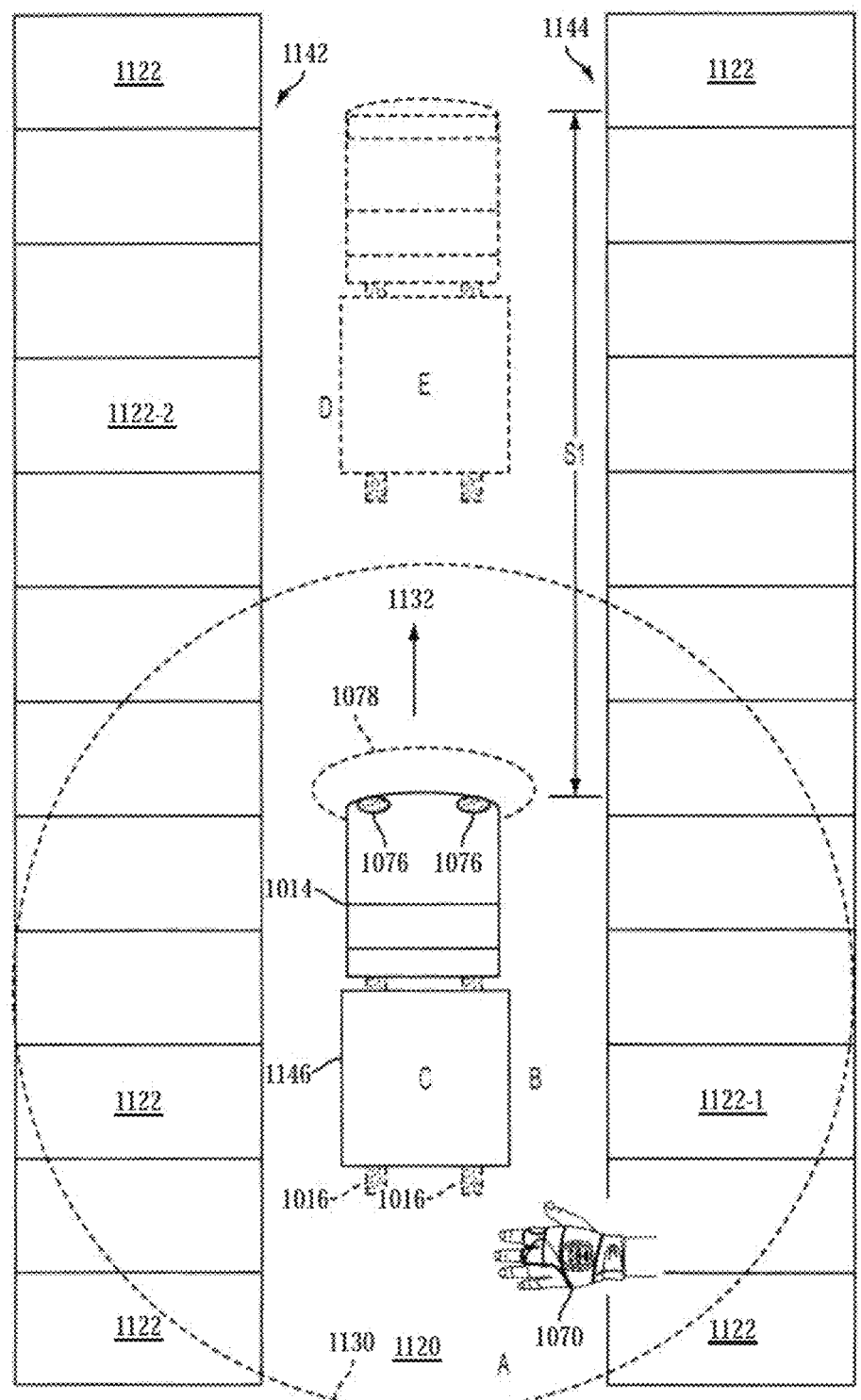
FIG. 16 is a schematic illustration of the truck of FIG. 14 in a warehouse aisle according to various aspects of the present invention.

Referring to FIG. 16, the remote control device 1070 and the corresponding receiver 1102 may be configured so that wireless control is operable over a predetermined distance. The truck 1010 is situated in a typical warehouse aisle 1120 having a plurality of storage locations 1122 on either side of the aisle 1120. As illustrated, the remote control device 1070 is capable of communicating with the truck 1010 over a range designated by the dashed path radius 1130. The range may vary depending upon a particular implementation. For example, a range of operation may depend upon an anticipated distance that an operator is expected to walk from the truck 1010 to pick an item during a picking process. In an illustrative example, this distance may be approximately 25 feet (7.62 meters). Moreover, the range of operation need not be the same in all directions or under all conditions. For example, the range of operation may have a pattern that is elliptical or in some other directional pattern, etc. Still further, there may be a minimum range, within which the wireless remote control device 1070 may be nonfunctional. As described above, the controller 1103 may discriminate signals that are too strong, suggesting that the operator is either standing on, or is in too close of proximity to the truck 1010 for remote operation. As yet another example, the operation range may be affected by operating conditions and environmental conditions, such as the speed of the truck 1010, where the truck 1010 is located within a facility, etc.

It may be desirable to set or otherwise program the range of the object sensors 1076 for detecting obstacles in the path of the truck 1010, which is traveling in response to receiving a travel request from the remote control device 1070. For example, as shown, each of the object sensors 1076 are set to detect objects in their path within a distance, which is schematically suggested by the range designated by the dashed detection area 1078 proximate to each object sensor 1076. The side-located object sensors 1076 are not illustrated in FIG. 16 for clarity of discussion. The range of the object sensors 1076 may also be configured to change, either statically or dynamically. For example, the range of the object sensors 1076 may change as the speed of the truck 1010 changes in response to received jog commands, etc.

For each actuation of the travel request on the remote control device 1070, the operator can advance the truck 1010 without taking the time to physically engage the controls on the truck 1010. For example, upon issuing a travel request via the remote control device 1070, the operator may walk towards the next item to be retrieved, or perform some other task. The truck 1010 automatically travels forward by an amount corresponding to the travel request. For example, if travel for a predetermined distance is commanded, after traveling the predetermined distance, the truck 1010 stops, without requiring a separate control action from the operator. Alternatively, the truck 1010 may stay in motion for as long as a jog command is issued by the remote control device 1070, e.g., by maintained actuation of a travel button. Under this later configuration, the truck 1010 continues to travel until the operator releases the travel button, the operator engages a stop or coast button, a specified maximum continuous travel time expires, or some other appropriate action stops the truck 1010.

As an example of a first optional manner in which an operator can interact with the truck 1010, assume that an operator travels with the truck 1010 down the aisle 1120. A first row 1142 of storage locations 1122 is located on a first side of the truck 1010. A second row 1144 of storage locations 1122 is located on a second side of the truck 1010. Each of the first and second rows 1142, 1144 of storage locations 1122 include a plurality of individual storage areas, which may be bins, pallets, delineated or otherwise designated areas, etc. Moreover, each storage location 1122 may comprise several independent storage areas that are vertically stacked, such as in a racking system in a warehouse facility or distribution center. As such, there may be multiple levels of storage at each storage location 1122. During automatic operation of the truck via the remote control device 1070, the truck 1010 travels down the aisle 1120. For example, the truck 1010 is illustrated traveling with the power unit 1014 forward as illustrated by the directional arrow 1132. Thus, the forks 1016 are towards the back of the truck 1010 when traveling under remote control. Other travel directions may be alternatively implemented.

Assume that the operator is initially located at position A, and that an item is to be picked from a storage location 1122 designated as storage location "1122-1" in row 1144. The operator walks from position A to the storage location "1122-1" to retrieve the desired pick item. After picking the desired contents, the operator is at position B, which is just in front of storage location "1122-1". It is further assumed that the operator has advanced or is in the process of advancing the truck 1010 using the remote control device 1070 such that a load platform 1146 that is situated on the forks 1016 of the truck 1010 is located at position C, which is in the vicinity of position B. The operator need not carry any item(s) of the pick order to the truck 1010 when walking from position A to storage location "1122-1". Moreover, by the time that the operator arrives at position B with the item(s) picked from storage location "1122-1" (or shortly before or thereafter), the truck 1010 has come to rest at position C. Thus, the operator need only carry the pick item(s) a relatively short distance from storage location "1122-1" to position B.

After placing the pick onto the load platform 1146 of the truck 1010, the operator may then step onto the truck 1010 to drive to the next location, or if there are additional items to be picked in the current aisle 1120, the operator may move the truck 1010 using the travel control of the remote control device 1070.

Continuing with the above example, it is assumed that the operator is now located at position B, and that an item is to be picked from a storage location 1122 designated as storage location "1122-2" in row 1142. The operator walks from position B to storage location "1122-2" to retrieve the desired pick item. Moreover, the operator initiates a wireless remote control travel request, e.g., by using the remote control device 1070 to wirelessly transmit a first type ("travel") signal to the receiver on the truck 1010. By the time that the operator arrives at position D with the item picked from storage location "1122-2" (or shortly before or thereafter), the truck 1010 has traveled under wireless remote control from position C and has come to rest at position E, which is in the vicinity of position D. Again, the operator places the retrieved item on the load platform 1146 of the truck 1010 in a manner that minimizes the distance that the operator must walk while carrying items on the pick order.

Moreover, by moving the truck 1010 foreword while picking, the time required to pick from a given aisle 1120 can be reduced because the operator need not interrupt the pick process to reposition or reorient the truck 1010. Still further, as schematically illustrated, a single actuation of a travel control on the remote control device 1070 may cause the truck 1010 to advance a distance S1 and then stop. As such, after actuating the travel control via the remote control device 1070, the truck 1010 is positioned in a convenient place for the operator to place previously retrieved items in a manner that minimizes the distance that the operator must carrying the picked item(s). Moreover, because the operator need not disrupt picking or other work related tasks, the operator may save energy and time in completing a given task, e.g., compared with an operation wherein the operator is required to continually stop working to advance the truck to its next location.

One measure of productivity of an operator is the time that the operator spends at the pick face. That is, how much time is spent picking orders compared to time spent relocating the truck 1010 and performing other tasks not immediately related to locating and loading pick items. As is evident in the discussion above, the time required to relocate the truck 1010 has been reduced allowing the operator to spend more time picking items. Moreover, the truck 1010 can be remotely controlled to always stay in front of the operator, allowing the operator to work towards a load carrying portion of the truck 1010. This minimizes the distance that the operator must travel to fetch and load pick items, and further reduces the distance that the operator must walk while carrying the pick items. This may become significant, especially where the forks 1016 of the truck 1010 are relatively long. For example, certain forks 1016 can support triple length loads, such as three pallets.

Moreover, warehouse management system software that directs operators in their picking operations can take into account the remote travel control of the truck 1010 when planning pick orders so that the advantages of the remote control can be further enhanced by more efficient computer processing when preparing the pick orders.

Figure 17:
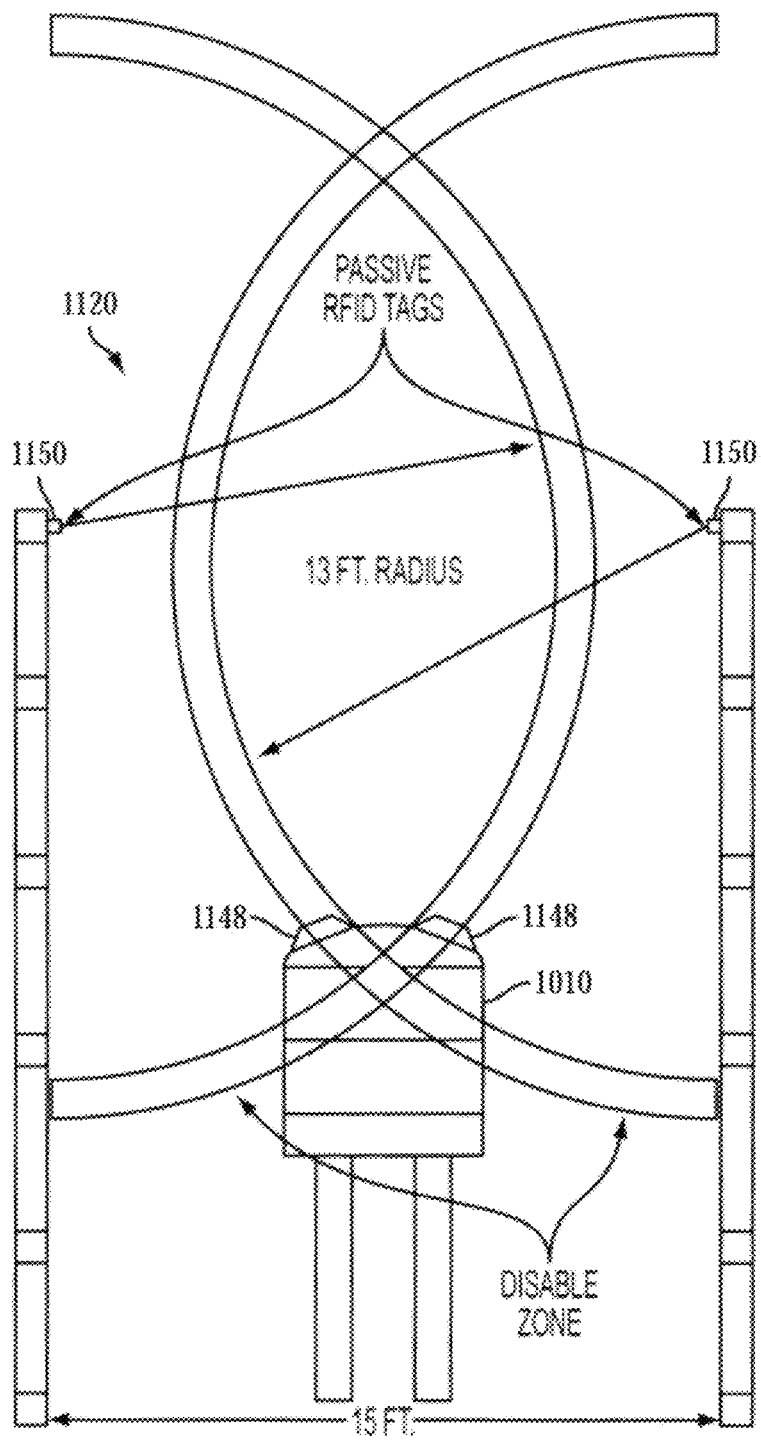
FIG. 17 is a schematic illustration of the truck of FIG. 14 towards the end of an exemplary warehouse aisle illustrating a disabling zone according to various aspects of the present invention.

Referring to FIG. 17, according to an aspect of the present invention, additional features may be incorporated into the warehouse or other facility and/or to the truck 1010 to provide enhanced functionalities. For example, the wireless remote jog control functionality may be disabled in certain locations about a facility, such as at the end of aisles, at crossing or intersecting passageways, at loading or receiving dock areas, at areas of high pedestrian traffic, etc. To illustrate this feature, assume that wireless remote jog control is to be disabled on the truck 1010 as the truck 1010 approaches the end of an aisle 1120. To facilitate disabling wireless remote jog control of the truck 1010 at a predetermined location, the truck 1010 includes one or more devices 1148, such as radio frequency identification (RFID) antennas. Corresponding RFID tags 1150 are positioned at the end of the aisle at a suitable position.

The devices 1148 generate signals in response to detecting the end of the aisle 1120, e.g., by sensing the corresponding RFID tags 1150, which trigger the truck 1010 to stop if it is under wireless remote jog control. For example, signals from the devices 1148 may couple to corresponding inputs, e.g., appropriate ones of the inputs 1104 on the controller 1103. For example, if the controller 1103 detects an appropriate signal from one of the devices 1148 and the controller 1103 detects that it is currently operating the truck 1010 in response to a travel request from the remote control device 1070, the controller 1103 may issue an appropriate command to the brake controller 1116 to stop the truck 1010.

In the illustrated example, the aisle 1120 is 15 feet (approximately 4.6 meters) wide and the RFID antennas 148 are configured to detect the corresponding RFID tags 1150 within a radius of 13 feet (approximately 3.9 meters). This provides sufficient overlap of coverage in the aisle 1120 for detection by the truck 1010 and provides ample distance for the exemplary truck 1010 to brake or otherwise come to a rest proximate to the end of the aisle. In practice, other ranges may be utilized and may be varied, based for example, upon the stopping requirements of the truck 1010 and corresponding wireless remote control implementation, the sensing technology utilized and other suitable factors.

Figure 18:
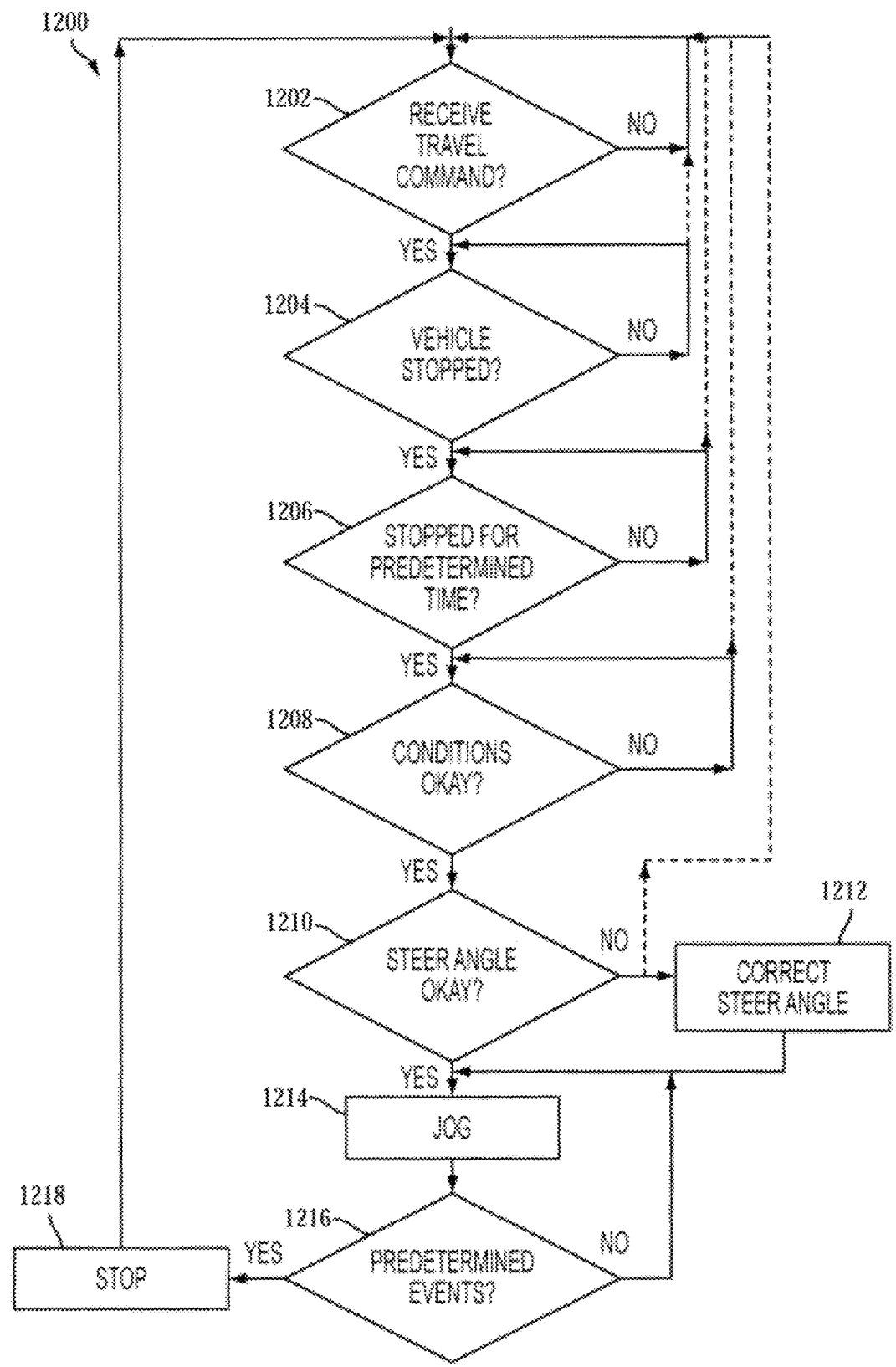
FIG. 18 is a flow chart illustrating an exemplary decision process of the controller on the truck of FIG. 14 according to various aspects of the present invention.

Referring to FIG. 18, a method 1200 of implementing the travel function is illustrated. The method 1200 may be implemented, for example, by the controller 1103 on the truck 1010. As noted herein, the controller 1103 may be responsive to receipt of a travel request from the remote control device 1070 to cause the truck 1010 to advance unless at least one condition is satisfied. The method 1200 sets out various exemplary vehicle conditions that may affect how the controller 1103 interprets travel requests from the remote control device 1070.

The process waits to receive a travel request at 1202. If no travel request is received, the process continues to wait. If a travel request is received, the process may either implement the travel request 1202 or perform optional checks or evaluations of vehicle conditions to determine whether to acknowledge or otherwise implement the travel request, examples of which are illustrated at 1204, 1206, 1208 and 1210.

For example, the process may require that the truck 1010 is stopped before recognizing a new travel request. This vehicle condition requirement may be implemented, for example, where the controller 1103 limits the maximum amount of continuous travel of the vehicle without stopping while under wireless remote control in response to receipt of the first type (travel request) signal(s). In this regard, the controller 1103 may determine whether the truck 1010 is currently stopped at 1204, e.g., using feedback from an encoder or other suitable device to detect motion of the truck. If the truck 1010 is not stopped, the process may optionally wait until the truck 1010 has come to rest or the process may ignore or otherwise terminate evaluation of whether to implement the received travel request as indicated by the dashed lines.

Moreover, the process may require that not only that the truck 1010 be stopped, but that there is no movement of the truck 1010 for a predetermined period of time. Thus, for example, if the truck 1010 is stopped, the process may determine whether a predetermined interval has passed after detecting that the truck 1010 has come to rest at 1206. If the predetermined interval has not passed, the process may wait until the predetermined interval has lapsed or the process may ignore or otherwise terminate processing of the received travel request as indicated by the dashed lines.

The process may also check at 1208 for vehicle conditions such as operational and/or environmental conditions that would affect operation of the truck in response to a remote travel request. If the vehicle condition check(s) indicate that it is okay to proceed processing the received travel request, then processing continues. Otherwise, the process may wait to resolve the condition, or the process may ignore or otherwise terminate processing of the received travel request as indicated by the dashed lines.

Operational and environmental conditions that may cause the process to ignore or otherwise refuse to implement a travel request from the remote control device 1070 may include factors such as detecting an operator on the platform, detecting an object in the travel path of the truck 1010, detecting that the truck is in an area or location where wireless remote control is not allowed, e.g., at the end of aisles or at intersections such as by using the RFID tags described with reference to FIG. 17, detecting the lack of a pallet or other suitable carrier structure on the forks of the truck, detecting that an invalid operator is logged into the truck and/or that the truck is paired with an unauthorized user, detecting that the power level of the received travel request is outside a range, e.g., too weak indicating that the operator is out of a predetermined maximum range, or too strong, indicating that the operator is too close to the truck 1010, etc. Thus, the operator may have to wait, clear an obstacle, or otherwise remedy a condition before the truck 1010 is ready to respond to remote travel requests.

The process may also check that a steer angle of the truck 1010 is within a predetermined range of steer angles at 1210. If the steered wheel(s) of the truck 1010 are turned beyond the predetermined range, the steer angle may be corrected at 1212. Alternatively, the system may default the steered wheel to a predetermined position, e.g., steered straight or the system may ignore or otherwise terminate processing of the received travel request.

The truck 1010 is then moved forward at 1214. For example, if each evaluated vehicle condition is satisfied by the controller as allowing remote travel, the controller causes the traction control system to advance the truck 1010. The truck 1010 may also sound an alarm or provide other forms of audible or visual cues when the truck 1010 is traveling in response to wireless remote control commands, or when the travel control on the remote control device 1070 remains actuated, such as by using the light source 1068 and/or the indicator such the strobe light 1072. As further illustrative examples, a horn and/or other cue may be controlled by relays or other suitable switching devices to be active concomitantly with engagement of the traction motor while the truck 1010 operates in response to wireless remote control commands.

The process checks at 1216 to determine whether a predetermined stopping event has occurred. For example, the process may check to determine whether the operator has deactivated the travel control on the remote control device 1070. Upon deactivating the travel control, the truck 1010 stops, e.g., by applying a brake, by coasting or by performing other suitable stopping operations. The process may also check at 1216 to determine whether a predetermined time of travel, distance of travel or other like event has passed in response to movement of the vehicle in response to wireless remote control.

For example, the truck 1010 may be configured to travel a maximum distance of continuous movement in response to a single wireless remote control travel request. As another example, the truck 1010 may be configured to travel a maximum distance of continuous movement in response to repeated successive wireless remote control travel requests. An exemplary range may comprise a travel distance limited to 25-50 feet (approximately 7.6 meters to 15.2 meters). As another example, the truck 1010 may be configured to travel for up to a predetermined maximum continuous travel time.

Other exemplary stopping events may comprise vehicle conditions, e.g., as imposed by predefined travel limits, receiving a stop or disable command, detecting an obstacle in the travel path of the truck 1010, detecting a person on the truck 1010, detecting a change in the position of the load carrying device (e.g., pallet, cage), detecting mechanical, electrical, pneumatic, hydraulic abnormal conditions of the truck, etc. If the predetermined stopping event is met at 1216, the truck 1010 is stopped or controlled to coast to a rest at 1218 and the system resets. If the operator issues a travel request from the wireless control device 1070 before a given task is complete, the system may wait for the current task to complete before issuing the next command.

According to various aspects of the present invention, the remote control device 1070 may be a wearable wireless remote control device that is donned by the operator who is interacting with the truck 1010. In general, the wearable wireless remote control device 1070 may comprise a wireless transmitter and a travel control, e.g., a button or switch that is communicably coupled to the wireless transmitter. As described herein, actuation of the travel control causes the wireless transmitter to transmit a first type signal, which may request the truck 1010 to advance in a first direction. Depending upon the particular implementation, the wireless remote control device 1070 may further include a power pack such as a battery for powering the remote control device electronics, a control area where the travel control is located on the operator, e.g., on or about a hand of the operator and a communications link between the transmitter and the control area where the transmitter is physically spaced from the control area when worn by the operator.

If the travel request is properly received by the receiver 1102 and is determined to be a valid travel request, the truck 1010 may be wirelessly remotely controlled to travel for a prescribed time and/or distance, and then enter a controlled brake or coast as described in greater detail herein.

While the remote control device 1070 is illustrated in FIGS. 14 and 16 as a glove garment that is worn by the operator around the wrist or arm, other configurations may alternatively be implemented. For example, the remote control device 1070 may be worn as a pendant around the neck of the operator, e.g., by looping the remote control device 1070 through a suitable lanyard, or the remote control device 1070 may be mounted on the wrist or arm of an operator. Alternatively, the remote control device 1070 may be donned by clipping the remote control device 1070 to a shirt, belt, pants, vest, uniform or other piece of clothing using a suitable clip. Still further, the remote control device 1070 may implemented as a voice controlled transmitter, wherein the remote control device 1070 may mount, for example, to a torso strap, sash or other suitable device. When used with such a voice control system of the remote control device 1070, operator voice commands such as TRAVEL, FORWARD, COAST, STOP, etc., may be used to cause the truck 1010 to move a preset distance and still maintain the heading set by the steer controller 1112 (shown in FIG. 15), e.g., parallel to the storage locations 1122 in the aisle 1120. The command words TRAVEL, FORWARD, COAST, STOP, etc., may be used to communicate with the traction motor controller 1106 while the steer controller 1112 automatically corrects itself to maintain a straight orientation or other desired heading. The remote control device 1070 may further allow the operator to make minor adjustments to the heading of the truck 1010, e.g., by allowing voice commands such as LEFT or RIGHT to adjust the heading of the truck 1010. Herein, translation of the voice commands into control commands for the truck 1010 may be carried out either in the processor of the remote control device 1070 or in the controller 1103 of the truck 1010.

Moreover, any of the disclosed configurations for the remote control device 1070 may be equipped with steering compensation controls. For example, the remote control device 1070 may include additional controls within the control area, such as a left steer button and a right steer button in addition to the travel button and optional stop or coast button. The amount of remotely controllable steer correction will likely depend upon a number of factors such as environment of use, typical anticipated correction, etc. However, in one exemplary arrangement, small steer angle corrections, e.g., on the order of 1 degree or less may be implemented for each actuation of the left and right steer controls.

Further, the remote control system may be integrated with a steer angle control of the truck 1010. The steer angle control is typically implemented using a potentiometer, encoder or other suitable input device, and may be positioned at any convenient location on the truck 1010. When used in combination with additional steering controls, the steer angle control sets a desired heading of the truck 1010. As an example, an operator may line up the truck 1010 in an aisle parallel to a row of racks in a warehouse operation. Using angle sensing feedback from the steer controller 1112 (shown in FIG. 15), the heading of the truck 1010 may be maintained parallel to the racks as the truck 1010 moves down the aisle. The steer angle control thus prevents drift of the truck 1010 and maintains its course. Under this arrangement, a travel request from the remote control device 1070 causes the truck 1010 to travel substantially straight along a heading defined by the steer controller.

A system that implements the jog control functionality set out herein may implement additional advanced features to satisfy specific performance requirements. For example, the transmitters may be equipped with a "global stop" command that shuts down all trucks 1010 within range of the transmitter that are operating under remote control. Thus, all receivers may be programmed or otherwise configured to recognize a stop command, e.g., using a global or common command sequence. Moreover, the global stop command may be transmitted by appending an operator ID so that the identity of the operator who issues the global stop command can be identified.

In each of the illustrated exemplary systems, an antenna for the transmitter could be located in a transmitter box, woven into the garment, e.g., by integrating the antenna into Velcro, straps, bands, or other components associated with the transmitter, that is donned by the operator, located in wiring between the transmitter box and controls, etc.

Still further, the transmitter may be directional. For example, a target may be provided on the truck 1010, e.g., as part of the receiver 1102 or antenna 1066. Thus, the operator must point the transmitter of the remote control device 1070 at or towards the target in order to cause the operation of the control, e.g., a jog command, to be received by the truck 1010. Alternatively, certain commands may be non-directional, whereas other controls are directional. For example, the global stop (where provided) may not require detection by a target in order to be effectuated. On the other hand, a control to initiate a jog operation may be required to be detected by a suitable target. Targeted detection may be accomplished, for example, using infrared or other suitable technologies.

The numerous exemplary configurations of the remote control described herein are presented by way of illustration and not by way of limitation of the manner in which a remote control may be configured. The various described features may be commingled into any desired configuration. Moreover, additional features may be provided in addition to, or in lieu of the features set out herein. Still further, the truck, remote control system and/or components thereof, including the remote control device 1070, may comprise any additional and/or alternative features or implementations, examples of which are disclosed in U.S. Provisional Patent Application Ser. No. 60/825,688, filed Sep. 14, 2006 entitled "SYSTEMS AND METHODS OF REMOTELY CONTROLLING A MATERIALS HANDLING VEHICLE;" U.S. patent application Ser. No. 11/855,310, filed Sep. 14, 2007 entitled "SYSTEMS AND METHODS OF REMOTELY CONTROLLING A MATERIALS HANDLING VEHICLE;" U.S. patent application Ser. No. 11/855,324, filed Sep. 14, 2007 entitled "SYSTEMS AND METHODS OF REMOTELY CONTROLLING A MATERIALS HANDLING VEHICLE;" U.S. Provisional Patent Application Ser. No. 61/222,632, filed Jul. 2, 2009, entitled "APPARATUS FOR REMOTELY CONTROLLING A MATERIALS HANDLING VEHICLE;" U.S. patent application Ser. No. 12/631,007, filed Dec. 4, 2009, entitled "MULTIPLE ZONE SENSING FOR MATERIALS HANDLING VEHICLES;" U.S. Provisional Patent Application Ser. No. 61/119,952, filed Dec. 4, 2008, entitled "MULTIPLE ZONE SENSING FOR REMOTELY CONTROLLED MATERIALS HANDLING VEHICLES;" U.S. Provisional Patent Application Ser. No. 61/234,866, filed Aug. 18, 2009, entitled "STEER CORRECTION FOR A REMOTELY OPERATED MATERIALS HANDLING VEHICLE;" U.S. patent application Ser. No. 12/649,738, filed Dec. 30, 2009, entitled "APPARATUS FOR REMOTELY CONTROLLING A MATERIALS HANDLING VEHICLE;" U.S. patent application Ser. No. 12/649,815, filed Dec. 30, 2009, entitled "STEER CORRECTION FOR A REMOTELY OPERATED MATERIALS HANDLING VEHICLE;" International Patent Application Serial No. PCT/US09/66789, filed Dec. 4, 2009, entitled "MULTIPLE ZONE SENSING FOR MATERIALS HANDLING VEHICLES;" International Patent Application Serial No. PCT/US09/69839, filed Dec. 30, 2009, entitled "APPARATUS FOR REMOTELY CONTROLLING A MATERIALS HANDLING VEHICLE;" International Patent Application Serial No. PCT/US09/69833, filed Dec. 30, 2009, entitled "STEER CORRECTION FOR A REMOTELY OPERATED MATERIALS HANDLING VEHICLE;" International Patent Application Serial No. PCT/US07/78455, filed Sep. 14, 2007, entitled "SYSTEMS AND METHODS OF REMOTELY CONTROLLING A MATERIALS HANDLING VEHICLE;" U.S. Pat. No. 7,017,689, issued Mar. 28, 2006, entitled "ELECTRICAL STEERING ASSIST FOR MATERIAL HANDLING VEHICLE;" and/or U.S. patent application Ser. No. 13/011,366, filed Jan. 21, 2011 entitled "SYSTEMS AND METHODS OF REMOTELY CONTROLLING A MATERIALS HANDLING VEHICLE," the entire disclosures of which are each incorporated by reference herein.

Figure 19:
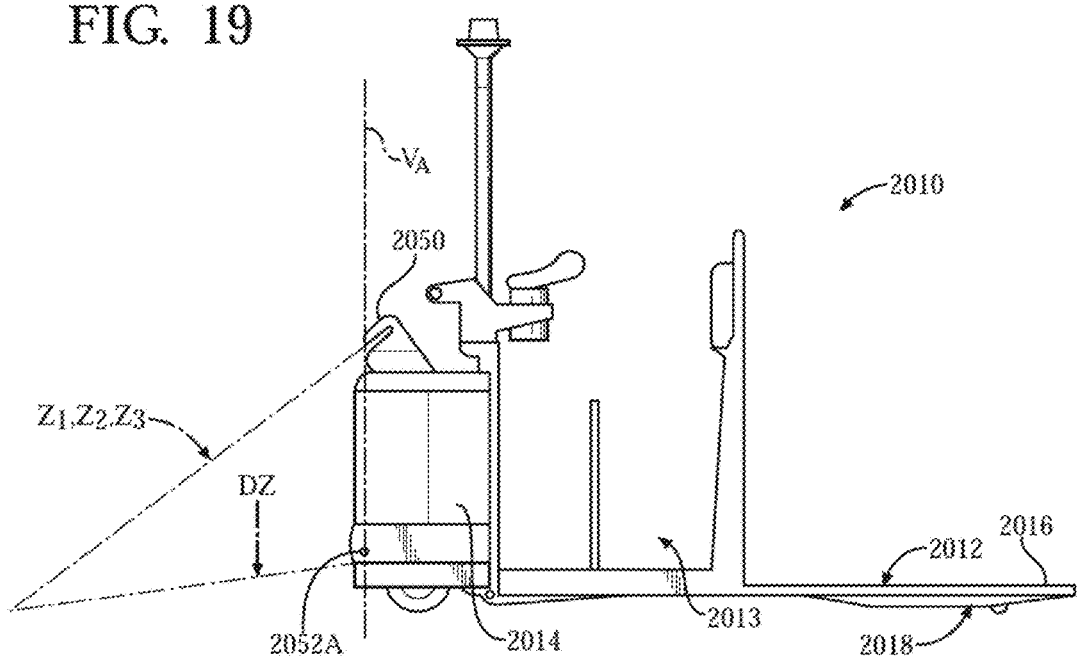
FIGS. 19-20 are side and top views of a materials handling vehicle according to another aspect of the present invention.
Figure 20:
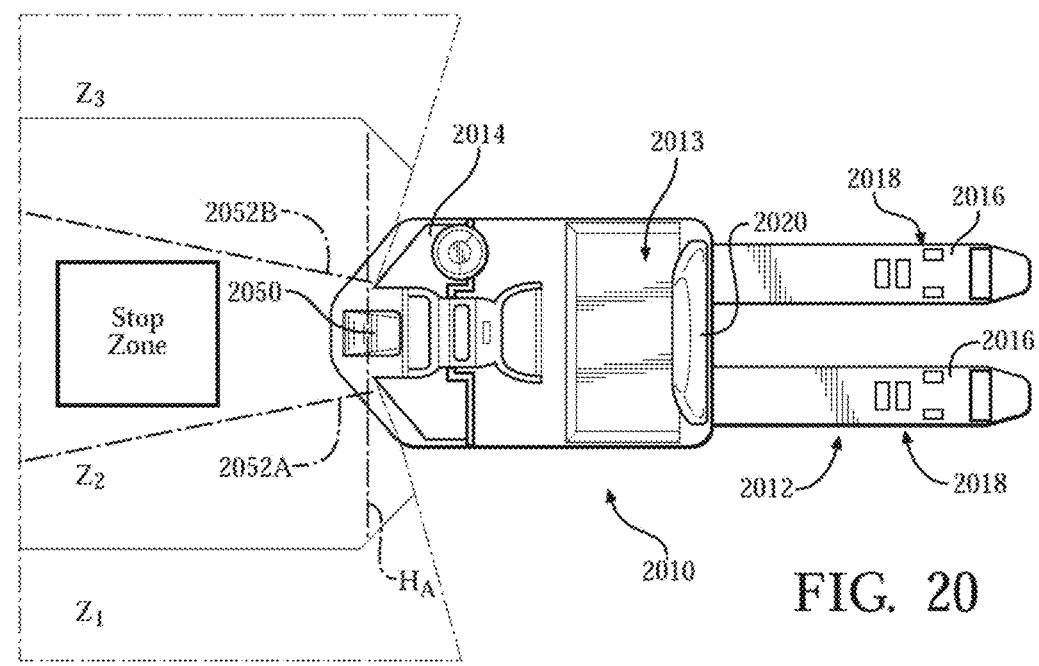

Referring now to FIGS. 19 and 20, a materials handling vehicle 2010 according to another aspect of the invention includes a load handling assembly 2012, an operator's compartment 2013, and a power unit 2014. The load handling assembly 2012 includes a pair of forks 2016, each fork 2016 having a load supporting wheel assembly 2018. The load handling assembly 2012 may include other load handling features in addition to or in lieu of the illustrated arrangement of the forks 2016, such as a load backrest, scissors-type elevating forks, outriggers and separate height adjustable forks, a mast, a load platform, collection cage or other support structure carried by the forks 2016 or otherwise provided for handling a load supported and carried by the vehicle 2010.

As shown in FIGS. 19 and 20, the vehicle 2010 includes a first obstacle detector 2050 and a pair of second obstacle detectors 2052A and 2052B mounted to the power unit 2014. The second obstacle detectors 2052A and 2052B are spaced apart from each other along a horizontal axis $H_A$ of the vehicle defining a horizontal direction, see FIG. 20. The first obstacle detector 2050 is spaced apart from the second obstacle detectors 2052A and 2052B along a longitudinal axis $V_A$ of the vehicle 2010 defining a vertical direction, i.e., the second obstacle detectors 2052A and 2052B are located below, i.e., closer to the ground, than the first obstacle detector 2050, see FIG. 19.

The first obstacle detector 2050 according to this aspect of the invention may comprise a sweeping laser sensor capable of detecting objects, for example, in first, second, and third zones $Z_1$, $Z_2$, $Z_3$ (also referred to herein as scan zones or detection zones), which first, second, and third zones $Z_1$, $Z_2$, $Z_3$ may comprise planar zones, see FIGS. 19 and 20. The second zone $Z_2$ may comprise a "stop zone", and the first and third zones $Z_1$ and $Z_3$ may comprise left and right "steer bumper zones", such as the stop zone and the left and right steer bumper zones described in U.S. patent application Ser. No. 12/649,815, filed Dec. 30, 2009, entitled "STEER CORRECTION FOR A REMOTELY OPERATED MATERIALS HANDLING VEHICLE," the entire disclosure of which is already incorporated by reference herein. It is noted that the first obstacle detector 2050 may be capable of detecting objects in additional or fewer zones than the three zones $Z_1$, $Z_2$, $Z_3$ illustrated.

The second obstacle detectors 2052A and 2052B according to this aspect of the invention may comprise point laser sensors that are capable of detecting objects between one or more of the zones $Z_1$, $Z_2$, $Z_3$ and the vehicle 2010, i.e., underneath one or more of the zones $Z_1$, $Z_2$, $Z_3$, as illustrated in FIG. 19, and are preferably capable of at least detecting objects underneath the second zone $Z_2$. The second obstacle detectors 2052A and 2052B are thus capable of detecting objects located in a non-detect zone DZ of the first obstacle detector 2050, see FIG. 19, i.e., which non-detect zone DZ is defined as an area below the zones $Z_1$, $Z_2$, $Z_3$ and thus not sensed by the first obstacle detector 2050. Hence, the first obstacle detector 2050 functions to detect objects located along a path of travel of the power unit 2014 beyond the non-detect zone DZ, while the second obstacle detectors 2052A and 2052B function to sense objects along the path of travel of the power unit 2014 in the non-detect zone DZ, which is located just in front of the vehicle 2010, as shown in FIG. 19.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limiting to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A materials handling vehicle comprising:
a power unit;
a load handling assembly coupled to said power unit;
at least one obstacle detector mounted to said power unit to detect an object located along a path of travel of said power unit, said detector generating a distance signal upon detecting an object corresponding to a distance between the detected object and said power unit;
a controller receiving said distance signal and generating a corresponding vehicle stop or predetermined maximum allowable speed signal based on said distance signal, wherein if a sensed object is located within a speed zone associated with a predetermined maximum allowable travel speed comprising a fixed speed greater than zero (0) miles per hour, as determined by said distance signal, the vehicle speed is reduced to the predetermined maximum allowable vehicle speed; and
a presence sensor that detects the presence of an operator in an operator's station of the materials handling vehicle, wherein said controller is responsive to remote travel requests and determines whether to implement each remote travel request based on the evaluation of at least one vehicle condition, said at least one vehicle condition evaluated by said controller comprising a status of said presence sensor, wherein said controller is configured to decide to not implement said remote travel request if said status from said presence sensor is indicative of the presence of an operator in the operator's station of the materials handling vehicle.

2. The materials handling vehicle as set out in claim 1, further comprising a load sensor to generate a weight signal indicative of a weight of a load on said load handling assembly.

3. The materials handling vehicle as set out in claim 2, wherein said controller receives said distance signal and said weight signal and generates a corresponding vehicle stop or predetermined maximum allowable speed signal based on said distance and weight signals.

4. The materials handling vehicle as set out in claim 3, wherein for a given first load weight, if a sensed object is located at a distance within a first detection zone, a stop signal is generated by said controller to effect stopping of said vehicle.

5. The materials handling vehicle as set out in claim 4, wherein for said given first load weight, if a sensed object is located at a distance within a second detection zone comprising said speed zone spaced further away from said power unit than said first detection zone, then the predetermined maximum allowable vehicle speed is defined corresponding to said first load weight and an object being detected in said second detection zone.

6. The materials handling vehicle as set out in claim 5, wherein for said given first load weight, if a sensed object is located at a distance within a third detection zone spaced further away from said power unit than said first and second detection zones, then a second predetermined maximum allowable vehicle speed comprising a fixed speed greater than said first predetermined maximum speed is defined corresponding to said first load weight and an object being detected in said third detection zone.

7. The materials handling vehicle as set out in claim 1 wherein said remote travel request comprises a wireless travel request sent by a wireless remote control device donned by an operator interacting with the materials handling vehicle.

8. A materials handling vehicle comprising:
a power unit;
a load handling assembly coupled to said power unit;
at least one obstacle detector mounted to said power unit to detect an object located along a path of travel of said power unit, said detector generating a distance signal upon detecting an object corresponding to a distance between the detected object and said power unit;
a load sensor to generate a weight signal indicative of a weight of a load on said load handling assembly;
a controller receiving said distance signal and said weight signal and generating a corresponding vehicle stop or predetermined maximum allowable speed signal based on said distance and weight signals, wherein if a sensed object is located within a speed zone associated with a predetermined maximum allowable travel speed comprising a fixed speed greater than zero (0) miles per hour, as determined by said distance signal, the vehicle speed is reduced to the predetermined maximum allowable vehicle speed; and
a presence sensor that detects the presence of an operator in an operator's station of the materials handling vehicle, wherein said controller is responsive to remote travel requests and determines whether to implement each remote travel request based on the evaluation of at least one vehicle condition, said at least one vehicle condition evaluated by said controller comprising a status of said presence sensor, wherein said controller is configured to decide to not implement said remote travel request if said status from said presence sensor is indicative of the presence of an operator in the operator's station of the materials handling vehicle.

9. The materials handling vehicle as set out in claim 8, wherein for a given first load weight, if a sensed object is located at a distance within a first detection zone, a stop signal is generated by said controller to effect stopping of said vehicle.

10. The materials handling vehicle as set out in claim 9, wherein for said given first load weight, if a sensed object is located at a distance within a second detection zone comprising said speed zone spaced further away from said power unit than said first detection zone, then the predetermined maximum allowable vehicle speed is defined corresponding to said first load weight and an object being detected in said second detection zone.

11. The materials handling vehicle as set out in claim 10, wherein for said given first load weight, if a sensed object is located at a distance within a third detection zone spaced further away from said power unit than said first and second detection zones, then a second predetermined maximum allowable vehicle speed comprising a fixed speed greater than said first predetermined maximum speed is defined corresponding to said first load weight and an object being detected in said third detection zone.

12. The materials handling vehicle as set out in claim 8, wherein said remote travel request comprises a wireless travel request sent by a wireless remote control device donned by an operator interacting with the materials handling vehicle.

* * * * *